United States Patent
Kaczmarczyk et al.

(10) Patent No.: US 10,430,102 B2
(45) Date of Patent: Oct. 1, 2019

(54) STORAGE DEVICE, PROGRAM, AND INFORMATION PROCESSING METHOD

(71) Applicant: NEC Corporation, Minato-ku, Tokyo (JP)

(72) Inventors: Michal Kaczmarczyk, Warsaw (PL); Cezary Dubnicki, Warsaw (PL)

(73) Assignee: NEC CORPORATION, Tokyo (JP)

( * ) Notice: Subject to any disclaimer, the term of this patent is extended or adjusted under 35 U.S.C. 154(b) by 115 days.

(21) Appl. No.: 15/319,105

(22) PCT Filed: Jun. 23, 2015

(86) PCT No.: PCT/JP2015/003139
§ 371 (c)(1),
(2) Date: Dec. 15, 2016

(87) PCT Pub. No.: WO2015/198591
PCT Pub. Date: Dec. 30, 2015

(65) Prior Publication Data
US 2017/0131934 A1 May 11, 2017

Related U.S. Application Data

(60) Provisional application No. 62/018,122, filed on Jun. 27, 2014.

(51) Int. Cl.
*G06F 12/12* (2016.01)
*G06F 3/06* (2006.01)
(Continued)

(52) U.S. Cl.
CPC ............ *G06F 3/0641* (2013.01); *G06F 3/061* (2013.01); *G06F 3/0608* (2013.01);
(Continued)

(58) Field of Classification Search
CPC .......................... G06F 3/0641; G06F 12/0866
(Continued)

(56) References Cited

U.S. PATENT DOCUMENTS

| | | | |
|---|---|---|---|
| 8,131,924 B1 | 3/2012 | Frandzel et al. | |
| 2003/0191916 A1* | 10/2003 | McBrearty | G06F 11/1464 711/162 |

(Continued)

FOREIGN PATENT DOCUMENTS

| | | |
|---|---|---|
| JP | 2012-064112 A | 3/2012 |
| JP | 2013-541055 A | 11/2013 |
| WO | 2014/136183 A1 | 9/2014 |

OTHER PUBLICATIONS

Extended European Search Report for EP Application No. EP15812492.5 dated Jan. 25, 2018.

(Continued)

*Primary Examiner* — Jae U Yu

(57) ABSTRACT

A storage device has: a data storage part storing deduplicated block data; a temporary data storage part temporarily storing block data acquired from the data storage part; a data retrieval control part retrieving the block data stored by the data storage part, storing the block data into the temporary data storage part, and retrieving the block data from the temporary data storage part; and a temporary data control part controlling the storage state of the block data stored by the temporary data storage part. The storage device also has a retrieval turn information storage part storing retrieval turn information which is information about a turn to be retrieved of the block data. The data retrieval control part causes the temporary data storage part to store the block data acquired from the data storage part on the basis of the retrieval turn information acquired from the retrieval turn information storage part, and the temporary data control part controls the (Continued)

storage state of the block data in the temporary data storage part on the basis of the retrieval turn information.

12 Claims, 55 Drawing Sheets

(51) Int. Cl.
  *G06F 11/14*     (2006.01)
  *G06F 12/0862*   (2016.01)
  *G06F 12/0866*   (2016.01)
  *G06F 12/0868*   (2016.01)
  *G06F 12/121*    (2016.01)

(52) U.S. Cl.
  CPC .......... *G06F 3/0644* (2013.01); *G06F 3/0673* (2013.01); *G06F 11/1435* (2013.01); *G06F 11/1453* (2013.01); *G06F 11/1469* (2013.01); *G06F 3/0656* (2013.01); *G06F 12/0862* (2013.01); *G06F 12/0866* (2013.01); *G06F 12/0868* (2013.01); *G06F 12/121* (2013.01)

(58) Field of Classification Search
  USPC .......................................................... 711/103
  See application file for complete search history.

(56) References Cited

U.S. PATENT DOCUMENTS

| | | | |
|---|---|---|---|
| 2003/0196026 A1* | 10/2003 | Moyer | G06F 12/0802 711/103 |
| 2008/0184001 A1 | 7/2008 | Stager | |
| 2009/0171888 A1 | 7/2009 | Anglin | |
| 2009/0177844 A1* | 7/2009 | Naylor | G06F 12/122 711/136 |
| 2012/0017060 A1 | 1/2012 | Kapanipathi et al. | |
| 2012/0072684 A1 | 3/2012 | Cho et al. | |
| 2014/0006363 A1 | 1/2014 | Constantinescu et al. | |
| 2014/0025917 A1 | 1/2014 | Kaczmarczyk et al. | |

OTHER PUBLICATIONS

Japanese Office Action for JP Application No. 2016-571760 dated Feb. 6, 2018 with English Translation.
Japanese Office Action for JP Application No. 2016-571760 dated Oct. 24, 2017 with English Translation.
International Search Report for PCT Application No. PCT/JP2015/003139, dated Sep. 15, 2015.
Written Opinion of the International Search Authority for PCT Application No. PCT/JP2015/003139.
Chinese Office Action for CN Application No. 201580041132.1 dated Feb. 3, 2019 with English Translation.

* cited by examiner

Digital Universe size

| Characteristic | Primary storage | Secondary storage |
|---|---|---|
| Write bandwidth | in MBs/s | in GBs/s |
| Transactions latency | in milliseconds | in seconds |
| Restore start time | milliseconds | seconds to minutes |
| Data access | random | stream(mostly) |
| Data resiliency | optional | essential |
| Interface | any filesystem | VTL,OST,NFS,CIFS |
| Required capacity | in TBs | in PBs |

Fig.26
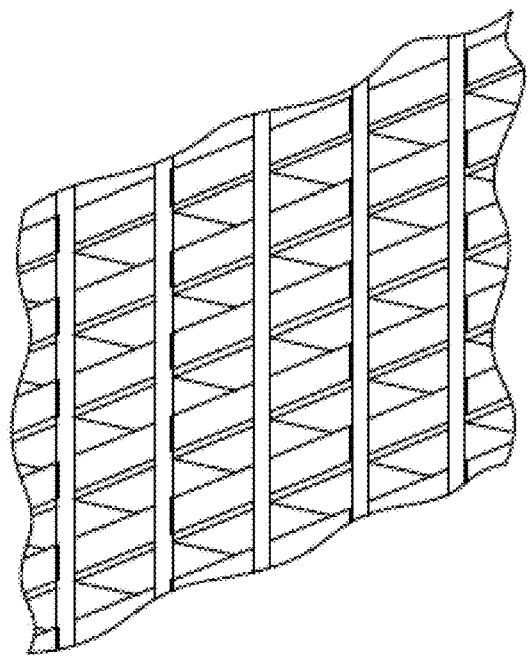
Fig.27
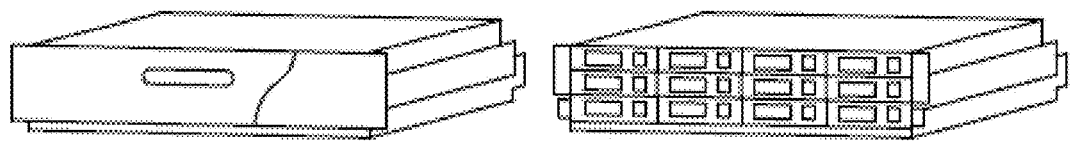
Fig.28
| Policy name | One bkp size | Modified data in each bkp | Number of bkps | Sum data stored | Sum data written | Dedup ratio |
|---|---|---|---|---|---|---|
| Daily | 1 TB | 1 % | 365 | 4.65 TB | 365 TB | 78.49 |
| Weekly | 1 TB | 6.79 % | 52 | 4.53 TB | 52 TB | 11.48 |
| Monthly | 1 TB | 26.03 % | 12 | 4.12 TB | 12 TB | 2.91 |

Is your organization currently using any data deduplication solutions?(Percent of respondents, N=323)

Fig.30

| Disk | Tape |
|---|---|
| Advantages : | Advantages : |
| • Rapid random access of single/small files | • Low energy usage and cost per GB of data stored |
| • Multiple stream handling | • Data life span of up to 30 years |
| • Read/write throughput ( since one stream is usually stored on many hard drives )[64] | • Significantly higher reliability than single SATA disk |
| • Deduplication to archive high compression ratios, enable remote replication and other functions | |
| • Many formats of backup | |
| • Manageable reliability with large systems | |
| Appropriate use : | Appropriate use : |
| • Fast storage and data retrieval in any way | • Storage and restore of large files or quantities of streaming data |
| • Active, newly created and frequently accessed data | • Less heavily accessed data |
| • Multi-stream access | • Data that must be retained for some period of time and are rarely or never read |
| • Redundant data (i.e. backup) | • Unique data |
| • Efficient replication | |

For the majority of recoveries performed, what is the typical age of your organization's recovered data? (Percent of respondents, N=510)

| Prefetch Size (in KB) | Time of one single prefetched read operation (I/O) in ms | Average time to read 1GB of data (in s) | Read time difference in % of 2MB prefetch result |
|---|---|---|---|
| 16384 | 104.10 | 6.26 | -46.00% |
| 8192 | 58.38 | 7.47 | -39.43% |
| 4096 | 35.52 | 9.09 | -26.28% |
| 2048 | 24.10 | 12.34 | 0.00% |
| 1024 | 18.38 | 18.82 | +52.57% |
| 512 | 15.52 | 31.79 | +157.71% |
| 128 | 13.38 | 109.62 | +788.54% |

Fig.33

| Issue | Observable impact on read bandwidth | Impact with increasing number of backups |
|---|---|---|
| Inter-version fragmentation | from -10% to -50% | increasing |
| Internal stream fragmentation | from +50% to -70% | stable |
| Global fragmentation | from 0% to -10% | stable * |

Fig.34

Restore of data stored with deduplication
(with internal stream fragmentation)

logical block offset:

| 402-410 | ... | i' 279 | i' 280 | i' 5 | i' 6 | i' 281 | i' 282 | i' 283 | i' 284 | i' 285 |
|---|---|---|---|---|---|---|---|---|---|---|
| 411-420 | i' 1 | i' 286 | i' 287 | i' 288 | i' 289 | i' 290 | i' 76 | i' 291 | i' 107 | i' 292 |
| 421-430 | i' 293 | i' 294 | i' 169 | i' 295 | i' 296 | i' 297 | i' 113 | i' 82 | i' 298 | i' 299 |
| 431-438 | i' 5 | i' 300 | i' 301 | i' 302 | i' 128 | i' 303 | i' 129 | i' 304 | ... | |

Restore of data stored sequentially
(no internal stream fragmentation)

logical block offset:

| 402-410 | ... | i' 402 | i' 403 | i' 404 | i' 405 | i' 406 | i' 407 | i' 408 | i' 409 | i' 410 |
|---|---|---|---|---|---|---|---|---|---|---|
| 411-420 | i' 411 | i' 412 | i' 413 | i' 414 | i' 415 | i' 416 | i' 417 | i' 418 | i' 419 | i' 420 |
| 421-430 | i' 421 | i' 422 | i' 423 | i' 424 | i' 425 | i' 426 | i' 427 | i' 428 | i' 429 | i' 430 |
| 431-438 | i' 431 | i' 432 | i' 433 | i' 434 | i' 435 | i' 436 | i' 437 | i' 438 | ... | |

Legend:

i' Y — physical block address (Y) in the disk area stored within the initial backup (i)

[i' A] — unique block (never stored before)

[i' 5] — duplicate of a block stored in previous part of this stream in location B ☆ — block triggering disk access (assuming prefetch size = 4)

| | Restore after dedup (with internal stream fragmentation) | Sequential restore |
|---|---|---|
| Number of disk accesses | 15 | 10 |

Internal stream fragmentation restore penalty factor: 1,5

Fig.36

Restore of data stored with in-line deduplication (backup 9)
(with inter-version fragmentation)

| logical block offset: | | | | | | | | | | |
|---|---|---|---|---|---|---|---|---|---|---|
| 1-10 | i' 1 ☆ | 1' 1 ☆ | 9' 1 ☆ | i' 5 ☆ | i' 6 | i' 7 | 3' 4 ☆ | 3' 5 | 4' 1 ☆ | 5' 1 ☆ |
| 11-20 | 6' 1 ☆ | i' 23 ☆ | i' 24 | 4' 3 | i' 26 | i' 27 ☆ | i' 28 | 7' 3 ☆ | 7' 4 | 7' 5 |
| 21-30 | 7' 6 | i' 97 ☆ | 5' 6 ☆ | i' 103 ☆ | i' 104 | 2' 15 ☆ | 2' 16 | 3' 12 ☆ | 4' 7 ☆ | i' 536 ☆ |
| 31-38 | 2' 20 ☆ | 8' 10 ☆ | 8' 11 | i' 126 ☆ | i' 127 | i' 128 | 9' 2 | i' 129 | ... | |

Restore of data stored sequentially (backup 9)
(no inter-version fragmentation)

| logical block offset: | | | | | | | | | | |
|---|---|---|---|---|---|---|---|---|---|---|
| 1-10 | 9' 1 ☆ | 9' 2 | 9' 3 | 9' 4 | 9' 5 ☆ | 9' 6 | 9' 7 | 9' 8 | 9' 9 ☆ | 9' 10 |
| 11-20 | 9' 11 | 9' 12 | 9' 13 ☆ | 9' 14 | 9' 15 | 9' 16 | 9' 17 ☆ | 9' 18 | 9' 19 | 9' 20 |
| 21-30 | 9' 21 ☆ | 9' 22 | 9' 23 | 9' 24 | 9' 25 ☆ | 9' 26 | 9' 27 | 9' 28 | 9' 29 ☆ | 9' 30 |
| 31-40 | 9' 31 | 9' 32 | 9' 33 ☆ | 9' 34 | 9' 35 | 9' 36 | 9' 37 ☆ | 9' 38 | ... | |

Legend:

X' Y
- X – number of backup (disk area when the block is stored)
- Y – physical block number in the area
- ☆ – block triggering disk access (assuming prefetch size =4)

| | Restore after in-line dedup (with inter-version fragmentation) | Sequential restore |
|---|---|---|
| Number of disk accesses | 21 | 10 |

Inter-version fragmentation restore penalty factor: 2,1

Fig.37

| Data set | Global duplicates (blocks present in other data sets) | Impact on restore bandwidth |
|---|---|---|
| *DevelopmentProject* | 1.40% | -6.99% |
| *GeneralFileServer* | 0.01% | -0.06% |
| *IssueRepository* | 0.55% | -8.91% |
| *Mail-30daily* | 0.05% | -0.94% |
| *Wiki* | 1.47% | -5.10% |

Data Storage

Oracle data

Fig.44

Last Recently Used algorithm structures:*

LRU cache priority queue hash + last occurrence

| ndx42 (78) |
| fneo5 (77) |
| fkj941 (76) |
| kofw9 (75) |
| 1pwz0 (73) |
| dke84 (72) |
| Rdper (71) |
| ffo54 (68) |

Cache with Forward Knowledge algorithm structures:*

FK cache priority queue hash + section of next occurrence

| d34mf (79) |
| F5kd9 (80) |
| 9bgR4 (99) |
| Psr3d (122) |
| fdsae (156) |
| 3srf5 (192) |
| Bs9o3 (192) |
| pwQ2e (192) |

Oracle data
(limited to the blocks visible in cache)

sections of next occurrence

| short hash | | |
|---|---|---|
| 3s | 192 | |
| 9b | 99 | 113 → 137 |
| Bs | 192 | |
| F5 | 80 | |
| Ps | 122 | |
| d3 | 79 | 181 |
| fd | 156 | 272 |
| pw | 192 | |

* both algorithms additionally use a map holding the actual data (with full hash as a key) and the pointer to the entry in priority queue

Fig.51

| data set name | number of backups | avg. one backup size | avg. duplicate blocks* | avg. internal duplicate blocks |
|---|---|---|---|---|
| *DevelopmentProject* | 7 | 13.74 GB | 96.42% | 17.81% |
| *IssueRepository* | 7 | 18.36 GB | 85.42% | 23.20% |
| *Wiki* | 8 | 8.75 GB | 97.76% | 17.79% |
| *GeneralFileServer* | 14 | 77.59 GB | 83.43% | 17.38% |
| *UserDirectories* | 50 | 76.15 GB | 92.58% | 19.34% |
| *Mail* | 22 | 25.91 GB | 97.76% | 32.55% |

Fig.52

| LRU cache | Cache with forward knowledge (FK) | base scenario (with inter-version fragmentation) | max scenario (no inter-version fragmentation) |
|---|---|---|---|
| 1GB | 128MB + 2GB FK | 0.94 - 50.92% (avg. 18.67%) | 0.85 - 37.4% (avg. 14.84%) |
| 128MB | 128MB + 2GB FK | 9.45% - 200.62% (avg. 72.2%) | 8.84% - 183.41% (avg. 73.63%) |
| 256MB | 256MB + 8GB FK | 6.67% - 185.47% (avg. 70.36%) | 6.79% - 196.95% (avg. 87.76%) |
| 512MB | 512MB + 8GB FK | 3.78% - 197.73% (avg. 66.42%) | 3.84% - 238.54% (avg. 82.03%) |
| 1GB | 1GB + 8GB FK | 2.50% - 211.34% (avg. 61.97%) | 2.57% - 253.56% (avg. 67.64%) |

Fig.55

| data set name | base (with inter-version fragmentation) | max (no inter-version fragmentation) |
|---|---|---|
| *DevelopmentProject* | 212 MB | 94 MB |
| *IssueRepository* | 2654 MB | 309 MB |
| *Wiki* | 353 MB | 269 MB |
| *GeneralFileServer* | 184 MB | 181 MB |
| *UserDirectories* | 3916 MB | 1887 MB |
| *Mail* | 2230 MB | 1366 MB |

| data set name | B/W before defragmentation (base) as % of max | B/W after defragmentation (defrag) as % of max | % of blocks rewritten | write time increase |
|---|---|---|---|---|
| *DevelopmentProject* | 88.15% | 95.22% | 0.86% | 2.40% |
| *IssueRepository* | 49.15% | 95.63% | 2.18% | 4.59% |
| *Wiki* | 86.89% | 97.54% | 2.29% | 6.57% |
| *GeneralFileServer* | 88.13% | 95.83% | 0.35% | 0.94% |
| *UserDirectories* | 81.24% | 107.74% | 0.52% | 1.39% |
| *Mail* | 78.67% | 93.14% | 3.27% | 9.38% |

Fig.60

| data set name | base (with inter-version fragmentation) | defrag (CBR de-fragmentation) | max (no inter-version fragmentation) |
| --- | --- | --- | --- |
| *DevelopmentProject* | 212 MB | 99 MB | 94 MB |
| *IssueRepository* | 2654 MB | 312 MB | 309 MB |
| *Wiki* | 353 MB | 272 MB | 269 MB |
| *GeneralFileServer* | 184 MB | 182 MB | 181 MB |
| *UserDirectories* | 3916 MB | 2196 MB | 1887 MB |
| *Mail* | 2230 MB | 1375 MB | 1366 MB |

Fig.62

| data set name | LRU base | LRU defrag | FK8GB base | FK8GB defrag |
|---|---|---|---|---|
| *UserDirectories* | 47.65 | +32.61% | +42.12% | +72.30% |
| *DevelopmentProject* | 57.33 | + 8.02% | +79.26% | +103.52% |
| *IssueRepository* | 23.51 | +94.56% | +89.75% | +388.90% |
| *Mail* | 12.39 | +18.40% | +185.47% | +238.42% |
| *GeneralFileServer* | 95.84 | + 8.74% | + 6.67% | +16.28% |
| *Wiki* | 83.80 | +11.29% | +18.87% | +36.47% |
| Average | | +28.94% | +70.36% | +142.65% |

Fig.64

| data set name | LRU base | FK8GB defrag | FK8GB defrag | infFK max |
|---|---|---|---|---|
| *UserDirectories* | -61.79% | -34.16% | -29.46% | -28.38% |
| *DevelopmentProject* | -53.52% | - 5.40% | - 0.29% | - 0.00% |
| *IssueRepository* | -82.12% | -12.59% | - 5.88% | - 5.34% |
| *Mail* | -91.65% | -71.75% | -68.49% | -68.49% |
| *GeneralFileServer* | -17.80% | - 4.42% | - 0.39% | - 0.00% |
| *Wiki* | -30.84% | - 5.63% | - 0.69% | - 0.50% |
| Average | -56.29% | -22.32% | -17.54% | -17.12% |

Fig.66

| data set name | LRU base with 1GB cache (1) | LRU base with unlimited cache (2) | FK8GB defrag with 128MB cache (3) | (3) vs (1) | (3) vs (2) |
|---|---|---|---|---|---|
| *DevelopmentProject* | 85.08 | 103.04 | 116.62 | 37.07% | 13.18% |
| *IssueRepository* | 24.49 | 56.46 | 85.62 | 249.61% | 51.65% |
| *Wiki* | 91.51 | 104.06 | 107.58 | 17.56% | 3.38% |
| *GeneralFileServer* | 99.74 | 102.58 | 111.06 | 11.35% | 8.27% |
| *UserDirectories* | 57.8 | 82.68 | 78.94 | 36.57% | -4.52% |
| *Mail* | 21.34 | 94.66 | 32.92 | 54.26% | -65.22% |
| Average | | | | 67.74% | 1.12% |

Fig.67

| Aspect | Off-line dedup | In-line CBR | Off-line CBR |
|---|---|---|---|
| duplicated stream write bandwidth | low | high | high |
| read bandwidth | maximal | close to maximal | low after backup, later close to maximal |
| additional disk space | low (with staging) | low (not more than 5%) | low (with staging) |
| additional disk bandwidth and spindles | high (write all duplicates and remove) | low (no duplicates written except for 5% rewrites ) | medium (additional reads) |

Fig.68

| Fragmentation metric | Value indicating bandwidth level with no deduplication | Correlation with bandwidth | Dependence on the backup algorithm | Level of caching used with simulation |
|---|---|---|---|---|
| Chunk Fragmentation Level (CFL) | 1 | yes (but not above 1) | yes (container) | container |
| Speed factor | 4 | yes | yes (container) | block |
| % of restore bandwidth with no duplicates | 100% | yes | no | block |

STORAGE DEVICE, PROGRAM, AND INFORMATION PROCESSING METHOD

This application is a National Stage Entry of PCT/JP2015/003139 filed on Jun. 23, 2015, which claims priority from U.S. Patent Application 62/018,122 filed on Jun. 27, 2014, the contents of all of which are incorporated herein by reference, in their entirety.

TECHNICAL FIELD

The present invention relates to a storage device, a program, and an information processing method. In particular, the present invention relates to a storage device which eliminates duplicated storage of data of the same content, and also relates to a program and an information processing method.

BACKGROUND ART

A storage device which has a function of eliminating duplicated storage is known as a technique for efficiently handling an enormous amount of data.

In a storage system which performs deduplication as mentioned above, new data is added to the end of a storage area, for example. Therefore, at the time of retrieval of the data later, there may be a need to operate a disk a huge number of times in order to retrieve block data dispersed in the whole storage device.

A technique for dealing with the abovementioned problem is described in, for example, Patent Document 1. Patent document 1 describes a storage device which has a plurality of storage media, a cache memory, and a control part that controls input/output of data into/from the storage media. According to Patent Document 1, the control part provides a host device with first and second storage areas which are configured by the storage areas of the plurality of storage media and have the same performance characteristics. To be specific, the control part stores a first data stream which is a deduplicated data stream into the first storage area, and stores a second data stream generated on the basis of a data stream before the first data stream is deduplicated into sequential areas of a physical area configured by the second storage area. According to Patent Document 1, such a configuration enables storage of the deduplicated first data string into the first storage area and storage of the second data string into sequential areas of the physical area configured by the second storage area. As a result, according to Patent Document 1, it becomes possible to stage the data stored in the sequential areas instead of deduplicated and fragmented data, and it becomes possible to increase access performance.

Further, a technique for dealing with the abovementioned problem is also described in, for example, Patent Document 2. Patent Document 2 describes a storage device which has a data dividing means, a block detecting means, and a data writing means. According to Patent Document 2, the block detecting means detects a common rate which represents the rate of a common portion between a plurality of sequential block data configuring a given range in writing target data among divided block data and a plurality of block data in a given range already sequentially stored in the storage device. Further, the data writing means newly stores divided block data into the storage device in accordance with the common rate detected by the block detecting means. According to Patent Document 2, such a configuration enables control so as to newly write block data into the storage device only when the common rate is, for example, smaller than a given threshold. As a result, according to Patent Document 2, it is possible to inhibit dispersion of block data throughout the whole storage area within the storage device. Consequently, it becomes possible to inhibit decrease of retrieval performance.

Patent Document 1: WO2014-136183
Patent Document 2: JP 2013-541055

However, in the case of the technique described in Patent Document 1, not only the first storage area which stores the deduplicated first data stream but also the second storage area needs to be reserved. Therefore, there is a problem of consumption of the capacity of the storage device. Moreover, in the case of the technique as described above, there is a problem of difficulty in coping with decrease of retrieval performance caused by appearance of the same block twice or more during a series of retrieval processes. In other words, there is a problem that, when block data loaded once into a cache is required again, the data may have already been evicted from the cache and retrieval of the data from a disk may be required again.

Thus, it has been still difficult to inhibit decrease of retrieval performance in a storage device which has a function of eliminating duplicated storage.

SUMMARY

Accordingly, an object of the present invention is to provide a storage device which can solve the abovementioned problem that it is difficult to inhibit decrease of retrieval performance in a storage device which has a function of eliminating duplicated storage.

In order to achieve the object, a storage device as an aspect of the present invention includes:

a data storage part storing deduplicated block data;

a temporary data storage part temporarily storing block data acquired from the data storage part;

a data retrieval control part retrieving the block data stored by the data storage part, storing the block data into the temporary data storage part, and retrieving the block data from the temporary data storage part; and a temporary data control part controlling a storage state of the block data stored by the temporary data storage part.

The storage device also includes a retrieval turn information storage part storing retrieval turn information which is information about a turn to be retrieved of the block data.

The data retrieval control part causes the temporary data storage part to store the block data acquired from the data storage part on a basis of the retrieval turn information acquired from the retrieval turn information storage part.

The temporary data control part controls the storage state of the block data in the temporary data storage part on the basis of the retrieval turn information.

Further, a computer program as another aspect of the present invention includes instructions for causing an information processing device, which includes a data storage part storing deduplicated block data, a temporary data storage part temporarily storing block data acquired from the data storage part, and a retrieval turn information storage part storing retrieval turn information which is information about a turn to be retrieved of the block data, to realize:

a data retrieval control means for retrieving the block data stored by the data storage part, storing the block data into the temporary data storage part, and retrieving the block data from the temporary data storage part; and a temporary data control means for controlling a storage state of the block data stored by the temporary data storage part.

The data retrieval control means causes the temporary data storage part to store the block data acquired from the data storage part on a basis of the retrieval turn information acquired from the retrieval turn information storage part.

The temporary data control means controls the storage state of the block data in the temporary data storage part on the basis of the retrieval turn information.

Further, an information processing method as another aspect of the present invention includes:

acquiring retrieval turn information which is information about block data's turn to be retrieved;

causing a temporary storage device to store the block data acquired from a storage device on a basis of the acquired retrieval turn information; and controlling a storage state of the block data in the temporary storage device on the basis of the retrieval turn information.

With the configurations as described above, the present invention can realize a storage device which can solve the problem that it is difficult to inhibit decrease of retrieval performance.

BRIEF DESCRIPTION OF DRAWINGS

FIG. 26 is a diagram referred to in the research paper described in the fourth exemplary embodiment of the present invention;

FIG. 27 is a diagram referred to in the research paper described in the fourth exemplary embodiment of the present invention;

FIG. 28 is a diagram referred to in the research paper described in the fourth exemplary embodiment of the present invention;

FIG. 30 is a diagram referred to in the research paper described in the fourth exemplary embodiment of the present invention;

FIG. 33 is a diagram referred to in the research paper described in the fourth exemplary embodiment of the present invention;

FIG. 34 is a diagram referred to in the research paper described in the fourth exemplary embodiment of the present invention;

FIG. 36 is a diagram referred to in the research paper described in the fourth exemplary embodiment of the present invention;

FIG. 37 is a diagram referred to in the research paper described in the fourth exemplary embodiment of the present invention;

FIG. 44 is a diagram referred to in the research paper described in the fourth exemplary embodiment of the present invention;

FIG. 51 is a diagram referred to in the research paper described in the fourth exemplary embodiment of the present invention;

FIG. 52 is a diagram referred to in the research paper described in the fourth exemplary embodiment of the present invention;

FIG. 55 is a diagram referred to in the research paper described in the fourth exemplary embodiment of the present invention;

FIG. 60 is a diagram referred to in the research paper described in the fourth exemplary embodiment of the present invention;

FIG. 62 is a diagram referred to in the research paper described in the fourth exemplary embodiment of the present invention;

FIG. 64 is a diagram referred to in the research paper described in the fourth exemplary embodiment of the present invention;

FIG. 66 is a diagram referred to in the research paper described in the fourth exemplary embodiment of the present invention;

FIG. 67 is a diagram referred to in the research paper described in the fourth exemplary embodiment of the present invention; and FIG. 68 is a diagram referred to in the research paper described in the fourth exemplary embodiment of the present invention.

EXEMPLARY EMBODIMENTS

First Exemplary Embodiment

Figure 1:
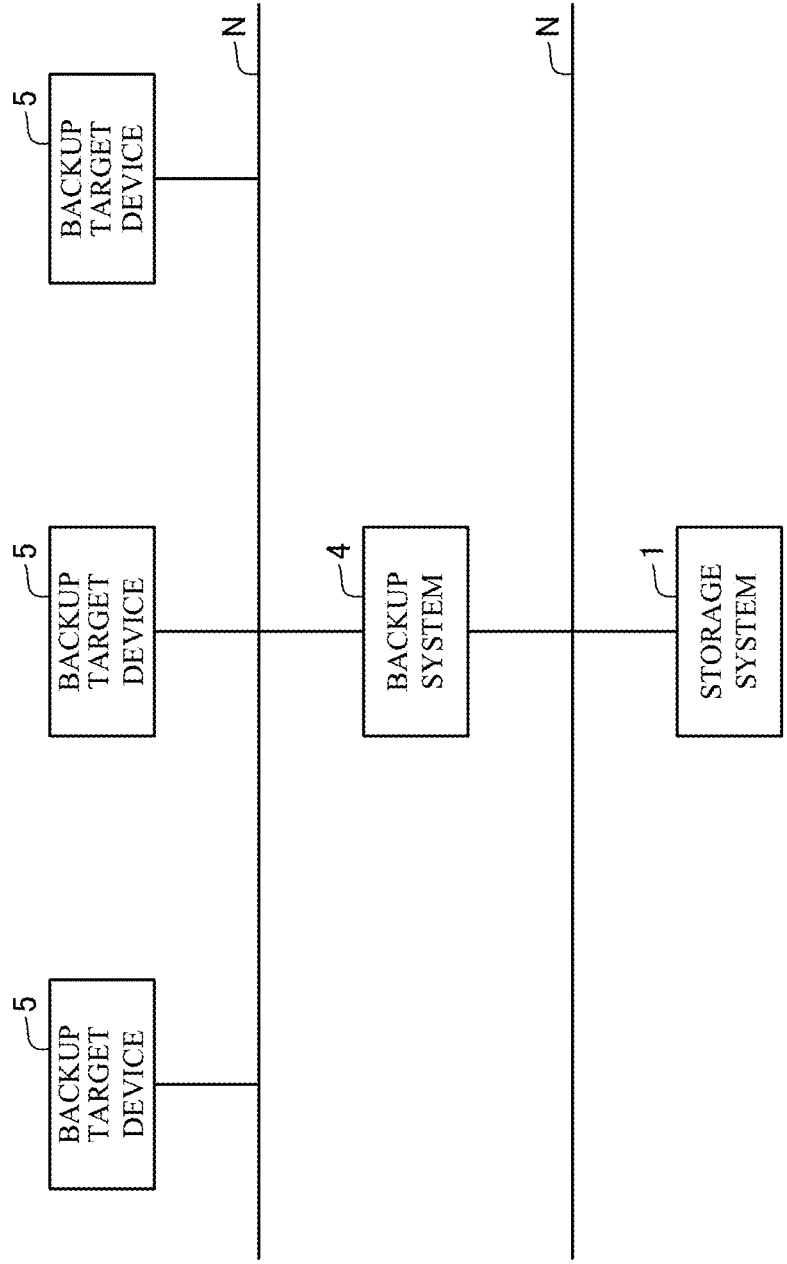
FIG. 1 is a block diagram showing an example of the configuration of the whole system including a storage system in a first exemplary embodiment of the present invention.
Figure 2:
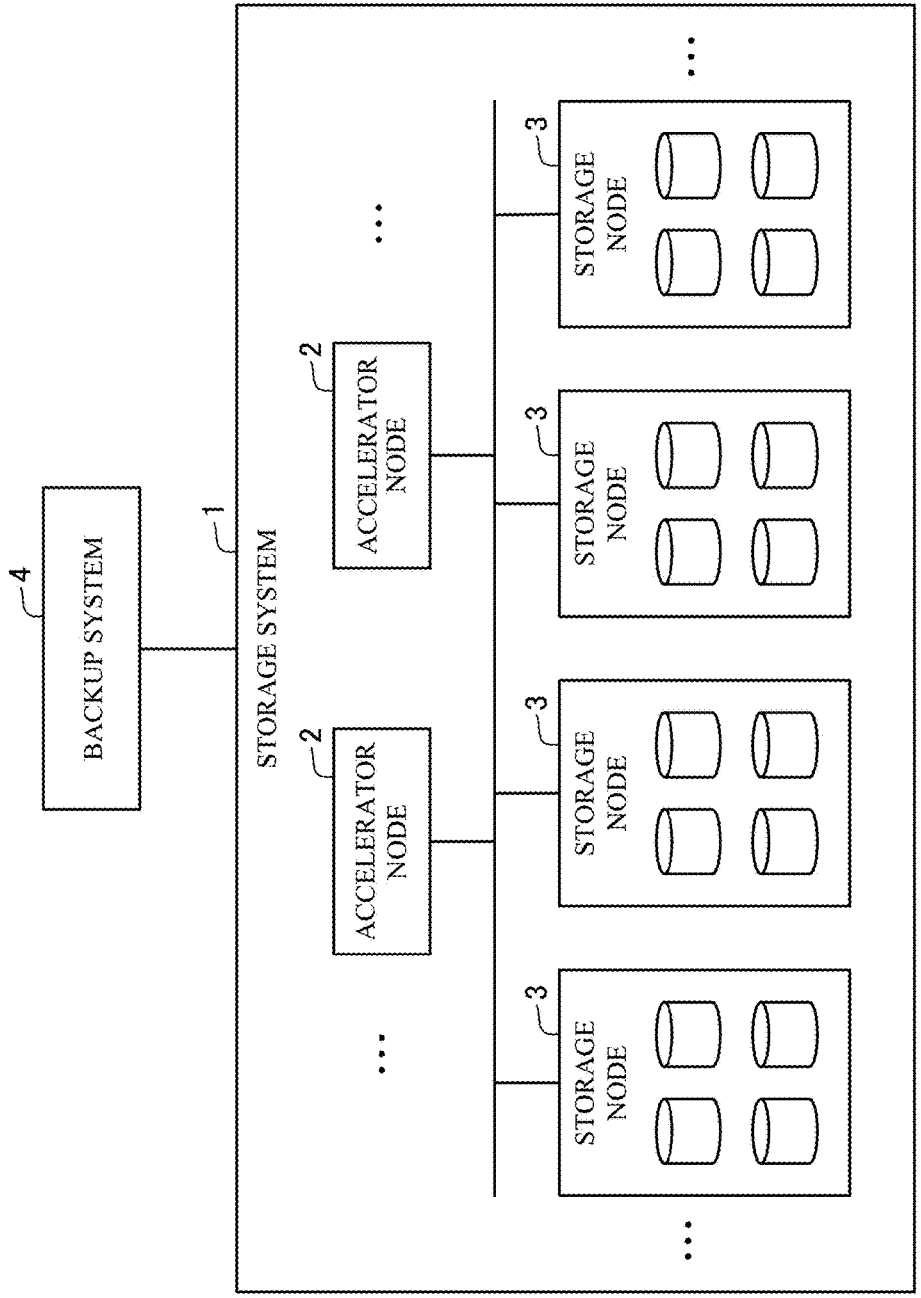
FIG. 2 is a block diagram showing an example of the overview of the configuration of the storage system in the first exemplary embodiment of the present invention.
Figure 3:
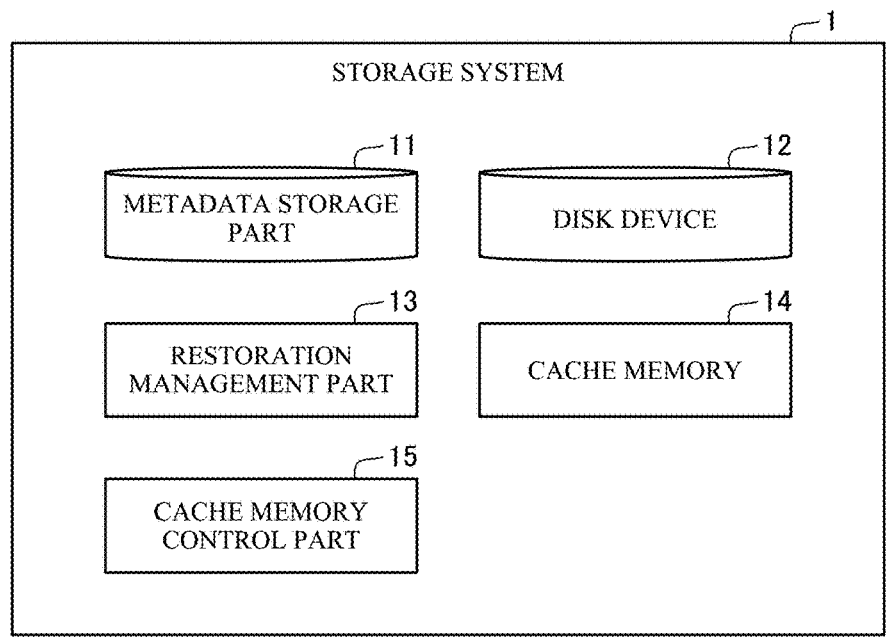
FIG. 3 is a functional block diagram showing an example of the configuration of the storage system in the first exemplary embodiment of the present invention.
Figure 4:
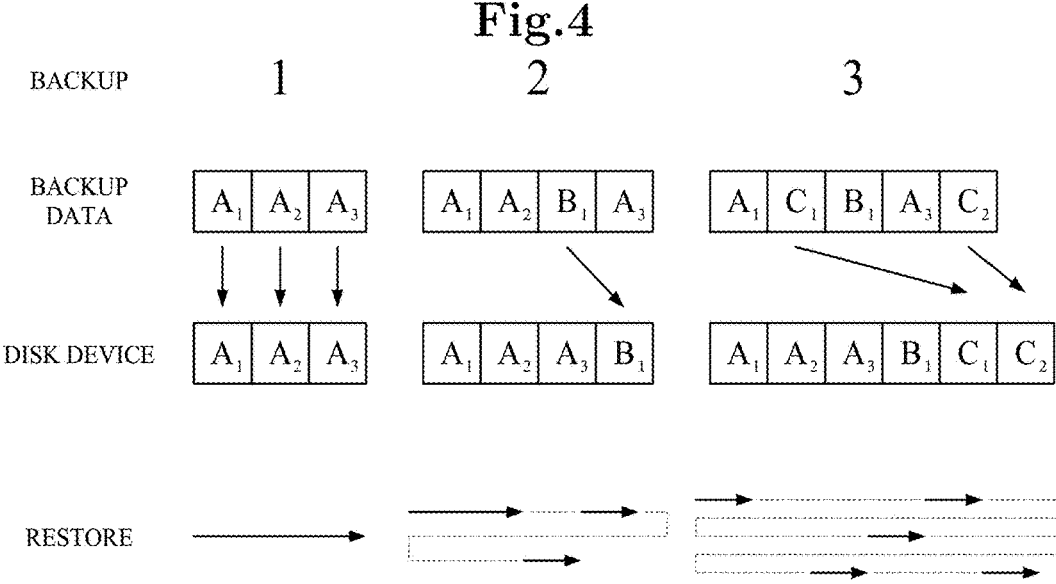
FIG. 4 is a diagram for describing data stored by a disk device shown in FIG. 3.
Figure 5:
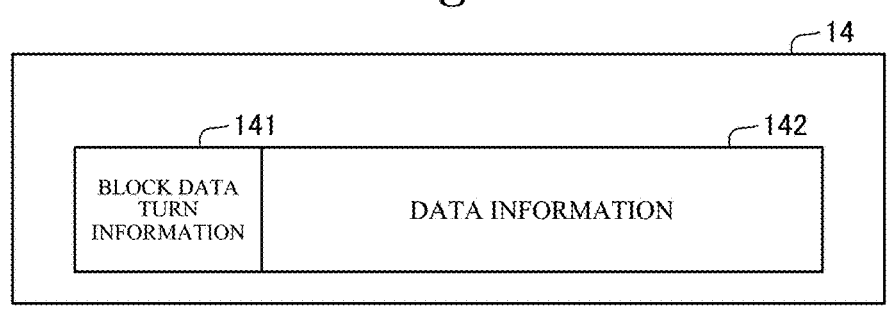
FIG. 5 is a diagram for describing data stored by a cache memory shown in FIG. 3.
Figure 6:
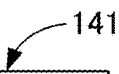
FIG. 6 is a diagram showing an example of the configuration of block data turn information shown in FIG. 5.
Figure 7:
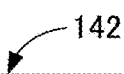
FIG. 7 is a diagram showing an example of the configuration of data information shown in FIG. 5.
Figure 8:
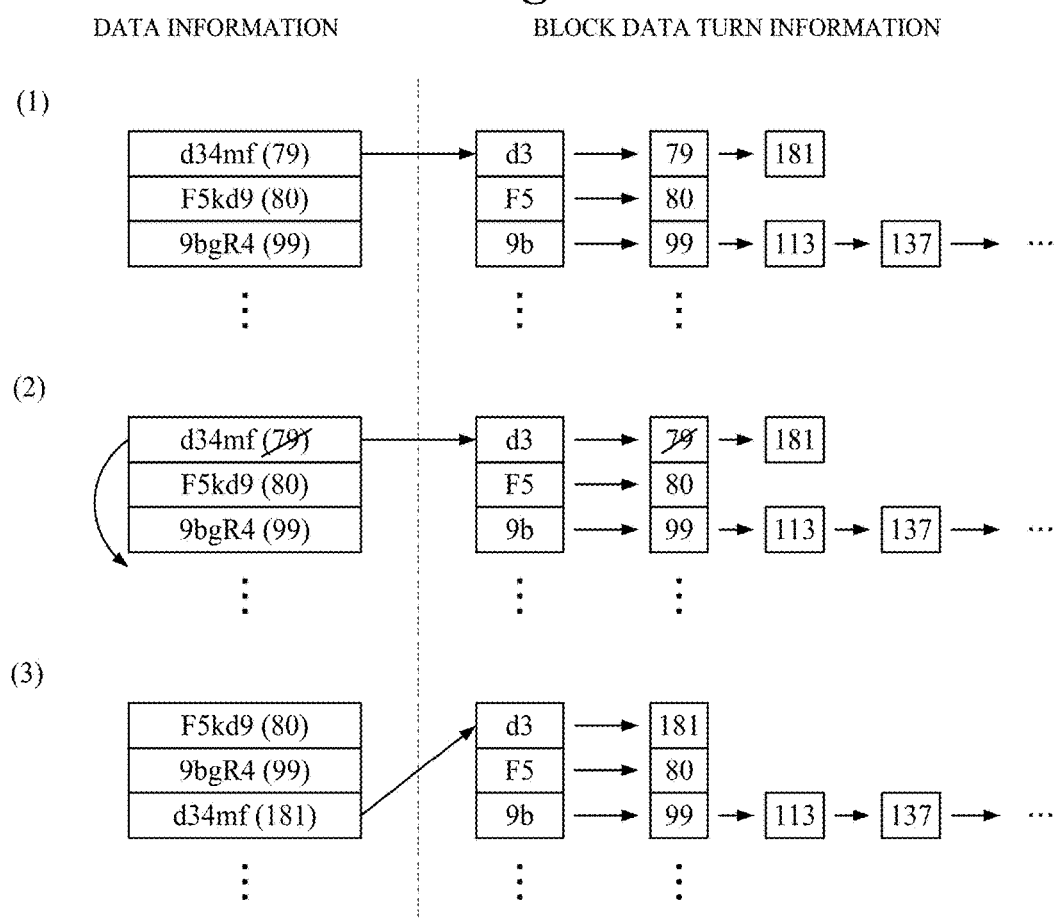
FIG. 8 is a diagram for describing the appearance of a data retrieval process executed by a restoration management part shown in FIG. 3.
Figure 9:
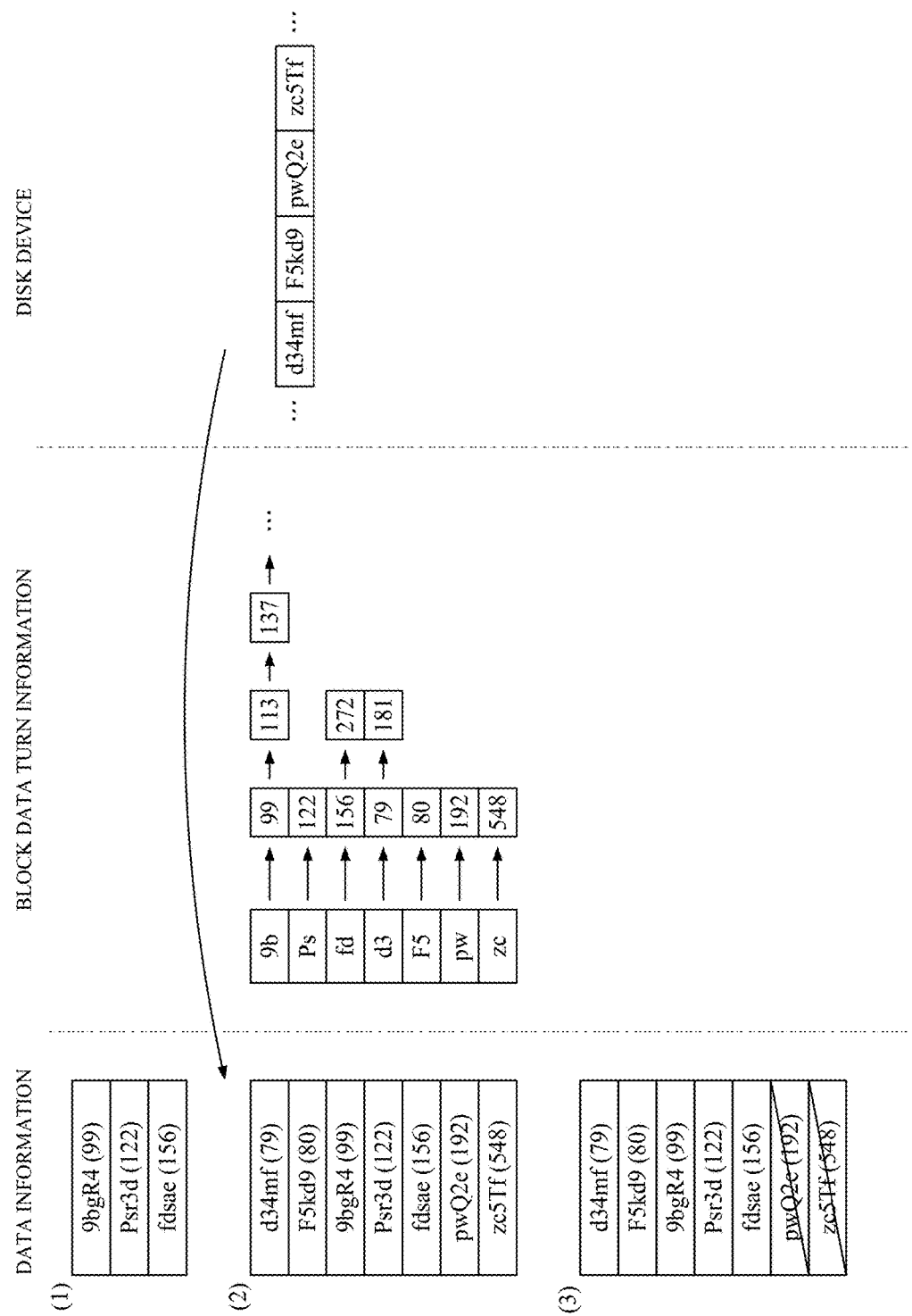
FIG. 9 is a diagram for describing the appearance of the data retrieval process executed by the restoration management part shown in FIG. 3.
Figure 10:
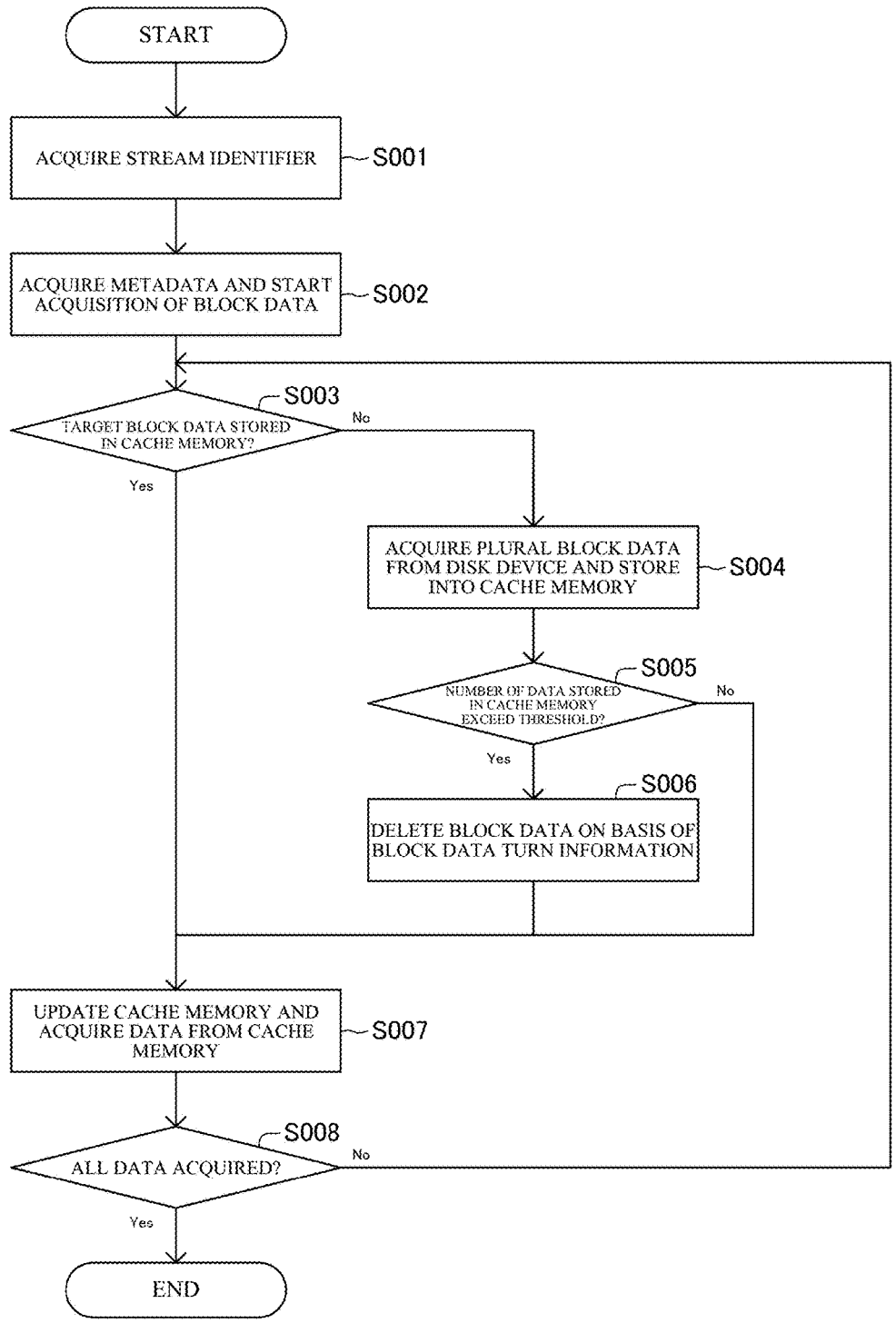
FIG. 10 is a flowchart showing the operation of a retrieval process executed by the storage system shown in FIG. 3.

A first exemplary embodiment of the present invention will be described referring to FIGS. 1 to 10. FIG. 1 is a block diagram showing the configuration of the whole system including a storage system 1. FIG. 2 is a block diagram showing the overview of the storage system 1. FIG. 3 is a functional block diagram showing an example of the configuration of the storage system 1. FIG. 4 is a diagram for describing data stored by a disk device 12 shown in FIG. 3. FIG. 5 is a diagram for describing data stored by a cache memory 14 shown in FIG. 3. FIG. 6 is a diagram showing an example of the configuration of block data turn information 141 shown in FIG. 5. FIG. 7 is a diagram showing an example of the configuration of data information 142 shown in FIG. 5. FIGS. 8 and 9 are diagrams for describing the appearance of a data retrieval process executed by a restoration management part 13 shown in FIG. 3. FIG. 10 is a flowchart showing the operation of a retrieval process executed by the storage system 1 shown in FIG. 3.

In the first exemplary embodiment of the present invention, the storage system 1 which has a deduplication function and inhibits decrease of retrieval performance by efficiently using the cache memory 14 will be described. The storage system 1 in this exemplary embodiment, when performing restoration, controls the storage state of block data in the cache memory 14 by using metadata indicating the order of retrieval of block data, which will be described later. By executing such control, the storage system 1 can select block data which should be left in the cache memory 14 (deleted from the cache memory 14) depending on the next turn of each block data stored by the cache memory 14 to be retrieved during restoration, which will be described later. As a result, the risk of deleting block data stored by the cache memory 14 before reusing and the risk of keeping block data which is not necessary at all stored in the cache memory 14 can be reduced, and decrease of retrieval performance can be inhibited.

This exemplary embodiment shows a specific example of a storage device and so on disclosed in Supplementary Notes described later. Below, a case where the storage system 1 is configured by a plurality of server computers connected with each other will be described. However, the storage system 1 according to the present invention is not limited to being configured by a plurality of computers, and may be configured by one computer.

As shown in FIG. 1, the storage system 1 according to the present invention is connected with a backup system 4 which controls a backup process and so on via a network N. The backup system 4 acquires backup target data (data which is the target to be written) stored in a backup target device 5 connected to the backup system 4 via the network N, and requests the storage system 1 to store the data. Thus, the storage system 1 stores, for a backup, the backup target data requested to be stored. Further, the backup system 4 transmits a stream identifier which gives an instruction for restoration of data, to the storage system 1. Thus, the storage system 1 starts restoration to recover a file indicated by the stream identifier.

As shown in FIG. 2, the storage system 1 in this exemplary embodiment employs a configuration in which a plurality of server computers are connected with each other. To be specific, the storage system 1 includes an accelerator node 2 which is a server computer controlling a storage reproduction operation in the storage system 1, and a storage node 3 which is a server computer including a storage device storing data. The number of the accelerator nodes 2 and the number of the storage nodes 3 are not limited to those shown in FIG. 2, and the system may be configured by connecting more nodes 2 and more nodes 3.

Furthermore, the storage system 1 in this exemplary embodiment is a content-addressable storage system which divides data and makes the data redundant to distribute and store the data into a plurality of storage devices and, by a unique content address set in accordance with the content of the stored data, specifies a storage position where the data is stored.

Therefore, each block data stored by the storage system 1 can be identified by using a content address. To be specific, a content address of each block data is calculated on the basis of the content of each block data. For example, a content address is calculated by using a hash function such as 160-bit SHA1.

Below, the configuration and function of the storage system 1 will be described assuming the storage system 1 is one system. In other words, the configuration and function of the storage system 1 to be described below may be included in either the accelerator node 2 or the storage node 3. Meanwhile, the storage system 1 is not necessarily limited to including the accelerator node 2 and the storage node 3 as shown in FIG. 2, and may have any configuration. For example, the storage system 1 may be configured by one computer. Besides, the storage system 1 is not limited to a content-addressable storage system, and can be any storage system as far as it has a deduplication function.

FIG. 3 shows the configuration of the storage system 1 in this exemplary embodiment. The storage system 1 is configured by server computers and includes an arithmetic device (not shown in the drawings) which executes a given arithmetic process, a metadata storage part 11 (a retrieval turn information storage part; Metadata Storage), a disk device 12 (a data storage part; Physical disk drive), and a cache memory 14 (a temporary data storage part; Forward Knowledge Cache). Moreover, the storage system 1 includes a restoration management part 13 (a data retrieval control part; Restore Manager) and a cache memory control part 15 (a temporary data control part), which are structured by installation of a program into the arithmetic device.

In fact, the components included by the storage system 1 described above are configured by an arithmetic device such as a CPU (Central Processing Unit) and a storage device such as a hard disk drive which are included by each of the accelerator nodes 2 and the storage nodes 3 shown in FIG. 2.

The metadata storage part 11 is a storage device such as a hard disk drive. The metadata storage part 11 associates metadata including information such as the order of block data to be retrieved at the time of restoration of data and the address of a block of actual data with a stream identifier and stores them.

Metadata mentioned above is stored into the metadata storage part 11 at the time of storing block data into the disk device 12 through a backup process, for example. In general, when restoration is performed, block data are retrieved in the same order as the block data have been written. Therefore, by storing metadata as described above so as to be associated with a stream identifier, it is possible when performing restoration to retrieve block data in the same order as the block data have been written.

Further, the storage system 1 in this exemplary embodiment uses metadata described above when executing control of the storage state of block data in the cache memory 14 (for example, deleting block data stored by the cache memory 14), which will be described later. In other words, the storage system 1 in this exemplary embodiment has a cache eviction policy (a policy for deletion of data from a cache) based on metadata described above.

The disk device 12 is a storage device such as a hard disk drive. The disk device 12 in this exemplary embodiment stores block data in the deduplicated state.

Further, as stated above, the storage system 1 in this exemplary embodiment is a content-addressable storage system. Therefore, the storage system 1 stores data into the disk device 12 by using a content address.

Now, an example of a process executed when the disk device 12 stores block data will be described. For example, when the storage system 1 is requested to write a certain file, the storage system 1 divides the file requested to be written into block data by a given amount (for example, 64 KB). Then, on the basis of the data content of the block data obtained by division, the storage system 1 calculates a unique hash value representing the data content. After that, the storage system 1 checks by using the calculated hash value whether or not block data having the hash value is already stored in the disk device 12. Then, in a case where such block data is not stored in the disk device 12, the storage system 1 writes the block data into the disk device 12.

The disk device 12 in this exemplary embodiment stores block data written in the above manner. In other words, the disk device 12 stores block data in a way that new block data is added backward in the disk as needed. To be specific, for example, referring to FIG. 4, for making a backup of data $A_1$, $A_2$ and $A_3$, the block data are written into the disk device 12 in order of $A_1$, $A_2$ and $A_3$. Then, for making a backup of data $A_1$, $A_2$, $B_1$ and $A_3$ after the above process, the new data $B_1$ is written subsequent to the data $A_1$, $A_2$ and $A_3$ in the disk device 12. Then, for further making a backup of data $A_1$, $C_1$, $B_1$, $A_3$ and $C_2$ after the above process, the new data $C_1$ and $C_2$ are written subsequent to the data $A_1$, $A_2$, $A_3$ and $B_1$ in the disk device 12.

Thus, the disk device 12 stores block data written by a popular method employed for making a deduplicated backup. The conditions for writing block data into the disk device 12, the content of block data to be written and so on may be changed when needed. For example, the disk device 12 may be configured so that a common rate, which represents the rate of a common portion between a plurality of sequential block data configuring a given range in writing target data of divided block data and a plurality of block data of a given range already stored sequentially in the disk device 12, is detected and the block data are written depending on the detected common rate.

The restoration management part 13 performs restoration of data on the basis of a stream identifier received from the backup system 4. In other words, the restoration management part 13 receives a stream identifier giving an instruction for restoration of data from the backup system 4, thereby recovering a file indicated by the stream identifier.

To be specific, upon receiving a stream identifier from the backup system 4, the restoration management part 13 acquires part of corresponding metadata from the metadata storage part 11. Moreover, as the restoration progresses, the restoration management part 13 acquires additional metadata from the metadata storage part 11. Thus, the restoration management part 13 acquires metadata from the metadata storage part 11 in accordance with how the restoration progresses. Meanwhile, the restoration management part 13 may acquire all the metadata at one time.

Then, the restoration management part 13 acquires block data stored by the storage system 1 on the basis of the order of retrieval of block data which is indicated by the acquired metadata. To be specific, in a case where the cache memory 14 stores target block data to be acquired, the restoration management part 13 acquires the target block data from the cache memory 14. On the other hand, in a case where the cache memory 14 does not store target block data to be acquired, the restoration management part 13 gives an instruction for loading data in the form of chunks of a constant or variable size from the disk device 12 to the cache memory 14. In other words, in a case where the cache memory 14 does not store target block data to be acquired, sequential block data of a given size written in sequential areas in the disk device 12 (for example, four sequential block data) are loaded into the cache memory 14. Then, the restoration management part 1 acquires the target block data from the cache memory 14.

Further, the restoration management part 13 in this exemplary embodiment causes the cache memory 14 to store block data turn information 141 to be described later on the basis of metadata acquired from the metadata storage part 11. As described later, the cache memory control part 15 executes control of the storage state of block data in the cache memory 14 by using the block data turn information 141. The details of the block data turn information 141 and the cache memory control part 15 will be described later.

The cache memory 14 is a storage device such as a semiconductor memory. Referring to FIG. 5, the cache memory 14 stores, for example, block data turn information 141 which is information based on metadata and data information 142 which indicates block data acquired from the disk device 12.

The block data turn information 141 is information generated on the basis of metadata as described above. The block data turn information 141 is, for example, information which shows, for each block data, a turn of block data to be retrieved included in metadata retrieved by the restoration management part 1. As shown in FIG. 6, the block data turn information 141 has a structure in which a block data identifier for identifying block data is associated with turn information showing a turn of the block data to be retrieved.

A block data identifier is information for identifying block data. A block data identifier is, for example, part (a short hash) of a hash value calculated on the basis of the data content of block data. Meanwhile, a block data identifier may be the entire hash value.

Turn information is information showing a turn to be retrieved of block data indicated by a block data identifier which is associated with the turn information and stored. To be specific, turn information represents, for example, a turn of block data to be retrieved, which is after a turn of block data being currently retrieved by the restoration management part 1. For example, in a case where the restoration management part 13 is retrieving 78th block data, turn information represents a turn after 79th (or after 78th) among turns of target block data to be retrieved.

Turn information does not necessarily need to accurately indicate a turn of each block data to be retrieved. In other words, turn information just needs to indicate a rough turn in a series of retrieval processes started in accordance with a stream identifier. Therefore, turn information may be, for example, information showing a turn of a divided section obtained by dividing a series of retrieval processes into a plurality of sections by a given size.

The data information 142 is information showing block data acquired from the disk device 12. For example, as shown in FIG. 7, the data information 142 is structured as a standard map in which a content address (for example, as described above, a hash value calculated on the basis of the data content of block data) is key and data is value.

Further, the data information 142 in this exemplary embodiment includes next turn information which is information about a turn of target block data to be retrieved next time in retrieval of block data started in accordance with a stream identifier. For example, a first row in FIG. 7 shows that a turn of block data with a content address "d34mf79" to be retrieved next time is "79." In other words, it is found from the first row in FIG. 7 that a turn of the block data with the content address "d34mf79" to be retrieved next time is 79th in a series of retrieval processes started in accordance with a stream identifier. Next turn information included in the data information 142 is obtained, for example, on the basis of block data turn information 141.

Further, the data information 142 in this exemplary embodiment is, for example, reordered (sorted) in accordance with next turn information. To be specific, the data information 142 is reordered in decreasing order on the basis of next turn information. In other words, the data information 142 is reordered in order of earlier turns to be retrieved next time and stored.

The cache memory control part 15 executes control of the storage state of block data in the cache memory 14 by using the block data turn information 141 stored by the cache memory 14. To be specific, in a case where the cache memory 14 stores (or is storing) a predetermined threshold value or more number of block data, the cache memory control part 15 deletes block data whose turn to be retrieved is far from a turn of block data to be retrieved by the restoration management part 13.

Thus, the cache memory control part 15 deletes block data stored by the cache memory 14 in accordance with a degree of distance from a turn to be retrieved of target block data to be retrieved by the restoration management part 13. The cache memory control part 15 executes such a process, thereby preventing the cache memory 14 from becoming full.

The storage system 1 has the metadata storage part 11, the disk storage part 12, the restoration management part 13, the cache memory 14 and the cache memory control part 15, which have configurations as described above, for example.

Subsequently, the details of a process executed when the restoration management part 13 acquired block data will be described referring to FIGS. 8 and 9.

First, referring to FIG. 8, a case where the cache memory 14 stores target block data to be acquired will be described. To be specific, for example, a case where the restoration management part 13 is acquiring block data with a content address "d34mf" as 79th retrieval will be described.

Referring to (1) in FIG. 8, it is found that the cache memory 14 stores the block data with the content address "d34mf." Thus, the restoration management part 13 retrieves the target block data from the cache memory 14. Further, with the retrieval of the block data by the restoration management part 13, the cache memory control part 15 updates the block data turn information 141 and the data information 142 (see (2) in FIG. 8). To be specific, referring to FIG. 8, it is found that the block data with the content address "d34mf" is scheduled to be retrieved 181st after retrieved 79th. Therefore, the cache memory control part 15 executes a process of updating a turn of the block data with the content address "d34mf" to be retrieved next time from 79th to 181st on the block data turn information 141 and the data information 142. Moreover, the cache memory control part 15 sorts the data information 142 in decreasing order on the basis of the updated turn. As a result, as shown in (3) in FIG. 8, the block data with the content address "d34mf" moves to a position below block data with a content address "9bgR4." Thus, as the restoration management part 13 retrieves block data from the cache memory 14, the block data turn information 141 and the data information 142 are updated.

For example, a case where certain block data has no turn to be retrieved next time (the block data is not scheduled to be retrieved next time) after the block data is retrieved from the cache memory 14 is anticipated. The cache memory control part 15 may be configured to delete the block data from the cache memory 14 in such a case.

Next, referring to FIG. 9, a case where the cache memory 14 does not store target block data to be retrieved will be described. To be specific, for example, a case where the restoration management part 13 is acquiring the block data with the content address "d34mf" as 79th retrieval will be described.

Herein, the threshold of the number of block data stored by the cache memory 14 is 5, for example. In other words, when the number of block data stored by the cache memory 14 exceeds five, the cache memory control part 15 deletes any of the block data stored by the cache memory 14 so that the number of the block data stored by the cache memory 14 becomes five.

Referring to (1) in FIG. 9, it is found that the cache memory 14 does not store the block data with the content address "d34mf." Thus, the restoration management part 13 gives an instruction for loading, for example, four block data written in sequential areas starting from the block data with the content address "d34mf" from the disk device 12 into the cache memory 14. As a result, in the case shown in FIG. 9, block data with content addresses "F5kd9," "pwQ2e" and "zc5Tf" are retrieved together with the block data with the content address "d34mf."

As a result of the retrieval of the block data from the disk device 12, seven block data are stored in the cache memory 14 ((2) in FIG. 9). Thus, the cache memory control part 15 deletes any of the block data so that the number of the block data stored by the cache memory 14 becomes five. In the case shown in FIG. 9, block data whose turn to be retrieved is far from a turn (79th) to be retrieved of the target block data to be retrieved by the restoration management part 13 are the block data "pwQ2e" and "zc5Tf." Thus, the cache memory control part 15 deletes the block data "pwQ2e" and "zc5Tf." Consequently, five block data are left in the cache memory 14 ((3) in FIG. 9).

After that, the restoration management part 13 and the cache memory control part 15 executes the process described referring to FIG. 8, thereby acquiring block data from the cache memory 14 and also updating the block data turn information 141 and the data information 142.

That is the description of the example executed when the restoration management part 13 acquires block data. Next, referring to FIG. 10, the operation when the storage system 1 restores data will be described.

Referring to FIG. 10, the restoration management part 13 of the storage system 1 receives a stream identifier which gives an instruction for restoration of data, from the backup system 4 (step S001).

The restoration management part 13 acquires metadata relating to a file to be recovered, from the metadata storage part 11 (step S002). Then, the restoration management part 13 starts acquisition of block data stored by the storage system 1 in accordance with the order of retrieval of block data which is indicated by the acquired metadata.

To be specific, in a case where target block data to be acquired is stored in the cache memory 14 (step S003: Yes), the restoration management part 13 acquires the target block data from the cache memory 14 (step S007). Further, the cache memory control part 15 updates the cache memory 14. In other words, the cache memory control part 15 executes a process of updating the block data turn information 141 and the data information 142. Moreover, the cache memory control part 15 sorts the data information 142 in decreasing order on the basis of the updated order.

Then, in a case where all block data indicated by the metadata are acquired through the block data acquisition described above (step S008: Yes), the storage system 1 completes the data restoration and ends the process. On the other hand, in a case where block data to be acquired is still left (step S008: No), the restoration management part 13 continues acquisition of block data.

Meanwhile, in a case where target block data to be acquired is not stored in the cache memory 14 (step S003: No), the restoration management part 13 gives an instruction for loading, for example, four sequential block data from the disk device 12 into the cache memory 14 (step S004).

Then, in a case where the number of block data stored in the cache memory 14 exceeds a threshold as a result of the above processing step (step S005: Yes), the cache memory control part 15 executes control of the storage state of block data in the cache memory 14. In other words, the cache memory control part 15 deletes block data whose turn to be retrieved is far from a turn to be retrieved of the target block data to be retrieved by the restoration management part 13 on the basis of the block data turn information 151 (step S006).

After that, the processing step S007 described above is executed. In other words, the restoration management part 13 acquires the target block data from the cache memory 14, and the cache memory control part 15 updates the cache memory 14 (step S007). Also in a case where the number of block data stored by the cache memory 14 is not more than the threshold (step S005: No), the processing step S007 is executed in the same manner as described above.

Then, in a case where all block data indicated by the metadata are acquired through the block data acquisition described above (step S008: Yes), the storage system 1 completes the data restoration and ends the process. On the other hand, in a case where block data to be acquired is still left (step S008: No), the restoration management part 13 continues acquisition of block data.

Thus, the storage system 1 in this exemplary embodiment has the metadata storage part 11 and the cache memory control part 15. With such a configuration, the cache memory control part 15 can execute control of the storage state of block data in the cache memory 14 by using the block data turn information generated on the basis of metadata stored by the metadata storage part 11. In other words, the cache memory control part 15 can delete block data whose turn of retrieval is far from a turn to be retrieved of target block data to be retrieved by the restoration management part 13 on the basis of the block data turn information. As a result, it is possible to reduce the risk of deleting block data stored by the cache memory 14 before reusing, and the risk of keeping block data which is not necessary at all stored in the cache memory 14. Consequently, it is possible to decrease the frequency of retrieval of duplicates block data from the disk device 12, and it is possible to inhibit decrease of retrieval performance caused by block data which appears many times in a single stream. In other words, it is possible to realize the storage system 1 which can solve the problem that it is difficult to inhibit decrease of retrieval performance.

In this exemplary embodiment, the cache memory 14 stores the block data turn information 141. However, the block data turn information 141 may be stored by the cache memory 14 as necessary, for example.

Second Exemplary Embodiment

Next, in a second exemplary embodiment of the present invention, a storage system 6 which rewrites duplicated block data depending on the rate of a common portion between a plurality of sequential block data in writing target data and a plurality of block data already stored sequentially in the disk device 12 will be described.

Figure 11:
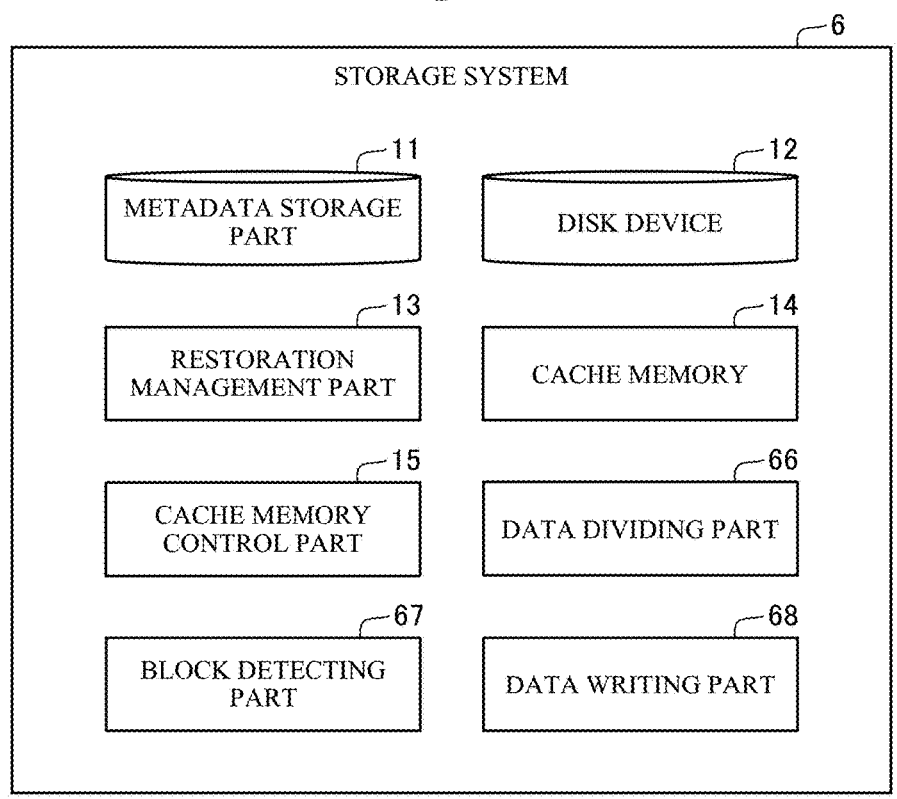
FIG. 11 is a functional block diagram showing an example of the configuration of a storage system in a second exemplary embodiment of the present invention.

Referring to FIG. 11, the storage system 6 in this exemplary embodiment has a configuration similar to that of the storage system 1 described in the first exemplary embodiment. Moreover, the storage system 6 includes, in addition to the components described above, a data dividing part 66, a block detecting part 67, and a data writing part 68, which are structured by installation of a program into the arithmetic device. The description of the components described in the first exemplary embodiment will be omitted.

As in the first exemplary embodiment, the storage system 6 has a function of storing data into the disk device 12 by using a content address. To be specific, as described later, the storage system 6 stores data by dividing and distributing the data and specifying a storage position with a content address. A data writing process using a content address in the storage system 6 will be described below referring to FIGS. 12, 13 and 16.

Figure 12:
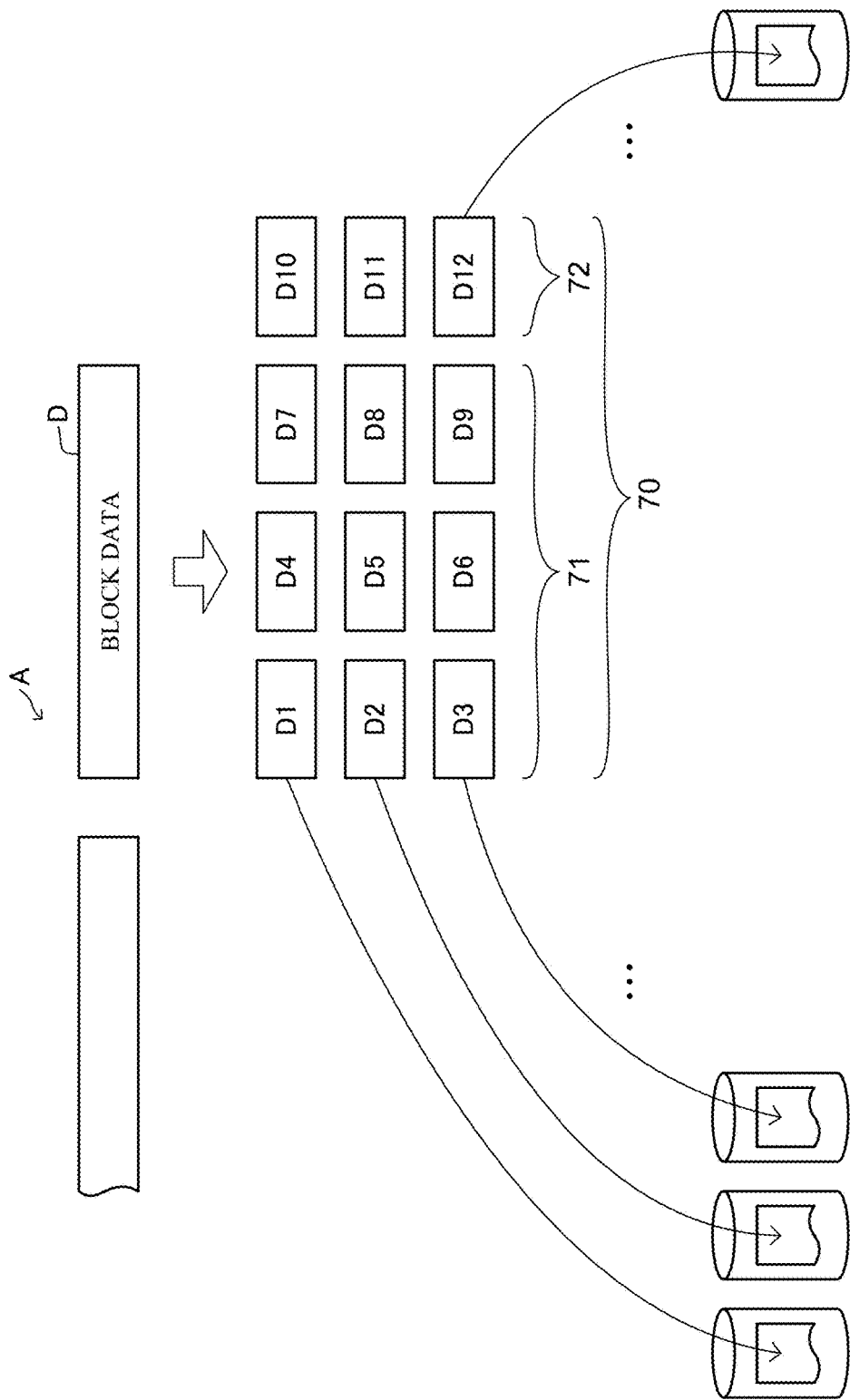
FIG. 12 is an explanatory diagram for describing an example of the appearance of a data writing process in the storage system disclosed in FIG. 11.
Figure 13:
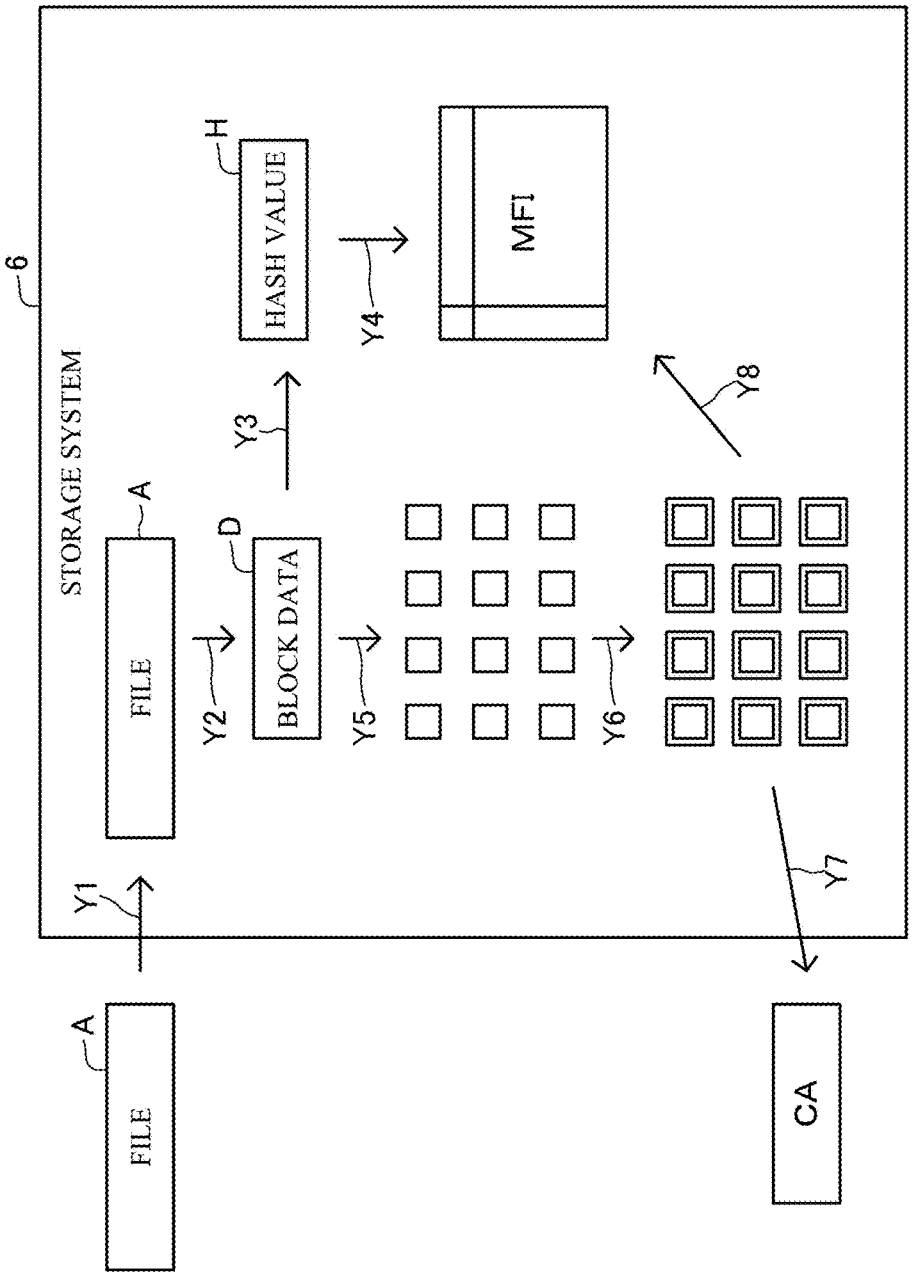
FIG. 13 is an explanatory diagram for describing an example of the appearance of the data writing process in the storage system disclosed in FIG. 11.

First, the storage system 6 accepts an input of a file A requested to be written as shown by an arrow Y1 in FIGS. 12 and 13. Then, the data dividing part 66 divides the file A into block data D by a predetermined volume (for example, 64 KB) as shown by an arrow Y2 in FIGS. 12 and 13 (step S101 of FIG. 16).

Subsequently, on the basis of the data content of the division block data D, the block detecting part 67 calculates a unique hash value H representing the data content (an arrow Y3 of FIG. 13). For example, the hash value H is calculated from the data content of the block data D by using a preset hash function.

Subsequently, by using the hash value H of the block data D of the file A, the block detecting part 67 checks whether or not the block data D is already stored (step S102 of FIG. 16). To be specific, firstly, in a case where the block data D is already stored, the hash value H thereof and a content address CA representing a storage position thereof are associated and registered in an MFI (Main Fragment Index) file. Therefore, in a case where the hash value H of the block data D calculated before storage exists in the MFI file, the block detecting part 67 can judge that block data D of the same content is already stored (an arrow Y4 of FIG. 13, Yes at step S103 of FIG. 16). In this case, a content address CA associated with the hash value H which is registered in the MFI and which coincides with the hash value H of the block data D before storage is acquired from the MFI file. Then, this content address CA is returned as the content address CA of the block data D requested to be written.

Figure 16:
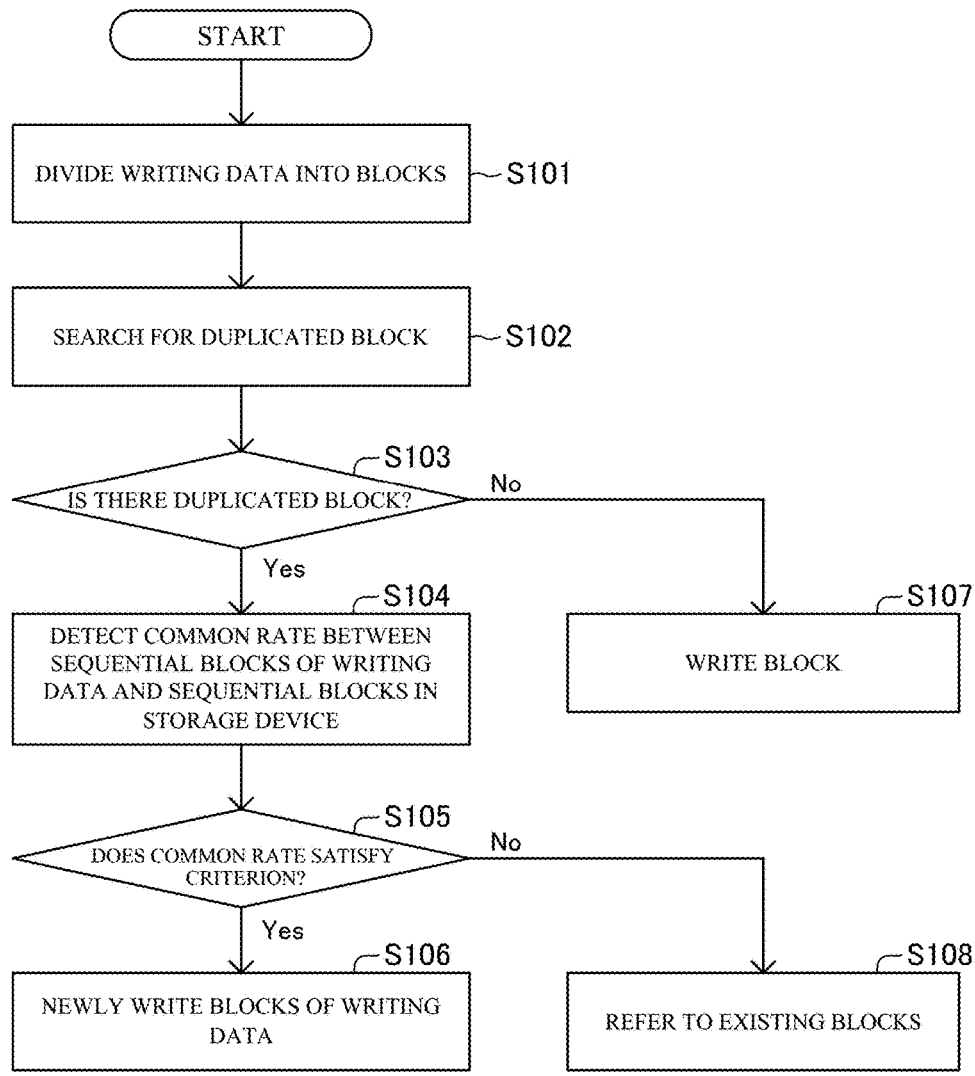
FIG. 16 is a flowchart showing an example of the operation of the data writing process in the storage system disclosed in FIG. 11.

Then, the data writing part 68 uses the already stored data to which the returned content address CA refers, as the block data D requested to be written (step S108 of FIG. 16). In other words, designating an area to which the returned content address CA refers as the destination of storage of the block data D requested to be written is considered to be equivalent to storing the block data D requested to be written. Consequently, the need for actually storing the block data D requested to be written into the disk device 12 is eliminated.

Further, when the block detecting part 67 judges that the block data D requested to be written is not stored yet (No at step S103 of FIG. 16), the data writing part 68 writes the block data D requested to be written in the following manner (step S107 of FIG. 16). First, the data writing part 68 compresses the block data D requested to be written and, as shown by an arrow Y5 of FIG. 13, divides the data into a plurality of fragment data by a predetermined volume. For example, the data writing part 68 divides the data into nine pieces of fragment data (division data 71) as shown by reference numerals D1 to D9 in FIG. 12. Moreover, the data writing part 68 generates redundant data so that the original block data can be restored even when some of the division fragment data are lost, and adds the redundant data to the division fragment data 71. For example, the data writing part 68 adds three pieces of fragment data (redundant data 72) as shown by reference numerals D10 to D12 in FIG. 12. Thus, the data writing part 68 generates a data set 70 that includes twelve pieces of fragment data configured by the nine pieces of division data 71 and the three pieces of redundant data 72.

Subsequently, the data writing part 68 distributes and stores the fragment data configuring the data set generated in the abovementioned manner into storage areas formed on a storage device (the disk device 12), respectively. For example, in the case of generating the twelve pieces of fragment data D1 to D12 as shown in FIG. 12, the data writing part 68 stores the fragment data D1 to D12 one by one into data storage files formed in a plurality of storage devices, respectively (refer to an arrow Y6 of FIG. 13).

Subsequently, the storage system 6 generates and manages a content address CA representing a storage position of the fragment data D1 to D12 stored in the abovementioned manner, that is, a storage position of the block data D to be restored from the fragment data D1 to D12. To be specific, the storage system 6 generates the content address CA by combining part (a short hash: for example, initial 8 B (bytes) of the hash value H) of the hash value H calculated on the basis of the content of the stored block data D with information representing a logical storage position. This content address CA is then returned to a file system in the storage system 6 (an arrow Y7 of FIG. 13). The storage system 6 associates identification information such as a file name of backup target data with the content address CA and manage them in the file system.

Further, each of the storage nodes 3 associates the content address CA of the block data D with the hash value H of the block data D and manages them in the MFI file. Thus, the content address CA is associated with the information specifying the file, the hash value H and so on and stored into the storage devices of the accelerator nodes 2 or the storage nodes 3.

When data requested to be written is written in the storage system 6 in the abovementioned manner, there is a case where a plurality of block data obtained by dividing the data are dispersed and stored in the disk device 12 as mentioned above. In this case, there is a fear that retrieval performance decreases, but the storage system 6 in this exemplary embodiment also has the following function in order to solve such a problem. Below, the function will be described in detail referring to FIGS. 14 to 16.

First, as stated above, the block detecting part 67 checks whether or not block data of the same content as block data obtained by dividing data A relating to a writing request is already stored in the disk device 12 (steps S101 and S102 of FIG. 16). In the example shown in FIG. 14, firstly, the block detecting part 67 determines block data 1 obtained by dividing the data A relating to the writing request, as a target block to be subjected to a storage process at this moment, and checks whether or not block data of the same content as the target block exists in data B stored in the disk device 12.

Figure 14:
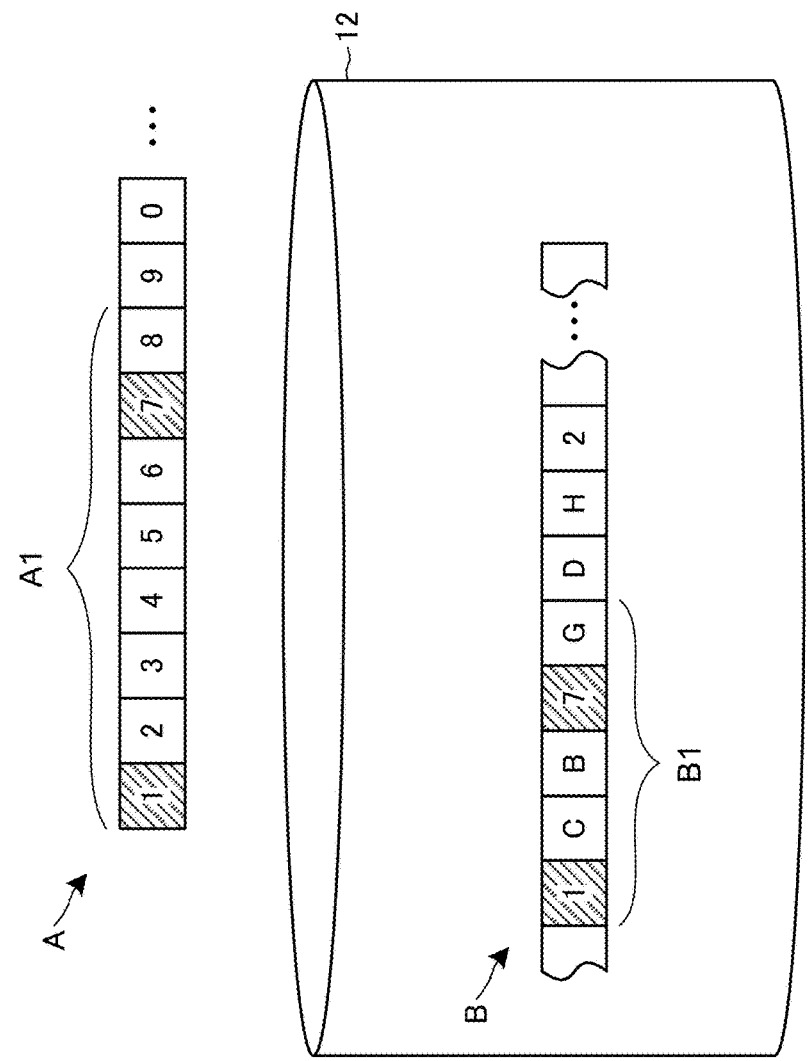
FIG. 14 is an explanatory diagram for describing an example of the appearance of the data writing process in the storage system disclosed in FIG. 11.
Figure 15:
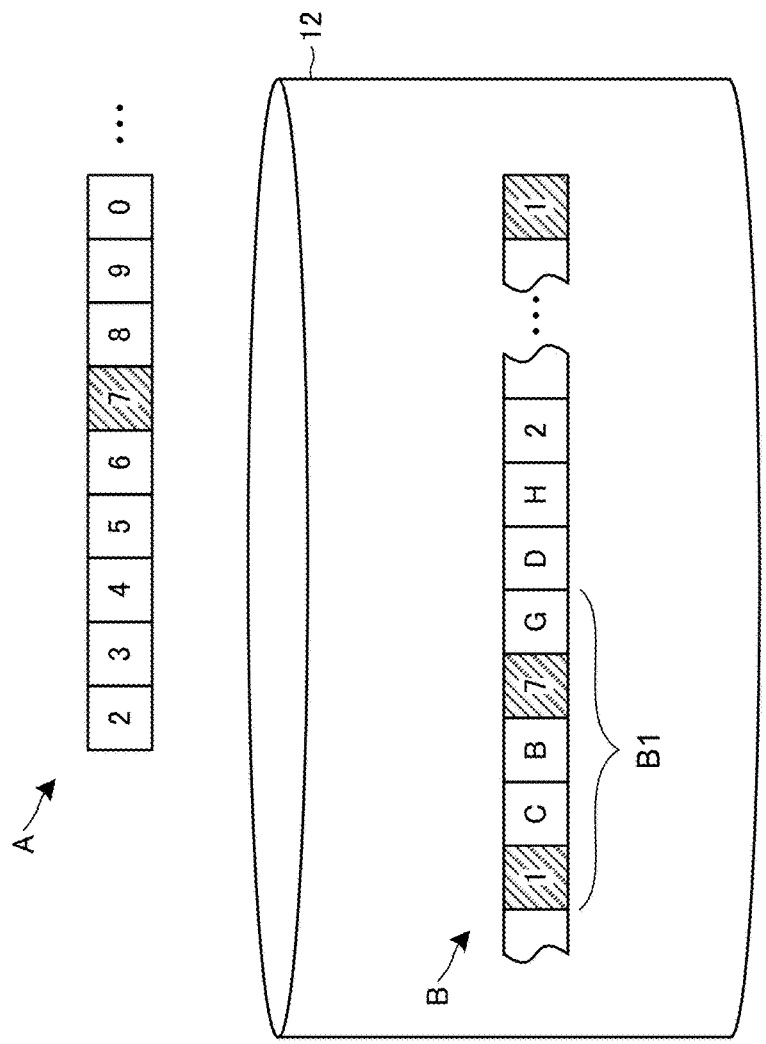
FIG. 15 is an explanatory diagram for describing an example of the appearance of the data writing process in the storage system disclosed in FIG. 11.

Then, when the block data 1 of the same content as the target block also exists in the disk device 12 as shaded in FIG. 14 (Yes at step S103 of FIG. 16), the block detecting part 67 acquires a plurality of block data which are sequential from the target block (the block data 1) in the data A relating to the writing request. In the example shown in FIG. 14, the block detecting part 67 acquires sequential block data A1 composed of block data 1 to 8 configuring a predetermined range in the data A relating to the writing request. The block detecting part 67 also acquires a plurality of block data stored in areas sequential from the block data 1 of the same content as the target block from among the data B stored in the disk device 12. That is to say, in the example shown in FIG. 14, the block detecting part 67 acquires sequential block data B1 composed of blocks 1, C, B, 7 and G configuring a predetermined range in the data B. The sequential block data A1 acquired from among the data A relating to the writing request are, for example, block data corresponding to a volume of 5 MB, and the sequential block data B1 acquired from among the data B in the disk device 12 are, for example, block data corresponding to a volume of 2 MB. Thus, the volumes of the sequential block data A1 and B1 may be different from each other, or may be the same.

Furthermore, the block detecting part 67 detects a common rate which represents the rate of a common portion between the respective block data included in the subsequent block data A1 acquired from among the data A relating to the writing request as described above and the respective block data included in the subsequent block data B1 acquired from the disk device 12 (step S104 of FIG. 16). For example, the block detecting part 67 detects the number of block data which coincide with each other by using a hash value of each of the block data as mentioned above. In the example shown in FIG. 14, two block data 1 and 7 are common in the sequential block data A1 and B1, and the block detecting part 67 detects a rate thereof as a common rate.

After that, the data writing part 68 writes block data in the following manner depending on the value of the common rate detected by the block detecting part 67 as stated above. First, when the common rate is larger than a preset value (for example, when larger than 50%) (No at step S105 of FIG. 16), the data writing part 68 executes a usual writing process on the target block (the block data 1) of the data A relating to the writing request. That is to say, because block data of the same content as the target block of the data A relating to the writing request is already stored in the disk device 12, the data writing part 68 executes a process of referring to the block data already stored in the disk device 12, and does not execute duplicated storage (step S105 of FIG. 16).

Thus, when the common rate between the sequential block data is large, it can be said that other block data following the target block of the data A relating to the writing request is also stored in an area in a predetermined range following the block data of the same content as the target block in the disk device 12. Therefore, the data writing part 68 executes a usual storing process on the target block as described above. After that, the data writing part 68 executes the same process as described above on the next target block, namely, block data 2 of the data A relating to the writing request. Consequently, at the time of retrieval of the data A relating to the writing request later, it is possible, by retrieving sequential block data of the already stored data B, to retrieve the data A with efficiency. Moreover, because elimination of duplicated storage of block data is also executed, it is possible to reduce the storage volume.

On the other hand, when the common rate is equal to or less than the preset value (for example, when equal to or less than 50%: may be 30% or other values) (Yes at step S105 of FIG. 16), the data writing part 68 newly writes the target block (the block data 1) of the data A relating to the writing request into the disk device 12 (step S106 of FIG. 16). That is to say, in the example shown in FIG. 14, because common blocks which coincide with each other are only two and the common rate is equal to or less than the preset value, the data writing part 68 writes the block data 1 into the disk device 12 as block data to be rewritten though the block data 1 is already stored in the disk device 12 (refer to FIG. 15). In the writing, the block data 1 to be rewritten is written at the end of an area in which data is already written within the disk device 12. After that, on the next block data 2 of the data A relating to the writing request, the processing steps S101 to S108 in FIG. 16 are executed in the same manner as mentioned above. For example, in a case where the block data 2 is not stored in the disk device 12 yet, the block data 2 is written into an area next to the block data 1 having been rewritten as described above within the disk device 12.

Thus, when the common rate of the sequential block data is small, it can be said that the target block of the data A relating to the writing request and the block data following the target block are stored in a distributed state in the disk device 12. Therefore, the data writing part 68 newly writes the target block of the data A relating to the writing request. Consequently, at the time of retrieval of the data A later, it becomes highly probable that, by retrieving the block data written in sequential areas in the disk device 12, a plurality of block data configuring the data A can be retrieved together, and retrieval performance can be increased.

When the block detecting part 67 detects a common rate between sequential block data relating to a writing request and sequential block data already stored as described above, the order of the block data in each of the sequential block data is not important. That is to say, if block data of the same content exists in any position in each of the sequential block data, the block detecting part 67 detects that the block data is common. Then, the block detecting part 67 detects the common rate on the basis of the number that block data is common. The value of the common rate may be the value of the number that block data is common, or may be a rate that block data is in common in the sequential block data. The common rate is thus detected regardless of the order of block data in each of the sequential block data because, at the time of retrieval, it is possible to retrieve neighboring blocks related with each other at one time by retrieving the sequential block data written in sequential areas in the disk device 12.

Further, as stated above, the data writing part 68 does not newly write the block data at all times, but newly writes the block data only when the following condition is satisfied. For example, the data writing part 68 calculates the rate of the volume of the block data newly written into the disk device 12 in a duplicated manner with respect to the volume of the data already written in the disk device 12 among the data A relating to a writing request (for example, among a series of stream data relating to a current writing request), and writes the block data when the rate is equal to or less than a predetermined rate (for example, 5%). Consequently, it is possible to limit the volume of block data duplicated and stored in the disk device 12. Moreover, by limiting the volume of rewriting into the disk device 12, it is possible to limit decrease of a writing speed due to rewriting. The condition for writing block data again may be any condition. For example, the condition may be such that the volume of the written block data is equal to or less than a volume previously set depending on the capacity of the disk device 12.

Further, the data writing part 68 may be configured to, when the same block data appear within a series of stream data relating to a writing request, target only the block data appearing first within the series of stream data for writing into the disk device 12.

Figure 17:
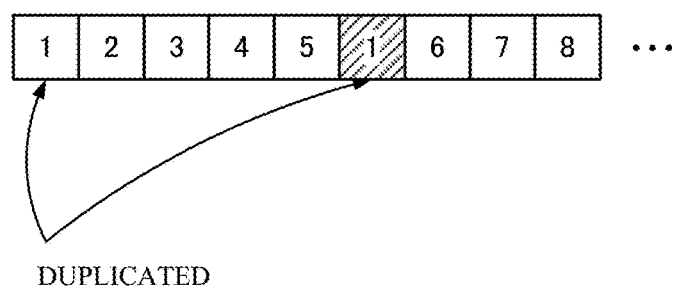
FIG. 17 is a diagram showing an example in which a plurality of same block data appear in a series of stream data relating to a writing request.

In an example shown in FIG. 17, it is found that the same block data "1" appears twice within a series of stream data relating to a writing request. In such a case, the data writing part 68 targets the first block data "1" for writing (executes processing steps S101 to S108 in FIG. 16). On the other hand, the data writing part 68 may be configured to execute a reference process without judging whether to write the reappearing block data "1" (shaded block data "1") again.

As described in the first exemplary embodiment, the storage system 6 according to this exemplary embodiment can limit decrease of retrieval performance by efficiently using the cache memory 14. Therefore, in a case as mentioned above, it is thought that decrease of retrieval performance can be limited by efficiently using the cache memory 14 without executing a writing process again. Accordingly, in a case where the same block data appear within a series of stream data, it is thought that efficient rewriting judgment which limits decrease of retrieval performance can be realized by targeting only block data appearing first within the series of block data for writing into the disk device 12.

Further, in judgment whether or not the same block data has already appeared within a series of stream data, use of a Bloom filter is desirable. It is though that use of a Bloom filter enables the judgment with a relatively small memory. Even when a Bloom filter is used and the result is false positive, the judgment whether to write again is performed as described above. Therefore, there will be no problem.

Thus, according to the storage system 6 in this exemplary embodiment, it is possible to limit dispersion of block data in the whole storage area within the disk device 12 while executing elimination of duplicated storage. Therefore, when retrieving data later, it is possible to limit scanning of a number of disks and it is possible to limit decrease of retrieval performance. On the other hand, in order to limit decrease of retrieval performance, duplicated storage of block data is allowed, but it is possible to limit increase of storage volume by limiting the volume of the duplicated storage.

Third Exemplary Embodiment

In a third exemplary embodiment of the present invention, a storage device 8 which has a temporary data control part executing control of the storage state of block data in a temporary data storage part 82 on the basis of retrieval turn information stored by a retrieval turn information storage part 84 will be described. In this exemplary embodiment, the overview of the configuration of the storage device 8 will be described.

Figure 18:
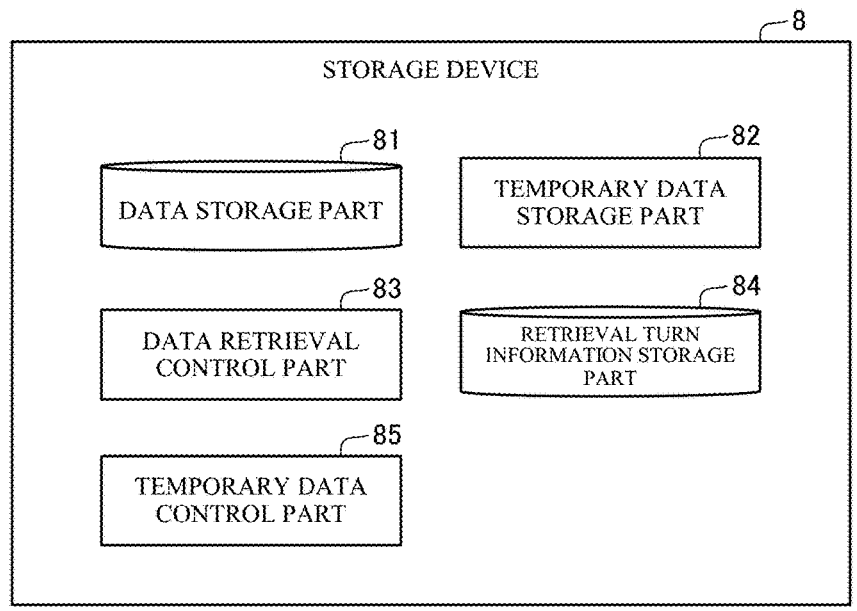
FIG. 18 is a block diagram showing an example of the configuration of a storage device in a third exemplary embodiment of the present invention.

Referring to FIG. 18, the storage device 8 has a data storage part 81, a temporary data storage part 82, a data retrieval control part 83, a retrieval turn information storage part 84, and a temporary data control part 85.

The data storage part 81 stores deduplicated block data. Further, the temporary data storage part 82 temporarily stores block data acquired from the data storage part 81.

The retrieval turn information storage part 84 stores retrieval turn information which is information about a turn of block data to be retrieved.

The data retrieval control part 83 retrieves block data stored in the data storage part 81 and stores into the temporary data storage part 82, and retrieves the block data from the temporary data storage part 82. To be specific, the data retrieval control part 83 in this exemplary embodiment causes the temporary data storage part 82 to store block data acquired from the data storage part 81 on the basis of retrieval turn information acquired from the retrieval turn information storage part 84.

The temporary data control part 85 controls the storage state of block data stored in the temporary data storage part 82. To be specific, the temporary data control part 85 in this exemplary embodiment controls the storage state of block data in the temporary data storage part 82 on the basis of retrieval turn information.

Thus, the storage device 8 in this exemplary embodiment has the retrieval turn information storage part 84 and the temporary data control part 85. With such a configuration, the temporary data control part 85 can control the storage state of block data in the temporary data storage part 82 on the basis of the retrieval turn information stored by the retrieval turn information storage part 84. In other words, it is possible to control the storage state of block data in the temporary data storage part 82 on the basis of a turn to be retrieved. As a result, it is possible to reduce the risk of deleting block data stored by the temporary data storage part 82 before reusing and the risk of keeping block data which is not necessary at all kept stored in the temporary data storage part 82. Consequently, it is possible to inhibit decrease of retrieval performance.

Fourth Exemplary Embodiment

A fourth exemplary embodiment of the present invention will be described in the research paper form below.
<Chapter 1 Introduction>
<1.1 Motivation>

Figure 19:
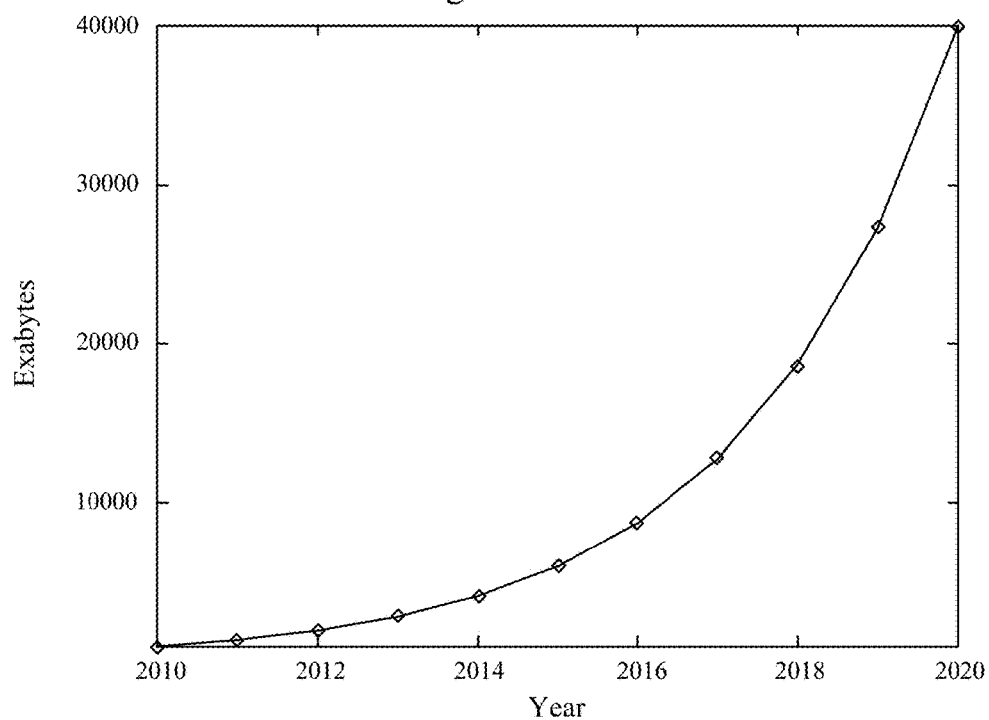
FIG. 19 is a diagram referred to in a research paper described in a fourth exemplary embodiment of the present invention.

The digital world becomes bigger and bigger every day. Since 2007 [35] International Data Corporation has been sizing up what it calls the Digital Universe, or the amount of digital information created and replicated in a year. The most recent study [34] shows that the digital universe will about double every two years to achieve an impressive number of 40 trillion gigabytes in 2020 (see FIG. 19).

Since practically all of the new data created is stored digitally, the exponential growth in the amount of data created leads directly to a similar increase in the demand for storage. The average annual increase in the transactional data stored amounts to 30-50%. The growth of WORM data (write once, read many) e.g. medical data (such as X-rays), financial, insurance, multimedia data, is 100% per annum [19]. Additionally, in many areas, legislation [1, 59] requires keeping of data for a long time, which further increases storage needs. It is easy to imagine the need to store company strategic data or information which cannot be easily recreated, but recent events have shown a demand for archiving even public Internet content in general. The reason for this is to preserve the Web for future generation as a space of "cultural importance". Such project is lead by British Library [11], and it has already collected thousands of websites in the British Internet together with their evolution over time.

The recent report [33] also show that nearly 75% of our digital world is a copy, which means that only 25% of created data is unique. When we look at this number within secondary storage market it can indicate even less then 5% of unique data stored [36, 83]. This fact is one of the key reasons for systems with duplicate elimination to become very popular on the backup market since they appeared about 10 years ago. Having to store actually only a few percent of all the data significantly lowered the price of disk-based backup storage which enabled features such as an easy access to any backup from the past and efficient replication over a network for disaster recovery. Additionally, high write throughput delivered by systems available [56, 64] assures small backup window, which together with fractional storage cost makes more frequent backup service possible (both to schedule and keep).

Figure 20:
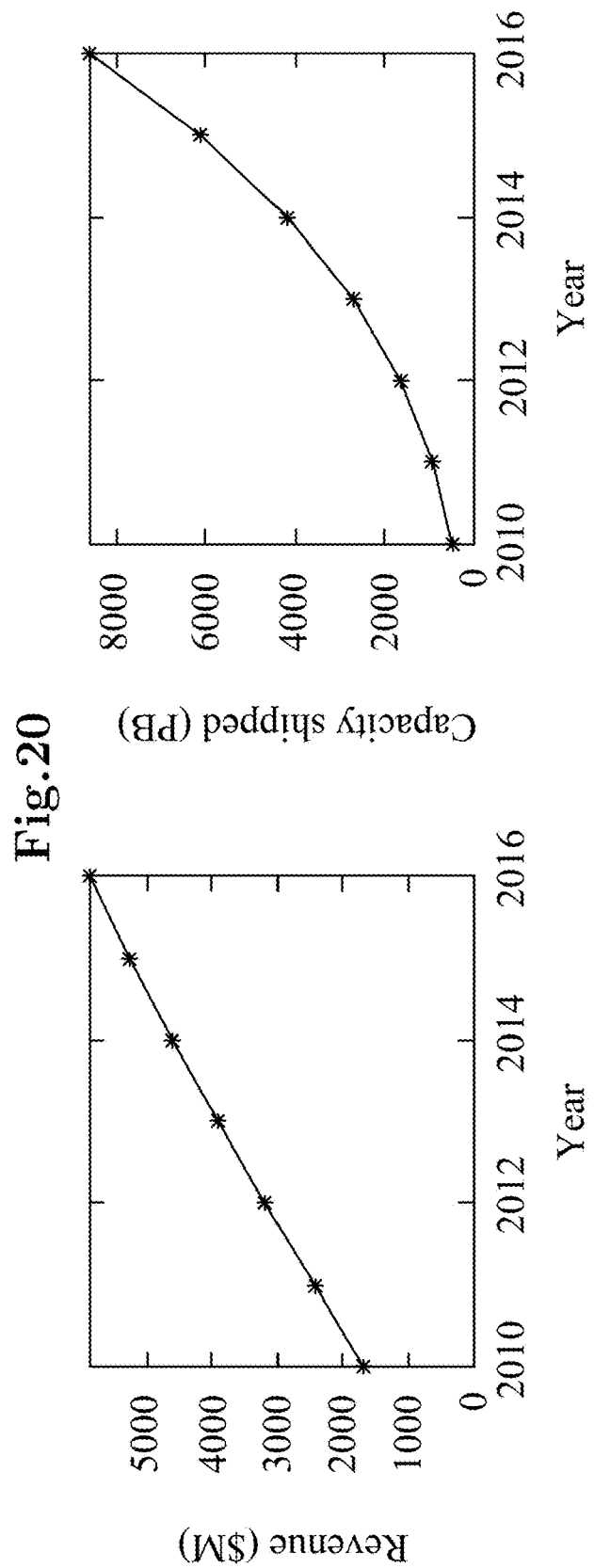
FIG. 20 is a diagram referred to in the research paper described in the fourth exemplary embodiment of the present invention.

As estimated [2], the market of such systems, called purpose-built backup appliance (PBBA), is to grow up to $5.8 billion (8.6 billion gigabytes shipped) in year 2016 from $2.4 billion (465 million gigabytes shipped) in 2011 (see FIG. 20).

Introducing secondary storage systems with duplicate elimination was enabled by key technologies such as distributed hash tables [24], stream chunking [67], erasure coding [80], fast duplicate elimination [83], to name a few. A lot of effort had been put into testing the effectiveness of the approach in reducing both: time needed to perform backups and storage space required to save them [23, 66, 51]. The effect is visible in the market popularity. Today, storage systems with data deduplication deliver new records of backup bandwidth [64, 32, 56] and the world is being flooded with various dedup solutions proposed by many vendors [77, 3, 26, 29, 31, 39, 55, 65, 74]. In practice, deduplication has become one of indispensable features of backup systems [4, 8].

<1.2 Problem Statement>

The data fragmentation on standard magnetic hard drives (HDDs) appears when two or more pieces of data used together are stored far form each other, therefore reducing the performance achieved with every access to them. Unfortunately, the problem of fragmentation in deduplication backup systems is strictly connected with their main feature—the deduplication itself. In most modern deduplication systems, before the data is written, it is chunked into relatively small blocks (e.g. 8 KB). Only after the block uniqueness is verified, it is stored on the disk. Otherwise, the address of an already existing block is returned. As such block could potentially be stored far from the most recently written ones, the restore of the exactly same stream of data becomes inefficient. This is the place where the fragmentation story begins.

<1.2.1 Impact of Fragmentation on Restore Bandwidth>

The restore bandwidth (time to recover data when needed) is one of the major factors describing performance of deduplication system, along with data deduplication ratio (storage space which can be saved) and maximal write performance (backup window length). Actual restore performance achieved by a regular customer in his working environment can often differ from the ones showed by the system manufacturer for various reasons [62, 63, 61, 46, 81]. In particular, the restore bandwidth is usually moderately good for an initial backup saved to an empty system, but deteriorates for subsequent backups [41, 48, 53]. The primary reason for this are the different kinds of data fragmentation caused by deduplication. Those are:

inter-version fragmentation—caused by periodical backups (daily, weekly, monthly) of the same data, internal stream fragmentation—caused by the same block appearing many times in a single backup, global fragmentation—caused by the same blocks appearing in backups with no logical connection to each other.

Figure 21:
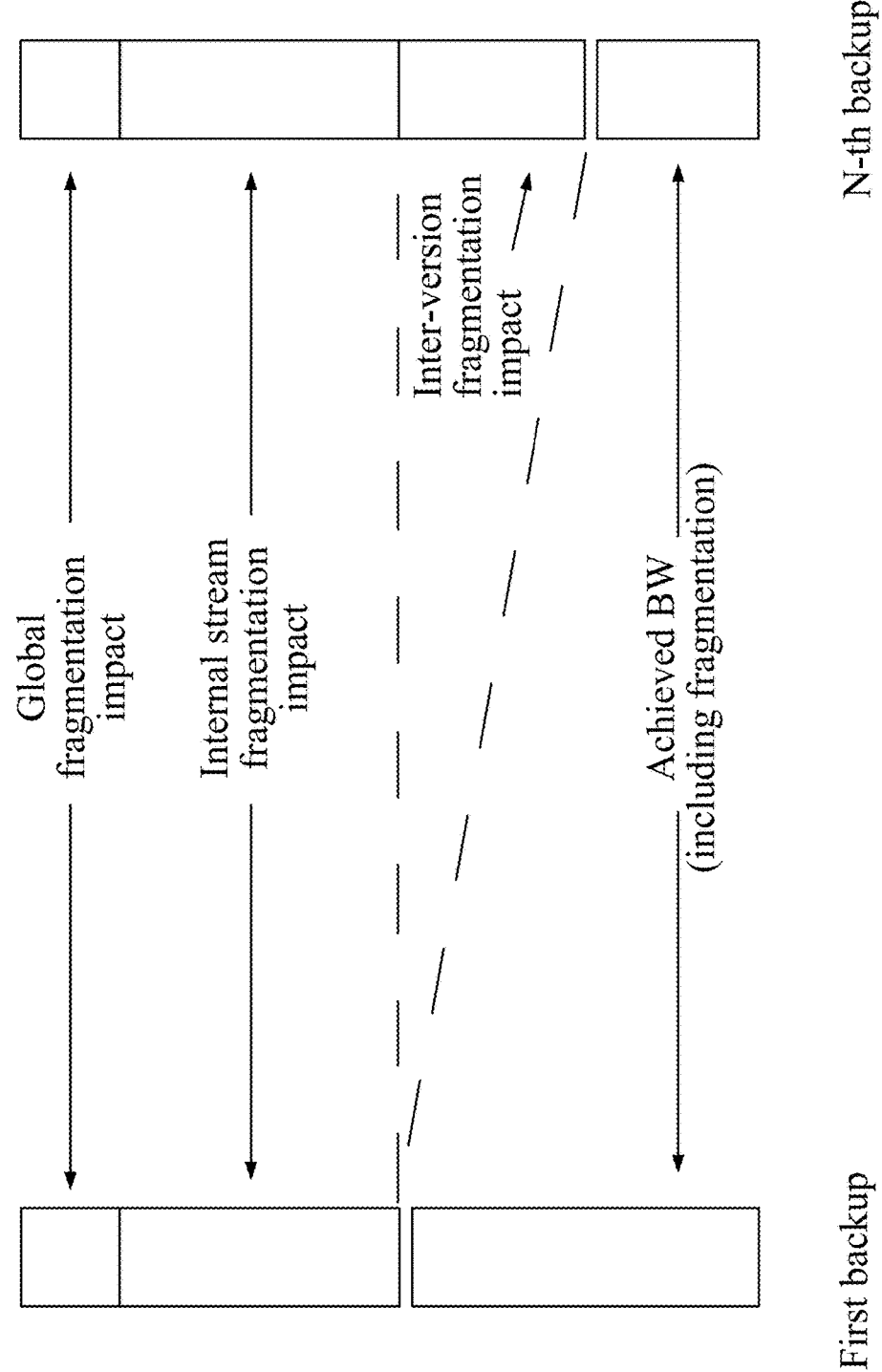
FIG. 21 is a diagram referred to in the research paper described in the fourth exemplary embodiment of the present invention.

The schematic cost of having each of the above factors, appearing as a decrease in restore bandwidth, is presented in FIG. 21. In this work I am going to look closer into the two main ones (as discovered during further analysis): inter-version fragmentation and internal stream fragmentation.

<1.2.2 Inter-Version Fragmentation>

Inter-version fragmentation can be observed only in systems with in-line deduplication, which are the most popular on today's market [2]. As in this solution duplicate blocks are never stored, such fragmentation results in data logically belonging to a recent backup scattered across multiple locations of older backups. This effect becomes bigger with each backup, as more and more of its data is actually located in an increasing number of previous backups implying increasing number of different disk locations. Depending on the data set, its characterization and backup pattern, my experiments show a decrease of read performance from a few percent up to more than 50%. As my data sets cover not more than 50 consecutive backups, I expect this percentage to be even higher when more backups are performed.

This most severe (as increasing) fragmentation of subsequent backups can be avoided with so-called post-process (off-line) forward-pointing deduplication. In such approach, a backup is written without any deduplication, and later the deduplication is performed in the background to preserve the latest copy of a block [45, 81]. As a result, the fragmentation does not increase and the latest backup does not become more fragmented with its age. Since the latest backup is the most likely to be restored, this solution looks promising. Unfortunately, it suffers from many problems, including (1) an increased storage consumption because of space needed for data before deduplication and (2) a significant reduction in write performance of highly duplicated data, because writing new copies of duplicates is usually much (a few times) slower than deduplicating such data in-line [44, 32]. The latter problem occurs because writing new data requires transferring it across the network and committing it to disk, whereas hash-based deduplication needs only comparison of a block hash against hashes of blocks stored in the system assuring much smaller resource usage (network, processor and disk).

To illustrate the inter-version fragmentation problem, let us assume a full backup of only one filesystem is saved every week to a system with backward-pointing deduplication. In such system the oldest copy of the block is preserved, as is the case with in-line deduplication, because the new copy is not even written.

Figure 22:
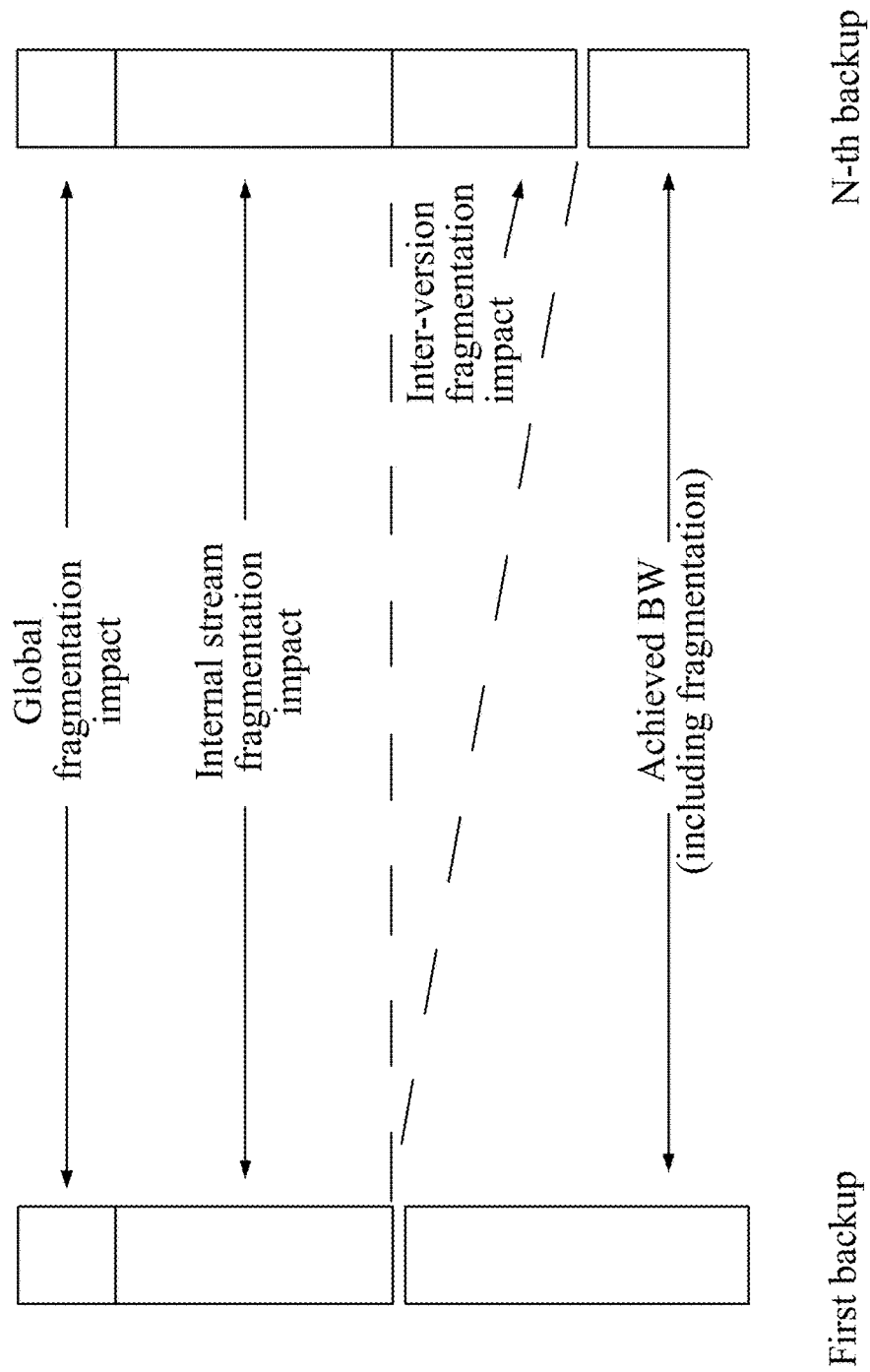
FIG. 22 is a diagram referred to in the research paper described in the fourth exemplary embodiment of the present invention.

Usually, a filesystem is not modified much between two backups and after the second backup many duplicates are detected and not stored again. In the end, the first backup is placed in continuous storage space and all the new blocks of the second backup are stored after the end of currently occupied area (see FIG. 22). Such scenario is continued during following backups. After some number of backups, blocks from the latest backup are scattered all over the storage area. This results in large number of disk seeks needed for reading the data and in consequence, a very low read performance (see the restore process scheme of the last backup in FIG. 22).

Such process can be very harmful to emergency restore, because the above scenario is typical to in-line deduplication and leads to the highest fragmentation of the backup written most recently—the one which will most likely be needed for restore when user data is lost.

<1.2.3 Internal Stream Fragmentation>

The factor which can also introduce a large restore bandwidth penalty is internal stream fragmentation. Even though it is caused by deduplication as the previous one, it is limited to a single backup only. This results in a different set of characteristics, such as rather constant impact on all the backup versions of the same data and the variety of deduplication backup systems affected (including off-line). My experiments have shown that internal stream deduplication, the exact cause of internal stream fragmentation, is usually quite significant as 17-33% of blocks from a single backup appeared more than once within the backup. By default, they are eliminated by deduplication mechanism therefore saving the precious space for user data. Unfortunately, this happens with a cost of up to 70% performance degradation which is visible when the restore is necessary. Further analyzes have also shown that the LRU caching algorithm, which is commonly used with restore in backup systems, does not work well in the described scenario, very often filling the memory with useless data.

Figure 23:
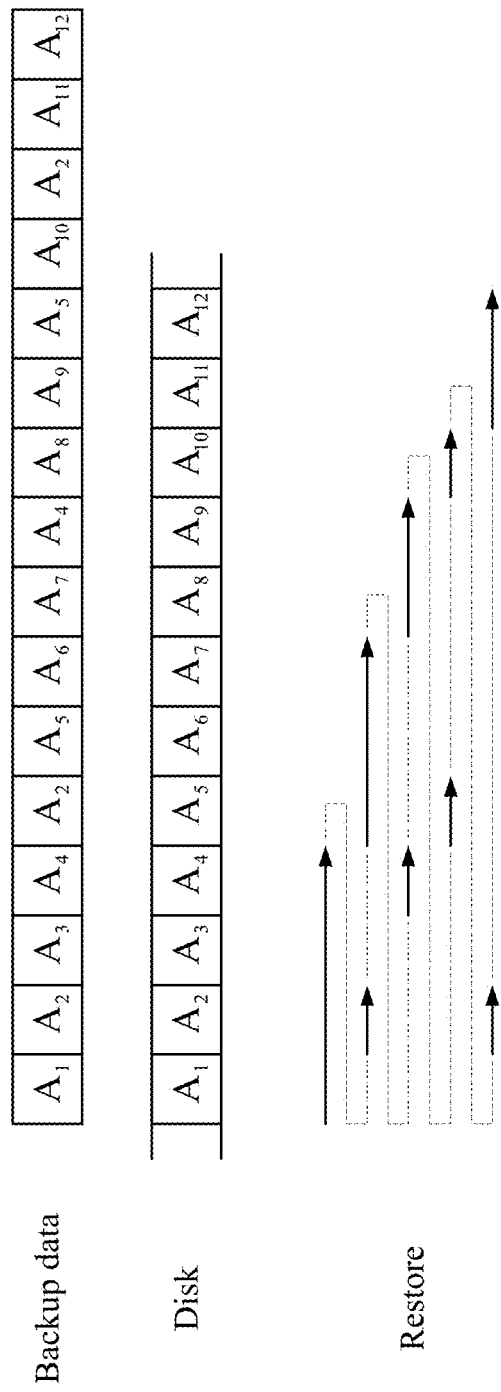
FIG. 23 is a diagram referred to in the research paper described in the fourth exemplary embodiment of the present invention.

To illustrate the internal stream fragmentation problem it is enough to backup a single stream of data, with some average number of internal duplicate blocks, to a system with deduplication. As the system will store only one copy of each block, the normally sequential backup will not be stored in such way on the disk any more (see FIG. 23). This results in a large number of disk seeks needed for reading the data, and in consequence, a very low read performance (see the restore process scheme of the backup in FIG. 23).

In the end, the internal data fragmentation causes both ineffective cache memory consumption and lower restore bandwidth. The problem characteristics, though, is much different to the one caused by internal-stream fragmentation. First, the impact on the performance is more or less constant for all the backups from a data set, starting from the first one. Second, the problem affects all deduplication systems (including off-line) in equally significant way.

<1.3 Thesis Contributions>

Considering the described scenarios, the goal of this work is to avoid the reduction in restore performance without negative impact on both write performance and deduplication effectiveness. In other words, the ideal deduplication solution should achieve high write bandwidth, as provided currently by the in-line approach, and high restore performance, without any read penalty caused by any kind of fragmentation.

The main contributions of this thesis are:
Detailed analysis and description of fragmentation problems specific to storage systems with deduplication (especially in-line) based on real traces gathered from users,
Identification of requirements and possible trade-offs for algorithms solving the problems found,
Proposal of Intelligent Cache with Forward Knowledge as a solution greatly improving read cache effectiveness and dealing with internal stream fragmentation by leveraging backup system characteristics,
Proposal of Context Based Rewriting Algorithm (CBR) to fight inter-version fragmentation with no deduplication loss and minimal backup write performance impact, together with a number of features addressing important trade-offs such as write bandwidth, latency, restore performance and temporary use of additional space,
Analysis of the requirements satisfaction and trade-offs resolution of the proposed algorithms together with a set of experiments based on real user traces to prove the effectiveness of the chosen solutions,
Analysis of the scalability of fragmentation problem and its proposed solutions.

<1.4 Outline of Dissertation>

The thesis is organized as follows. The next chapter provides information about deduplication and storage systems in general. The motivation for this work, closer look at the nature of the problem of fragmentation, its different sources and a few examples are given in Chapter 3. Chapters 4 and 5 present solutions for two different issues which appear in storage systems with deduplication. Intelligent cache with forward knowledge tries to provide the effective usage of read cache in presence of internal stream fragmentation, while content based rewriting algorithm (CBR in short) deals with interstream fragmentation in order to assure the most effective block placement for future restoration of the most recent backup. Both solutions are followed by the discussion and trade-offs. Chapter 6 contains evaluation of both algorithms on real traces gathered from different users, including discussion of performance results together with the assumptions and the methodology used in experiments. This chapter also includes both separate and joined experiments together with a section about scalability of both solutions. Related work is discussed in Chapter 7 together with other solutions to the fragmentation problem. Finally, Chapter 8 contains conclusions, insights on possible algorithm extensions and other directions for future work.

<Chapter 2 Backup and Deduplication>
<2.1 Secondary Storage Systems>
<2.1.1 Requirements>

By its definition, backup is a copy of a file or other item made in case the original is lost or damaged. Such simple and easily looking task does not sound very challenging when it comes to a backup of a single desktop. The scenario changes dramatically though when we move into a medium to big size company with hundreds of users, terabytes of data produced every day and the requirement to perform backup every night or weekend (short backup window) for internal safety reasons. One cannot forget the backup policy which requires keeping many backups of the same data set (one for each day/week), which can differ by only a few bytes between each other, nor easy management of even a very large system (at petabytes level). Some value the possibility of setting individual resiliency for each set of data, while others see features such as deletion on demand (very complicated in distributed environment [76]) or uninterruptive update together with easy system extension as the most crucial ones. Easy and fast remote replication is also seen as an important addition together with the price—the lowest one possible. As one may expect, each of those two constraints usually introduce trade offs which are not easily to be dealt with [23]. What is more, one need to remember about the main reason for backup systems to exist: the emergency restore. Without fast recovery to minimize the expensive downtime all other features seem much less attractive.

Figures 24, 25:
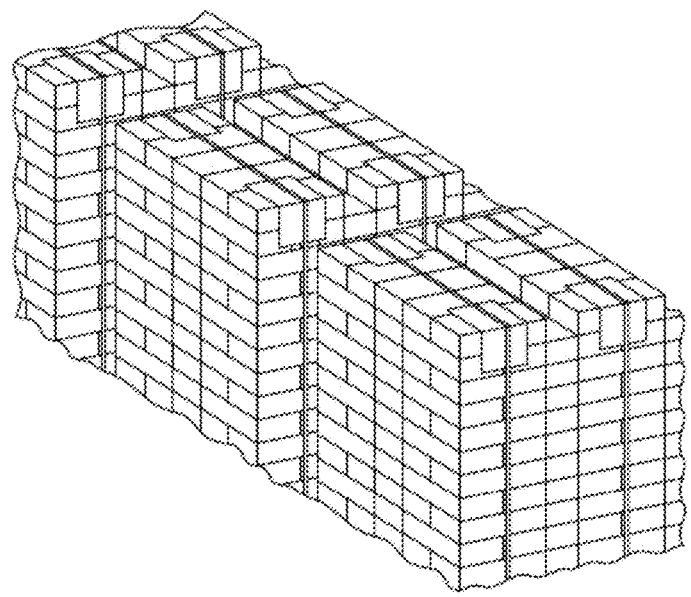
FIG. 24 is a diagram referred to in the research paper described in the fourth exemplary embodiment of the present invention.
FIG. 25 is a diagram referred to in the research paper described in the fourth exemplary embodiment of the present invention.

It is important to underline the differences between secondary (backup) and primary storage, which are required for the understanding of further sections (see FIG. 24). The latter systems are the ones used for everyday tasks in a similar way people use hard disks in their computers. While with backup, we would expect huge streaming throughput, data resiliency and maximal capacity, here the low latency will be crucial for all operations (read/write/delete), even the ones which would require random access [75]. On the other hand, in the same primary systems bandwidth and data resiliency, although important, will not be the one mostly required. Such small, but subtle difference becomes even bigger when we consider features such as compression, encryption and data deduplication taking place on the critical path of every backup operation.

Backup system requirements [23]:
fast data recovery in case of emergency
high (and expandable) capacity
considerable backup bandwidth (to allow small backup window)
remote replication option (preferably of only modified data)
configurable resiliency of data kept
deletion on demand
easy management, upgrade and storage addition regardless of the size of the system <2.1.2 History>

Even though the first general-purpose computer was build in year 1946 and the backup evolution seems quite short, it is also a very intense one. The first available punched cards could store less than 100 bytes of data while the newest devices can keep more than 1 TB. This huge leap in such short period of time show the amount of work put into developing the technology for every user to get the maximum out of the computer experience.

The punched cards, the first medium which could be considered as a backup, were already in use since the end of 19th century. With the appearance of computers they were easily adopted in order to become (in 1950s) the most widely used medium for data storage, entry, and processing in institutional computing. Punched cards were essential to computer programmers because they were used to store binary processing instructions for computers. In fact, NASA used punched cards and computers to read them in order to perform calculations as part of the first manned space flight to the moon. Luckily, punching an exact copy or two cards at once was an easy way to produce instant backups.

As the use of punched cards grew very fast, storing them became a hassle; eventually requiring large storage facilities to house cartons upon cartons of punched cards (see FIG. 26). This problem was to be solved by magnetic tapes, which were becoming more and more popular. Even so, punched card programs were still in use until the mid-1980s [15, 40].

Since one roll of magnetic tape could store as much as ten thousands punch cards, it gradually became very popular as the primary medium for backup in 1960s. Its reliability, scalability and low cost were the main reasons for the success which made the technology to the top of most popular ways to perform backup in 1980s. During following years the technology had been improved in order to deliver higher bandwidth and better data density. In September 2000 a consortium initiated by Hewlett-Packard, IBM and Seagate (its tape division was spun-off as Certance and is now part of Quantum Corp.) released the technology called Linear Tape-Open (LTO) Ultrium which introduced a common standard developed and used until now. The latest generation (LTO-6) was announced in June 2012 and delivered: 6.25 TB capacity and data transfer rate at the level of 400 MB/s together with features such as WORM (write once read many), encryption and partitioning [78]. In order to provide automation and transfer to/from many streams at once, the dedicated robots/libraries with many tape drives are available (see FIG. 26).

Introduction of hard disk drives (HDD) did not change much in the backup market because of their high price, large size and low capacity. The new technology, which brought the possibility of random access to the data, first found its place in desktops, but at the end of 1980s it was used for the backup as well. Further development in this direction was possible thanks to the introduction of redundant array of independent disks (RAID), which are still common within the world of fairly small data, but the limitations of size and resiliency were too severe for medium and large companies. In year 2013 a single 3.5 inch hard drive could provide up to 4 TB of capacity and over 200 MB/s transfer rate. Even though those values are comparable with the ones available with modern tapes the price to be paid is a few times higher.

Local Area Network supported by Network Attached Storage (NAS) and Storage Area Network (SAN) became the next big player in the backup market. Keeping the data remotely makes the backup more convenient (no additional media to attach), faster and easily replicable. Furthermore, the use of hard drives allow nearly instant access to any data and usage of algorithms such as deduplication, which can make backup more efficient and much cheaper. Since the new millennium, backup systems are not only attached through network, but they can be a separate living community of nodes being able to deliver features not possible before. Thanks to using many servers in a single system one can get intelligent data resiliency with automatic healing process in case of any disk, but even a machine or switch failure. What is more, the combined power of all computers can provide huge levels of throughput (over 900 TB/hr [56]) and capacity (over 100 PB [56]) in order to enable data collection from many different sources in a short backup window. Even though the systems available today are rather local or at the size of a data center, they can talk between each other to replicate data over a large distance to transfer only the part which is new or modified. Class software, on the other hand, provides a whole set of important features, enables easy management of a cluster and provides interface exporting the system as one unified space through network interfaces such as NFS or CIFS. Lower prices, potentially unlimited scaling possibilities and higher density of disk drives combined with deduplication technology and supported by remote replication, load balancing, fault tolerance and fast recovery made the systems, known as purpose-built backup appliances (see FIG. 27), to be the first choice as the short-medium term backup solution today [17, 2].

Flash storage would seem to be the logical successor to the current spindle-based disks in different kind of usage. They are fast, need less power and prevent problems such as access to large indexes and stream data fragmentation (no streaming access required any more). Unfortunately, they have a few considerable downsides which makes them not a good choice for business solution especially the ones where large amounts of storage space are required. Even though we can find SSD drives with a price below $1 per GB, it is still far from $0.05, which is to be paid for a regular drive with spindles (own research: June 2013). With these prices and in general a few times smaller maximal capacity, it is difficult to predicate any revolution even taking into account the fact that considerable price drop, we have experienced during recent years, continues. On the other hand, the small evolution is possible here and slowly takes place. As recent research suggests, SSD drives can be quite easily adopted for large indexes [82, 43] and for improving deduplication throughput [49, 21], which seem to be very useful in today's backup.

Over the last 30 years many other media have appeared which could be used as a backup solution but have not become popular especially in an enterprise environment. The most common devices were different kind of disks: floppy, compact (CD), versatile (DVD), HD-DVD, Blu-Ray. With each one the capacity, transfer rates and other indicators became better and better but they were still not enough to compete with hard disks or tapes. The main problems are as usual: the price, access time, too little storage space and complicated management.

The most recent idea of the backup is known as online backup and connected with the cloud concept. It is a strategy for backing up data that involves sending a copy of the data over a proprietary or public network to an off-site server. The server is usually hosted by a third-party service provider, who charges the backup customer a fee based on capacity, bandwidth or number of users. Online backup systems are typically built around a client software application that runs on a schedule determined by the level of service the customer has purchased. To reduce the amount of bandwidth consumed and the time it takes to transfer files, the service provider might only provide incremental backups after the initial full backup. Third-party cloud backup has gained popularity with small offices and home users because of its convenience, as major expenditures for additional hardware are not required and backups can be run dark, which means they can be run automatically without manual intervention. In the enterprise, cloud backup services are primarily being used for archiving non-critical data only. Traditional backup is a better solution for critical data that requires a short recovery time objective (RTO) because there are physical limits for how much data can be moved in a given amount of time over a network. When a large amount of data needs to be recovered, it may need to be shipped on tape or some other portable storage media [70]. The most important issues here are also the data security, availability, privacy and the risk of using the data by the service provider in some undefined way. Especially large companies will prefer keeping the sensitive data in their own system without taking a risk of giving the control away. It is important to state that the technology used here remains basically the same or very similar to described above network backup. What is different is the required agreement between sides, software being used and the concept of interaction between customer and service provider.

<2.2 Duplicate Elimination>

Deduplication is usually defined as a technology that eliminates redundant data. When data is deduplicated, a single instance of duplicate information is retained while the duplicate instances are replaced with pointers to this single copy. The whole process is completely hidden from users and applications, which makes it easy to use and not require any dedicated software modifications.

In order to be easily compared and found, each piece of data requires a unique identifier which is much shorter then the data itself. In secondary storage such identifier is calculated based on the content of data to be stored (usually using a hash function) and makes it easy to locate any existing incoming piece of data using dedicated indexes. Systems which identify their data in such way are defined as Content Addressable Storage (CAS) and have been an area of research for more than 10 years already [66].

<2.2.1 Characteristics>

Granularity

Data deduplication can generally operate at the file or block level. The former one eliminates duplicate files, but is not a very efficient way of deduplication in general as any minimal modification requires to store the whole file again as a different one [60]. Block deduplication looks within a file and chunks it into small blocks. Each such block is then processed using a hash algorithm such as SHA-1 or SHA-256 in order to generate a unique hash number which is stored and indexed. If a file is updated, only the changed data is stored. That is, if only a few bytes of a document or presentation are changed, only the changed blocks are saved. This behaviour makes block deduplication far more efficient. However, block deduplication takes more processing power and uses a much larger index to track the individual pieces.

Algorithm

Two main abstractions for duplicate elimination algorithm on block level are called: fixed and variable size chunking. After a number of tests it turned out that having blocks of fixed length does not work well with possible updates [66]. By simple modification of a few bytes at the beginning or in the middle of a file all the following content had to be rewritten as new data with different block boundaries in order to preserve its size. Variable chunking length [50, 83, 23], on the other hand, makes use of a dedicated algorithm (such as Rabin fingerprinting [67]) which enables synchronization of block boundaries shortly after any modification takes place. Thanks to that, the following part of the modified file can be cut into the identical blocks which can then be deduplicated to those already present after backup of the unmodified original file.

Usually, a block size produced in such way in modern systems is within some boundaries (e.g. 4-12 KB) with an average value somewhere in the middle. The most common average values used are between 4 KB and 64 KB and have significant impact on overall deduplication ratio along with some other system features such as the scope of deduplication, data fragmentation. Some dedicated algorithms try to optimize this impact by allowing usage of many different block sizes during a single backup (i.e. 64 KB with 8 KB). As research shows [69, 42], the results are quite promising.

Point of Application

A secondary storage system is being used by a set of clients performing backup. Each backup stream requires to be chunked into blocks together with hash calculation for each one of them in order to verify its existence in the system. Those operations can take place either on the client or server side. The former one, called source deduplication, will require dedicated software to be installed on the client, but at the cost of some processing power (hash calculation) it can offer much lower network usage. The latter, on the other hand, called target deduplication, is completely transparent for the clients, simply providing the storage space through network interfaces and therefore extremely easy to use performing the hashing and all other required operation internally. Both options are available on the market and deployed based on customer requirements.

Time of Application

Within systems with target deduplication there are two groups which differ in time when the process is applied. Off-line (post-processing) deduplication [74, 62, 61] is a simplest way where, in the first phase, all data from the current backup are stored continuously in the system. After the operation is finished the actual deduplication is performed in the background in such a way that the blocks from the latest backup are a base for eliminating duplicates from older backups [61, 45]. On one hand, such approach makes sure that all the data from newest backup is located in one continuous space, which makes it easier to read, but on the other, it causes a number of different issues. The problem though is with even a few times lower backup performance, lack of possibility to conserve network or disk bandwidth (i.e. deduplication on client or backup server) and the space required to hold an entire backup window's worth of raw data (landing zone). Even though the landing zone can be minimized by starting the deduplication process earlier and performing it part by part (staging), the system resources needed for that operation will make the current backup slower, which would add one more negative effect [13]. What is more, the off-line process becomes quite expensive as after each backup about 95% of its size (assuming 20:1 dedup ratio) has to be found in entire storage space and deleted in the background.

The other kind, called in-line deduplication, makes sure the duplicate data is found during the write process and never stores a block which is already present in the system. It requires fast algorithms in order to verify the block existence on the fly and return either the duplicated or new pointer, depending on the result. Such path is complicated in general, but by making sure that no duplicate data is found in the system, it does not require any cleanup after the backup. Also, as checking the hash existence (often in index placed in memory [83]) can be three times faster [41] than storing a new block on disk, it delivers much better bandwidth. The problem with such approach is a progressing fragmentation, which will be described in details in next chapters of this work.

Scope

The final characteristic of deduplication is connected with its scope. The most intuitive global version, where each duplicate block existing in the system is always identified, is not that common because of the implementation and technical issues which appear. The main problem is with the huge global index, which should always be up to date and allow fast identification of required block. One of the issues here is to identify whether a block is a duplicate or not. This is often done with a Bloom filter [9] and used by distributed systems such as Google's Big Table [16] and DataDomain [83]. It helps to avoid expensive look-up for blocks which will not be found. On the other hand, techniques such as using larger block size [23] and exploiting chunk locality for index caching as well as for laying out chunks on disk [83, 68] reduce the amount to data required in RAM. As a result, only small percentage of requests needs an access to the full index which is placed on disk. When we move into distributed environment the problem is even more complicated, which results in only one commercially available system with global deduplication (HYDRAstor [23]), which uses a dedicated Distributed Hash Table [24] in order to deal with the task.

Other existing solutions are either centralized ones (such as EMC Data Domain) or use a different kind of techniques limiting the required memory at the cost of deduplication. Sparse Indexing [44], for example, is a technique to allow deduplication only to a few most similar segments based on a calculated hash, while Extreme Binning [6] exploits file similarity in order to achieve better results for workloads consisting of individual files with low locality.

<2.2.2 Dedup Ratio>

Deduplication ratio can vary widely depending on data stream characterization, chunking algorithm, block size and retention policy. As research articles confirm, metadata size in relation to all the stored data must also be taken into consideration [69] together with performance required to calculate the hashing or update the metadata and store/locate the data. At last, one needs to remember about the issues with scalability of the system and the time to reconstruct the data. All of the above certainly impacts the deduplication ratio, which can range from 4:1 to 200:1 and more [47]. When aggregated, a compression of 10-20 times or more (less than 5% of the original storage capacity) can be achieved, which is with some deviation confirmed with other sources, both business [10, 4] and scientific [83, 69, 48].

Most modern backup systems use variable size chunking, because of its advantages described in Section 2.2.1. As it was shown in many articles [54, 69], the average value target of variable block size has a noticeable impact on the data deduplication ratio. When looking at the data only one can always expect smaller blocks to perform better in terms of space savings, but needs to remember about the problems which can appear. The usage of small blocks cause higher memory requirements (bigger index), backup performance degradation (more blocks to verify and deliver), and data fragmentation (smaller random reads possible) causing restore bandwidth problems. What is more, each block of data requires a small, but noticeable, piece of metadata stored which does not depend on the data size. Unfortunately, when taken into account, it may waste all the savings provided by applying smaller block size. When looking at the market the most common block size used is 8 KB (i.e. EMC Data Domain—global leader [29]), but there exists competition with block size even 64 KB (NEC HYDRAstor [56]) or 4 KB (HP StoreOnce [38]) on the other side.

After all, every single backup will deduplicate best with some individually defined block size. Furthermore, in order to achieve best results each part of a stream could be divided into a different size segments regarding its modification scheme. Even though in general the problem looks extremely complicated, some simplified solutions appeared letting to use two sizes of blocks during a single backup. The decision on whether the block should be small or large is based on the previously stored information. According to Romanski et al. [69] such approach can result in 15% to 25% dedup ratio improvement achieved with almost 3 times larger average block size.

Often underestimated factor when calculating duplicate elimination ratio is a retention policy. As the biggest power of deduplication comes from elimination of duplicates from previous backup of the same data, the information about number of such backups is crucial for the purpose of calculations. Lets assume the size of our example filesystem to be 1 TB and the modification rate at a level of 1% of blocks per day (to simplify the calculation we assume that our backup does not increase in size and random blocks are modified every day). Having such system, user can choose one of three simple backup policies: daily, weekly and monthly. Each of them define a frequency of the full backup to be performed. After a year with each of the policies, we will end up with having similar amount of data occupied in our system (4.1 TB-4.6 TB), but with significantly different amount of data written (12 TB-365 TB). Therefore, each of them calculates into a completely contrasting deduplication ratios: 78.49, 11.48 and 2.91 (see FIG. 28). Each policy is simply unique and at different costs (i.e. time spend on backup during month) protects data in a different way. The calculation shows only the fact that each specified case is unique and taking only deduplication ratio into account has its own drawbacks. In general the average number of duplicates in a backup (except the initial one) seems to be more precise as an indicator of deduplication power.

Similar effect can be achieved when choosing between incremental and full backup. The former one will most probably take less time to perform but more to finally restore the data as the latest full backup and all incrementals until given time need to be patched together. The latter one, even though it takes more time, thanks to deduplication it will not consume more storage space. It is also important to note that from a statistical point of view even though the data stored is similar, the final deduplication ratio in both cases will look much different.

The compression is one more task usually applied before the data is stored in the system. Keeping only essential data may need more processor power to compress and possibly decompress in the future, but can often increase the overall data reduction ratio (compression together with deduplication ratio) by a factor of 2 or more. Such space saving is usually worth the effort especially with larger block sizes, where compression becomes more effective.

Finally, the basic impact on the deduplication ratio has the individual backup stream characteristic. The stream content and it's internal redundancy is an important start. Taking for example mailboxes, the first backup may result in less then 50% of unique data stored in the system (improving deduplication ration by a factor of 2), while having the first backup of a movie database will not show any savings at all. Starting from the second backup the percentage of duplicates usually stabilizes but at different level for each data set. It depends mostly on the modification rate/pattern and the period between backups. Those two numbers combined with a number of full backups kept in the system will have a major impact on the final score achieved.

<2.2.3 Benefits>

Although the deduplication can be used in any environment, it is ideal for highly redundant operations such as backup, which requires repeatedly copying and storing the same data set multiple times for recovery purposes over 30- to 90-day periods. The described usage pattern makes the technology to be especially useful ending with over 20 times reduction of the data to be stored (depending on many different features—see Section 2.2.2 for details). Such result can end up in high money savings or enable possibilities not achievable before.

Probably the most important result of introducing data deduplication in secondary storage is a huge technological leap in the area. Thanks to limiting required storage space, it enables the previously expensive disk based systems to compete with tapes bringing into secondary storage world features not available before. Those are: immediate and random access to the data (emergency restore), high transfer rates, one combined storage space, many streams of backup, cheap and definable data resiliency class, easy and fast replication, maintained data integrity.

What is more, having the possibility to verify the existence of data based on short (i.e. 160 bit) hash of the data opens a way to save network bandwidth. A dedicated software may be used to produce hashes at the client (source deduplication—see Section 2.2.1) and send only the data which are not present in the system. Assuming the hash size lower than 0.5% of the data size and 20:1 deduplication ratio, only 5.5% of all the data needs to be transferred over the network in order to perform a regular backup. Such approach not only makes the process much faster (to make the backup window smaller), but also it does not require the network from client to allow high bandwidth vales. This feature is even more important in case of replication when master and replica sides are placed in different states or countries.

Overall, the data deduplication technology is not only a single feature added to an existing software. It is a start of a whole new era in secondary storage—the era of servers and hard disk with all the features they provide such as instant random access, extremely high bandwidths, constant data monitoring. Supported by network saving replication and the competitive price, it creates a complete and well equipped solution in terms of secondary storage.

New features available in deduplication systems:
  high write throughout (no need to store existing blocks)
  multiplication of available raw capacity
  easy replication of only unique data
  network bandwidth savings (source dedup and replication)
  allowing disk technology for backup together with:
    random access within seconds
    quick emergency restore (from many disks at once)
    multiple stream access
    filesystem interface
    configurable resiliency classes
    maintained data integrity and self healing <2.2.4 Drawbacks and Concerns>

Whenever the data is transformed in any way users may be concerned about their integrity. The deduplication process looks for the same copy of a block somewhere in the system and may end up with the data of one stream scattered over many locations on disks and servers. Such way of saving storage space makes it almost impossible to read the required data without the exact recipe stored somewhere in the metadata and in the exact opposite way it was written. All this put high requirements on the quality of the software from vendors and implies fair amount of trust in the process from the customers.

Each deduplication system has to be able to find and compare the blocks in order to verify their identity. As described before, the hash function is an easy and effective way to find a candidate for verification but it turns out that reading such candidate in order to verify its content with newly written block byte by byte would make the storing process very time consuming. In order to remove this overhead the industry relies on hash comparison only in order to determine the identity of two blocks. Of course a single hash of length 160 or 256 bit in theory can be used to identify a lot of 8 KB blocks but as it was verified, assuming the collision-resistant function (i.e. SHA-1 [25]) and the amount of blocks which can be stored in a system, the probability of such collision is extremely low, many orders of magnitude smaller than hardware error rates [66]. Though when the data corruption appears it will most probably be rather a problem with IO bus, memory or other hardware components.

One more concern is connected with computational power necessary to perform the algorithm and other required functions. As in case of source deduplication, at least some of the calculations are performed on the client therefore using its power, though in case of the target solution no additional computation power is required but the one delivered by the vendor in dedicated hardware. The cost of energy required by the system should be calculated in the early phase of comparing the solutions before purchase.

Finally, going into a system with many disks and tens or hundreds of servers keeping all the data accessible and not loosing any may be an issue. Such system requires efficient distributed algorithms, self-healing capabilities and incorporated intelligence in order to allow fairly easy management. With thousands of disks the probability of braking one becomes quite high, so that features allowing easy disk/node replacement without spoiling the overall availability become important. Fortunately, there exist systems having all the above features being able to work in configurations with over 100 nodes assuring even 7.9 PB of raw capacity [56].

<2.3 Today's Market>

According to Information Storage Industry Consortium (INSIC) the use of tape technology, the most common during last 30 years as secondary storage, has recently been undergoing a transition [17]. The type systems are moving out from backup system market towards third tier backup (quite recently created category for long time retention backup with infrequent or no access), archive (data moved for longer term storage) and regulatory compliance data (preserved for duration defined by regulation). All those use cases involve keeping a single copy of data for a long time often without reading it at all. For those purposes tape may still be a better choice due to the price, better duration, smaller energy cost and no deduplication requirement (see FIG. 30).

Figure 29:
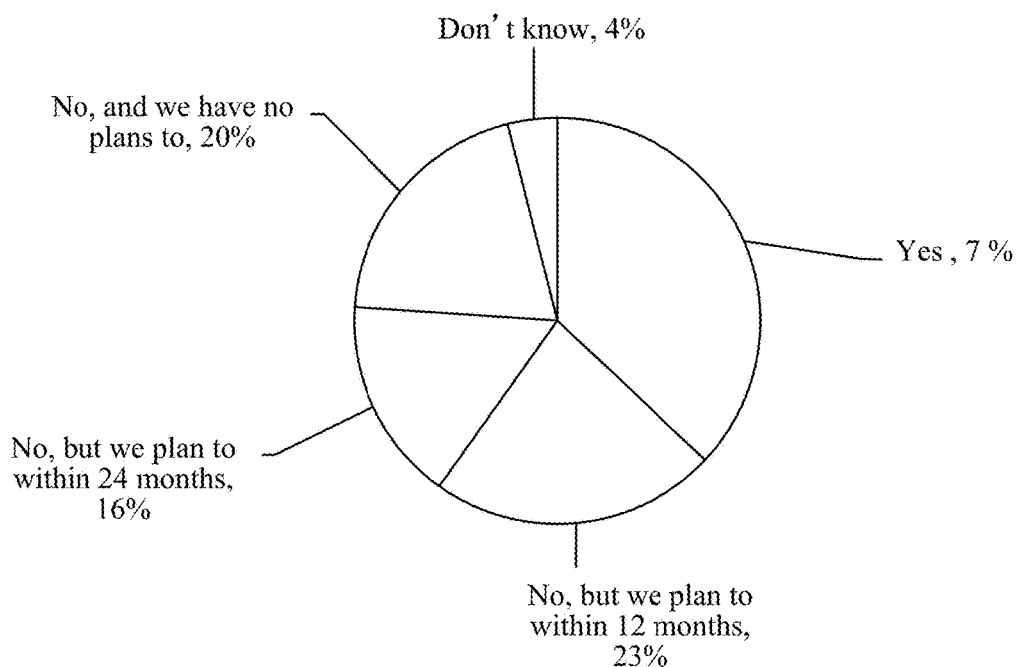
FIG. 29 is a diagram referred to in the research paper described in the fourth exemplary embodiment of the present invention.

The above tendency is also visible when asking organizations about using data deduplication solutions. The survey performed in year 2012 by Enterprise Strategy Group (see FIG. 29) on over 300 respondents had shown 76% of them having used or planning to use a deduplication solution (compared with 43% in year 2008 [30]). On the other hand there are numbers developed by the market itself. The whole tape market (with its media and robotics, including archiving and other purposes) in year 2011 closed in total of $3 billion [58] (after 10% drop) while for deduplication systems it was $2.4 billion [2] (after 43% grow). While the tape market was still bigger, it looks like the usual 20× deduplication ratio, high write bandwidth, scalability, the ease of remote replication and fast emergency restore are considered important when the decision is to be made at the company.

Even though the deduplication systems grow at the extensive rate, they are most probably not going to eliminate tape usage totally. As data collected from companies suggest [17], they are rather going to use both disk based and tape systems for the backup (62% in year 2010 comparing to 53% in year 2008). Taking all the above information into perspective, there seems to be a tendency to use the disk-AND-tape model as the most successful methodology for data protection with disk-based systems as a main component for backup up to 6 months and tapes used for archive and data requiring longer retention period.

There is no doubt that thanks to deduplication the second big step in global secondary storage is in progress (the first one was the transition from punched cards to tapes in 1980s). On the other hand, the number of published papers for last few years places the topic under extensive research. At this scale each innovative approach, algorithm or discovery may end up having large impact on everyone from vendors to systems administrators worldwide. Even though a lot of knowledge has already been presented, there are still strategic areas waiting to be discovered. One of them is stream fragmentation, as a side effect of deduplication, and critical restore in general.

<Chapter 3 the Problem of Stream Fragmentation>

<3.1 the Role of Restore in Backup Systems>

Even though restore does not happen as often as backup, it is used not only in case of lost data but also in order to stream the full backup to tape (third tier backup) and replicate changed data off-site. As a result, there exist even 20% of systems with actually more reads than writes, while on average reads are responsible for about 26% (mean; 9% median) of all the I/Os in an average backup system even when the replication activity is excluded [79].

Each attempt to restore data from a backup system can be caused by a number of reasons. Accidentally deleted file or access to a previous version of some document are actually one of the simplest requests to handle in a short time when considering disk based systems with easy random access to all the data. On the other hand, restoring full backups consisting of many GBs of data is a whole different problem of providing the maximal bandwidth for many hours. Even though such scenario does not necessarily mean some outage in the company (it can be a transfer of the data to some other place) this should be the case to be handled extremely well in the first place. The recovery time objective (RTO), being one of the most important factors of any backup system specification, actually makes the investment of thousands of dollars in a backup system rational for a vast majority of companies. Every emergency issue in this area may be seen as a major test for the backup system and the final verification of the investment for the company.

Figures 31, 32:
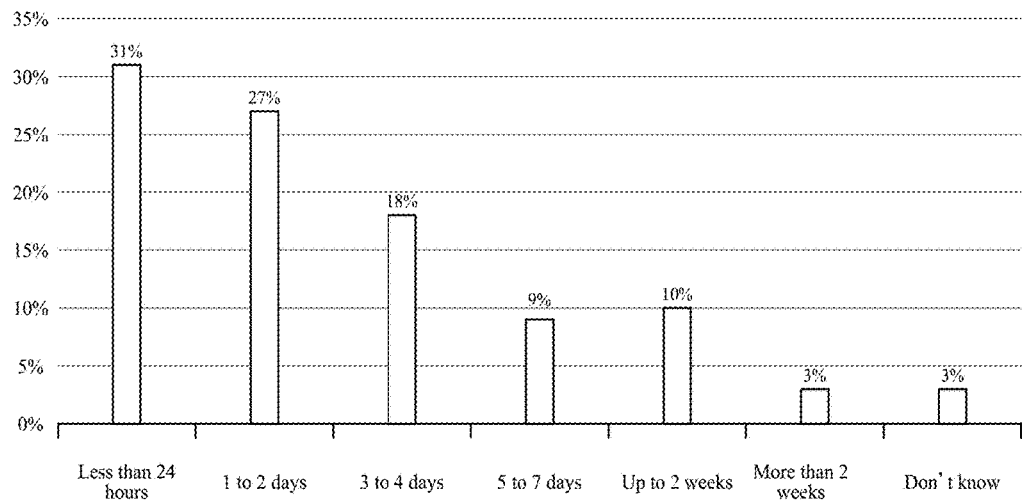
FIG. 31 is a diagram referred to in the research paper described in the fourth exemplary embodiment of the present invention.
FIG. 32 is a diagram referred to in the research paper described in the fourth exemplary embodiment of the present invention.

When analyzing the usual restore process some of its characteristics can be noticed. Very important one is the fact that not every backup has the same significance, which makes the restore process valued differently. First, it is the data itself which may be simply less critical for the company. Second, it is the time when the backup was taken and its usefulness for restore in case of emergency. FIG. 31 shows a result of a survey performed by Enterprise Strategy Group on 510 respondents. Not surprisingly, the data restored most often are the ones backed up very recently. Based on the results only 6% of restores are older then two weeks and the majority of them (58%) is recovered from last 48 hours.

To sum up, the big picture which appears above makes a clear goal for the verification of a backup system true value. It is the restore bandwidth of the latest backup. Even though this statement sounds very trivial, it has major consequences especially for the backup systems with deduplication, which are very close to become the most common in today's world and during the years to come.

<3.1.1 Backup Procedure>

Each company has its own backup policy, which should be the best answer to the data safety and disaster recovery requirements. One of the most common strategies is to perform a backup of all company data during the weekend and smaller, incremental backups every day [79]. This is usually caused by a very limited backup window every working day (the time available for the backup to finish) and a larger one during the weekend. When using deduplication system, the full backup can be performed even every day, as with such solution only new and modified data is actually stored (its size is more or less equal to the incremental backup), while all the other duplicate data are confirmed very quickly to the backup application making the process many times shorter than regular full backup.

Next characteristic to the backup policy is the retention period which may also be different in many companies [18]. The original idea was to limit the space used for backups which were less likely to be helpful in case of emergency restore. Usually the choice was to keep some (usually 5-30) most recent daily backups, about 4-26 weekly backups, close to 12-24 monthly backups and a few yearly. Very often the backups older than 3-6 months were moved to the so-called archive storage, which implies extremely low probability of usefulness. After introduction of deduplication systems the scenario is slowly changing. Thanks to the new technology each additional backup add almost no new data to the storage space, therefore, a company can keep daily backups for a year paying only slightly more (metadata) than keeping only the actual data and modifications. Having such technology makes keeping high granularity of backups possible at an extremely low price, which may eventually help to recover the exact state of given documents from the required date regardless of the time passed.

When looking at the single backup procedure one can notice another simple, but very important fact, which is related to data order and placement. Each storage system usually receives data in a so called stream: a sequence of bytes in some defined, logical order with beginning and end. Usually a backup application is responsible for creating such stream from a filesystem or directory which is to be stored. In case of storage filesystem mounted directly through NFS or CIFS such stream is equivalent to each transferred file (usually a quite big tar archive). Having a logical order each stream guarantees that every access to its data will be done sequentially and in the same order as it was written. This assumption is important for all backup systems, enabling them to achieve good performance. The access to data in a non sequential way would make those systems not usable from the market perspective [83, 66].

<3.1.2 Verified Combination: Prefetch and Cache>

The sequential access to data significantly helps to reduce the problem of the biggest bottleneck in restore performance, which is reading the data from the actual hard drive. Having the fact of optimal data placement, when it comes to popular HDDs, enables engineers to use simple but effective techniques improving the restore performance many times, when compared to the random or undefined data access pattern.

Prefetch

The most common and effective technique in case of sequential data is to prefetch it in fixed or variable big chunks from the hard drive to system memory. In the result of such operation user read request of only one block (e.g. 8 KB) triggers read from disks of a much larger chunk (e.g. 2 MB) placing all the read blocks (2 MB/8 KB=256) in system memory for further use. Thanks to such approach, in the case of sequential access it enables many following read operations to retrieve the data from the memory without paying the price of disk access.

This algorithm is actually a consequence of the HDD construction, which makes reading small portions of data very inefficient. The two main characteristics for each disk are: the data access time and transfer rate. The first one is the most problematic here. Before starting to transfer the data to the system memory, the disk has to move its head to the proper track (seek time) and wait for the required data to appear under the head (rotational latency). The whole process is very expensive and assuming constant transfer rate, the number of such data accesses determines the total read performance (see FIG. 32).

In addition, it is important to notice that the disk technology in terms of bandwidth and capacity is in constant development. Unfortunately at the same time both seek time and number of rotations stay basically at the same level for many years already. In fact, as this work was almost completed, Seagate announced new version of their Enterprise Capacity 3.5 HDD with 29% higher sustained data transfer rate (226 MB/s), but with no changes in the read access time [73]. Such unequal development makes the problem of fragmentation even more severe as accessing the data alone is taking larger and larger part of the total restore time.

Cache

After the data is prefetched from disk it is stored into a dedicated system memory called buffer cache (or read cache), which is usually much larger than the actual prefetch. The reason for that is lack of the ideal sequential load in the reality. In case of a small cache each non-sequential disruption (read from a different place on disk) would require reloading the data after coming back to the previous read sequence. Thanks to a larger size the cache can be not only resilient to some extent in the described scenario but also support read in not exact order (in case of data reordering during write) and the access to many streams at the same time. In case of duplicate elimination backup systems one more function of the cache becomes quite interesting and important. It can simply hold blocks of data, which are requested many times during a relatively short period, allowing additional improvement in the achieved restore bandwidth.

As the memory for cache is always limited it requires dedicated cache eviction/replacement policy. Each of many existing algorithms has its own best suitable usage. For the backup systems the most commonly used policy is Least Recently Used (LRU) [79, 53, 48, 83]. The main goal in this case is to discard the least recently used blocks first. Although the algorithm requires keeping track of what was used and when to make sure the correct item is removed, some optimizations exist to make it less expensive. The experiments with a few other well known algorithms such as Most Recently Used and Least-Frequently Used on the traces presented in this work also showed the much better results with the LRU.

It is important to state that for the page replacement policy (which is somewhat similar) the most efficient algorithm actually exists and is called: Bélády's optimal algorithm [5]. In order to achieve the optimal cache usage it first discards the page from memory that will not be needed for the longest time in the future. Unfortunately, since in general it is not possible to predict when the information will be needed, the algorithm is not implementable in practice for the majority of known scenarios. Also, the pages in memory differ from blocks so moving it into backup system environment is not straightforward but can bring interesting insights.

Efficiency Issues

Even though the prefetch/cache algorithm effectively helps achieving reasonable restore bandwidth, it sometimes does not work optimally. One case is when the access pattern is actually only partly sequential. Such pattern results in reading from disk possibly a lot of data which will never be used, and waste both the time during the actual read operation and the space in the memory, which effectively makes the cache even a few times smaller than actual memory reserved.

The other problem is connected with blocks loaded to cache many times. Such scenario may happen in case the block was either evicted from cache before it was used (too small cache or too random access) or even though it was already used it was required more than once (internal stream duplicate). When it comes to backup systems with duplicate elimination, especially the second scenario was surprisingly intensive in the traces I have explored even within one sequential stream of data.

<3.2 Fragmentation Problem in Systems with Duplicate Elimination>

In general fragmentation is defined as a state of being broken into fragments. For the purpose of this work we focus on a sequential stream of data which is backed up and the way it is stored on the disk drive in systems with duplicate elimination. As we are generally interested in the practical more than a theoretical point of view, as fragmentation we consider only such block reorder which requires additional I/O operation (disk accesses) when using described above prefetch/cache algorithm in comparison to the number of the I/Os needed in the case of perfect sequential data placement.

Backup systems with duplicate elimination differ much from those without such feature within the usage of storage space for the data. From the external point of view each backup process may still be seen as sequential but when it comes to the data which are deduplicated, only some will eventually get to the hard drive. Unfortunately, such write pattern highly increases the inefficiency problems in prefetch/cache algorithm described in Section 3.1.2 causing fragmentation. The concept of deduplication from its design will always eventually enforce storage of two blocks as neighbours on the disk which are in fact placed many MBs from each other in the actual logical stream, or do the opposite with the two logically sequential blocks. Such data placement required in order to save storage space opens a quite new area for researchers to identify and solve the new problems which appear.

In general three kinds of fragmentation problem exist, each caused by a different aspect of data deduplication with very individual impact on the final restore bandwidth (see FIG. 33). The detailed description and analysis of each area can be found in the following sections.

<3.2.1 Internal Stream Fragmentation>

The experiments show that having only one single backup in the entire system with deduplication may already cause degradation in its restore performance compared with the system without this feature. Such phenomenon is called internal stream fragmentation and is caused by identical blocks appearing many times in a single stream.

FIG. 34 shows a part of the initial backup (from logical block offset 402 to 438). In the presented sequence one can notice blocks which are stored in a different location on the disk than others (i'5, i'1, i'76 etc.) as they are duplicates stored already in the previous part of the same stream. The problem with such blocks is that in order to read them the disk drive has to move its head to a different location than current front of reading (between i'279 and i'304), which costs an extra I/O. What is more, the algorithm will usually try to read a full prefetch of the data placing it in cache. This wastes the allocated memory as, in many cases, only a small fraction of such blocks will ever be used. The whole process can be very expensive when it comes to the final restore bandwidth.

Note that blocks i'6 and i'129 do not cause the additional disk access even though they are not in the main sequence (from i'279 to i'304). This is due to the fact that those blocks will be present in the cache memory while reading thanks to previously read blocks i'S and i'128 with no additional I/O required. What is more, one can notice two blocks named i'S while only the first is marked as causing disk access. It simply assumes that as the block i'5 was read only 27 blocks earlier, it will be still present in the cache during the restore of its second copy.

Having looked at FIG. 34 and assuming example prefetch size of 4 blocks and the cache of 100 blocks (quite large as it fits 25% of a stream so far), we can visualize the difference in the number of I/O required in two interesting cases. When the shown part of the stream is stored in a system without deduplication we need 10 I/O (=10×prefetch of size 4) to read the entire part. The reason for this is the sequential read of 37 blocks (from 402 to 438) as in such system logical address are identical to physical ones. On the other hand, when using deduplication we need 7 I/Os to read the continuous data from i'279 to i'304 (26 blocks) and 8 additional I/Os to read the duplicate data (see FIG. 34). When comparing both results the difference between described scenarios is at the level of 50% (10 vs 15 I/Os) which means half the time more for the system with deduplication to restore the same backup data. Note that we have assumed a moderately large cache size as otherwise we might need to reconsider adding an extra I/O to read the second i'5 block (logical offset 431), as it could have been evicted from the cache meanwhile (between reading offset 404 and 431).

Fortunately, the appearance of internal duplicate blocks can be cleverly twisted in order to decrease rather than increase the total time required for the stream restore. Let us assume the same initial backup is read from the very beginning (starting from logical offsets 1, 2, 3 . . . ) but with unlimited cache. In such case, after achieving block 402 (disk location: i'279) all the blocks marked as duplicates will be already present in the memory. As a result, when requesting the part presented in FIG. 34 only 7 I/Os will be required instead of original 10 in the system without deduplication, ending up in a restore time smaller by 30%.

In general, even though it was expected that duplicates can also appear within one stream, a rather surprising fact is the scale of such appearance and its negative impact on the restore bandwidth in the experiments. The better news is a more or less constant number of internal duplicate blocks and similar impact on every backup regardless of the time and number of backups performed before. The important fact, on the other hand, is the observation of unlimited cache size impact, which will be further analyzed and inspire the presentation of alternative cache eviction policy supported by limited forward knowledge (see Chapter 4).

<3.2.2 Inter-Version Fragmentation>

As backups are performed regularly (daily/weekly/monthly [18]) each piece of one logical stream can be found in various versions of the same data set. Every such version differs from the previous one by the amount of data modified within one backup cycle (usually very small percentage), which makes the consequent versions of the same data set very similar.

Each backup system with deduplication will discover duplicated blocks and eventually store only the ones which have changed, while the most popular in-line solutions (see comparison with off-line version in Section 2.2.1) will always place all the modified/new blocks together in some continuous storage area in a currently unoccupied space. Unfortunately, after tens or hundreds of backups such data placements cause the data of the latest backup to be scattered all over the storage space.

Figure 35:
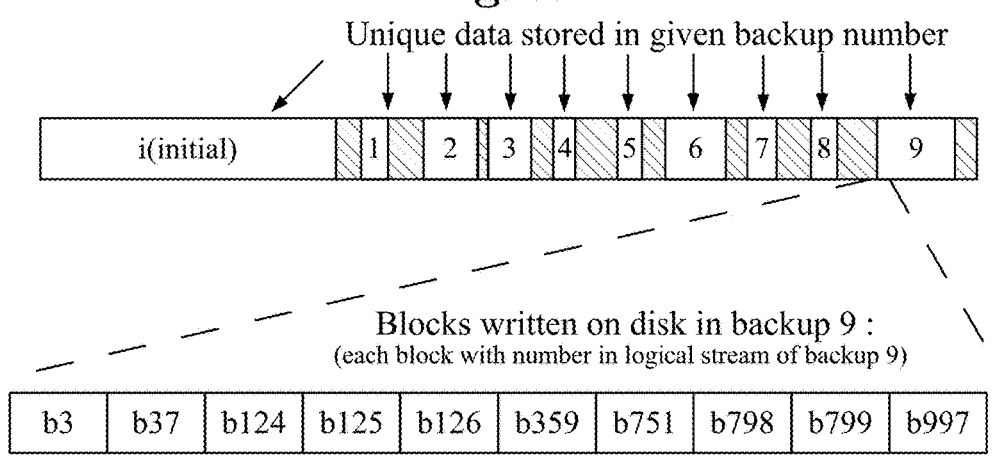
FIG. 35 is a diagram referred to in the research paper described in the fourth exemplary embodiment of the present invention.

FIG. 35 shows ten versions of a sample backup set stored in a system with in-line deduplication. Each version is stored in one continuous segment on the disk, but as the initial one stores all it's data, the versions from 1 to 9 add only data which were not present in previous backups (all the duplicate blocks are eliminated and not stored on the disk). As a result, blocks belonging to the logical backup 9 can be found on disk in each of the sections initial and 1 to 9.

The restore process of the first 38 blocks of backup 9 is visualized in FIG. 36. Assuming a prefetch size of 4 blocks and even unlimited cache memory, reading all the blocks in the shown example requires 21 I/Os (see marked blocks), while in the system where all the data are placed always sequentially only 10 I/Os (38 divided by prefetch size) are enough. Finally, an over doubled restore time is the actual cost of fragmentation in the described scenario.

The fragmentation achieved in such way is called inter-version fragmentation. The distinctive fact here is that, such kind of fragmentation is not present when one starts using the system, and increases during the following backups with a rate very unique for each data set and usage pattern. As the process is rather invisible during the common backup cycle, it will usually appear when the restore is necessary, which may uncover the problem of a few times lower restore bandwidth than expected. Such discovery may have very expensive consequences in case the restore was an urgent issue.

As regards inter-version fragmentation, two facts seem to clearly visualize the core of the problem. The first one is the character of changes which is slow and increasing with the number of backups, while the other is the knowledge about the typical age of recovered data (see FIG. 31) described in Section 3.1. Given the most recent backup is the most likely to be restored, the issue seams to be very serious, but on the other hand, gathered information give an interesting insight when trying to solve the problem.

<3.2.3 Global Fragmentation>

Global fragmentation is actually very similar to the internal one. The only but significant difference is that problematic duplicates do not come from the earlier part of the same stream but from a completely unrelated one. This is due to the fact that with internal fragmentation the problem was caused by the second and further block appearances in the stream, which allowed us to fight with its negative consequences by keeping the already restored blocks in the long enough cache. In case of the global fragmentation the issue appears with already the first block appearance (further ones should rather be qualified as internal fragmentation) and as the block is outside of the current backup set, it can be found in just about any location within the whole system.

I have performed a simple experiment on five independent data sets in order to verify the amount of global duplicate blocks and the impact of global fragmentation on restore performance. For each data set the first backup was chosen as a data set representative. The backup system was prepared by storing all representatives but the one tested which was loaded as the last one. By comparing the number of duplicate blocks and the bandwidth with the scenario when such backup is stored as the only one in the system, we can visualize the scale of the problem.

The results in FIG. 37 show actually a very small amount of global duplicate blocks present in other independent data sets (between 0.01% and 1.47%). Even though the outcome suggests a relatively small impact on the restore bandwidth (between 0.06% and 8.91%), the actual numbers can differ and will most probably slowly increase with the number of independent data sets and the total size of unique data stored in the system.

What can be surely done to eliminate global fragmentation is to backup together (in one stream) all the data which can potentially have common blocks such as mail/home backups of different employees or virtual machine system partition images. Unfortunately, such approach makes sense only until there exists probability of restoring those data together as otherwise it does not help. The goal of the described modification is to transfer the global fragmentation into the internal one which is much easier to deal with.

On the other hand, as the test result (FIG. 37) suggests, independent data sets share only a very small amount of data causing sometimes considerable amount of fragmentation (see IssueRepository). In order to prevent such scenario one could decide not to deduplicate against other data sets but only against previous version of the current one. Such approach will eliminate the global fragmentation at the cost of usually small additional blocks stored.

The global fragmentation is definitely the most problematic and complex one, both to analyze and to solve, when assuming that no duplicate blocks are allowed to be stored. Eliminating duplicate blocks to any of the current system data makes our backup dependent in some way on another completely unrelated one or possibly more. Even though some globally optimal position for each common block exists, its calculation is usually complicated and even if found, at least some of the involved backups will anyway suffer from fragmentation. What is more, the impact of such factor actually cannot be verified, as each of given traces will behave differently based on the other data present in the system.

The described complications, usually a small amount of global duplicate blocks in the backup stream and rather constant impact on the restore performance (with constant number of data sets), result in much higher priority of the other problems: inter-version and internal stream fragmentation. Taking that into account and the character of global fragmentation, rather hard or even impossible to verify, I have decided not to analyze this problem further in this work.

<3.2.4 Scalability Issues>

The whole new perspective has to be taken into account when large deduplication backup systems are to be examined. Having tens or hundreds of servers together with even thousands of hard disks all the issues tend to reach another level. On one hand, there is more hardware to handle requests and mask the potential problems, but on the other, the scalability objectives require scaling the system capabilities together with its size.

Usually when restoring backup stream from a large system many disks are involved in the process. Because of the erasure coding [80] or RAID usually present, even each single block is cut into smaller fragments and then placed on many hard drives. More disks means better resiliency and higher potential single stream performance but unfortunately, together with multiplication of fragmentation issues and sometimes even more expensive access to a single block. Assuming, that one continuous stream is held by 10 disks, in order to read it and preserve the close to optimal bandwidth (i.e. close to 1750 MB/s instead of 175 MB/s with one disk [71]) one should prefetch about 2 MB of data from each disk, ending up with total prefetch of 20 MB (see similar observations in [48]). As such big prefetch has much higher chance of being ineffective, in practice most systems use much smaller buffer agreeing on suboptimal choice and limiting maximal possible performance [48]. Bigger overall prefetch means also higher probability of wasting cache memory by prefetching not needed data and higher maximal fragmentation, as a result requiring a few times bigger cache. Last but not least, in case of one disk drive the minimal size of useful data was 8 KB out of 2 MB prefetch (0.4%), while with a scalable solution sometimes it was even 8 KB out of 20 MB (0.04%), significantly increasing the cost of each random read. Note that with RAID configured with larger stripe size than deduplication block size, one block may not be cut into many fragments. Still, assuming typical stripe sizes of 4-128 KB and the fact that we never read less than the prefetch size of data (2-20 MB) all the drives will be used anyway, which leaves the user in a similar scenario to the erasure coded one.

In general, it is much easier to assure good bandwidth having more spindles, but with a big system one should expect much more than a decent single stream performance of a single disk drive. In case of emergency one should expect the restore process of the number of streams usually backed up every day/week, which suggests keeping the scalability of reads at the same level as writes, which are usually performed in one or a very limited number of disk locations. Regardless of that, even in the simplest scenario of restoring single stream the maximal performance with using minimal amount of power and system memory is desirable.

<3.3 Problem Magnitude>

In order to visualize the real scale of the fragmentation problem I have performed simulations on six different data sets gathered from customers of commercial system HYDRAstor. The detailed description of all data sets and the experimental methodology can be found in Section 6.1.

<3.3.1 Impact of Different Kinds of Fragmentation on the Latest Backup>

Figure 38:
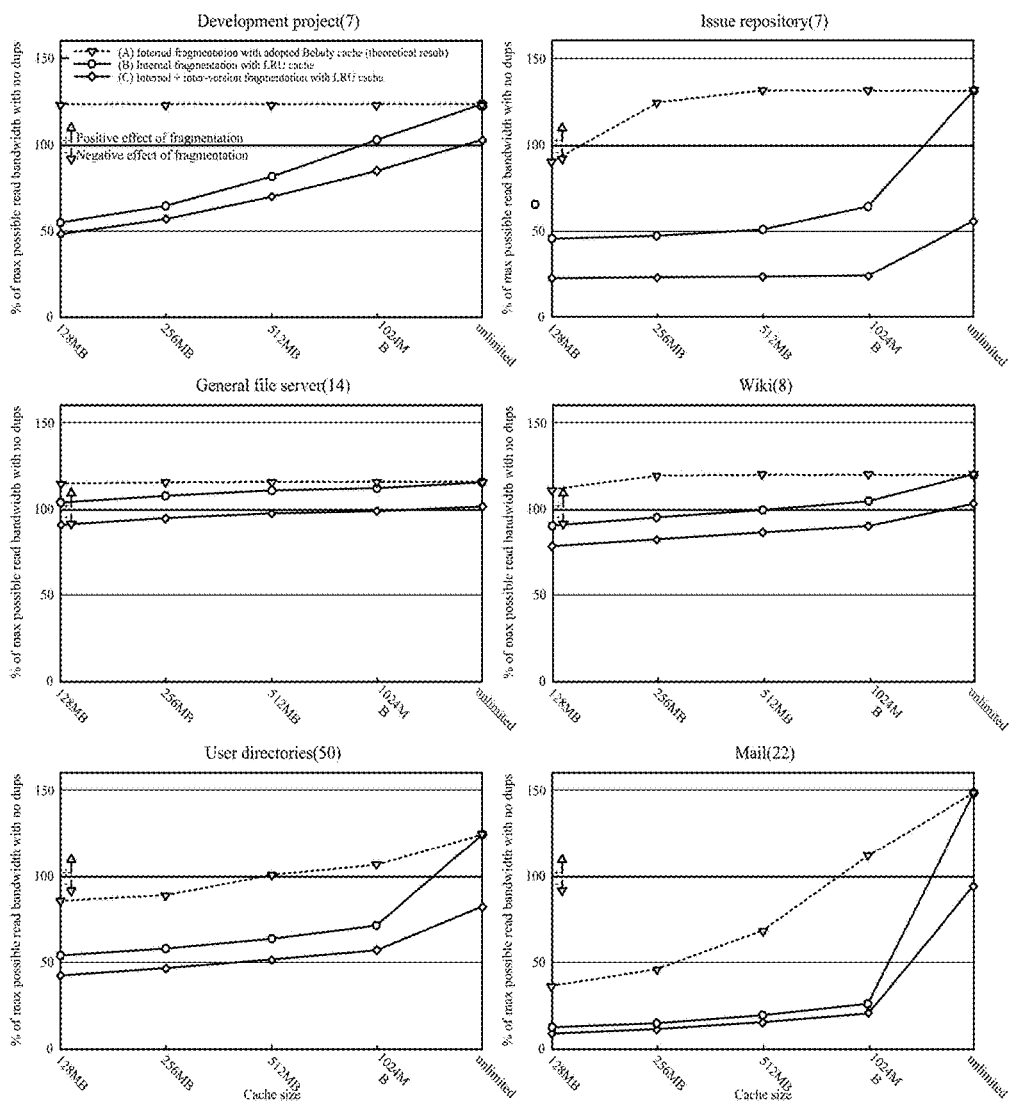
FIG. 38 is a diagram referred to in the research paper described in the fourth exemplary embodiment of the present invention.

In FIG. 38 the topmost line corresponds to restore bandwidth achievable by the latest backup with given cache memory size and adopted B él ady's cache eviction policy (called adopted B él ady's cache), which, even though not optimal when moving from pages to blocks, states the achievable performance level very well (see Section 3.1.2 for details on the algorithm and Section 8.2.2 for discussion on its lack of optimality in case of prefetching blocks). The other lines are the results of simulations with real backup system and most common LRU cache eviction policy. While the middle one shows the numbers with only latest backup present in the whole system, therefore showing the impact of internal stream fragmentation, the bottom one represents a latest backup bandwidth after all the backups from the data set are stored, though including the inter-version fragmentation as well.

The results were gathered for different cache sizes and visualized as a percentage of restore bandwidth achieved for a system without deduplication (assuming sequential data location and the cache size to fit one prefetch only). Note that with using unlimited memory the internal fragmentation does not exist (only inter-version fragmentation is visible), as in case of a read request for any duplicate block the algorithm will always receive it directly from the memory. Furthermore, the restore bandwidth with such unlimited cache can be regarded as the maximal as long as there is no inter-version fragmentation nor data reordering in the backup stream.

One can easily notice high, even above 100%, maximum bandwidth level for each data set starting from some memory level. This phenomenon is in fact the positive impact of internal stream duplicate blocks described in Section 3.2.1 (reading duplicate data which are already in the memory). Even though for some data sets such values would be possible even for realistic cache sizes (512 MB and below), in practice the results show up to 70% performance degradation (see: Mail and IssueRepository charts). What is more when adding the impact of inter-version fragmentation (up to 50% degradation) the final result can reach even 81% below the optimal level (IssueRepository) which is 75% below the level of a system without deduplication.

In general, it is very difficult to argue about the importance of either of inter-version or internal stream fragmentation. Even though they both add up to the restore performance degradation of the latest backup, their origin and characteristics are much different. Also, the impact of each of them highly depends on the data set used for measurement. More important, the inter-version fragmentation increases with each backup, which makes the moment of measurement very significant.

<3.3.2 Fragmentation in Time>

Figure 39:
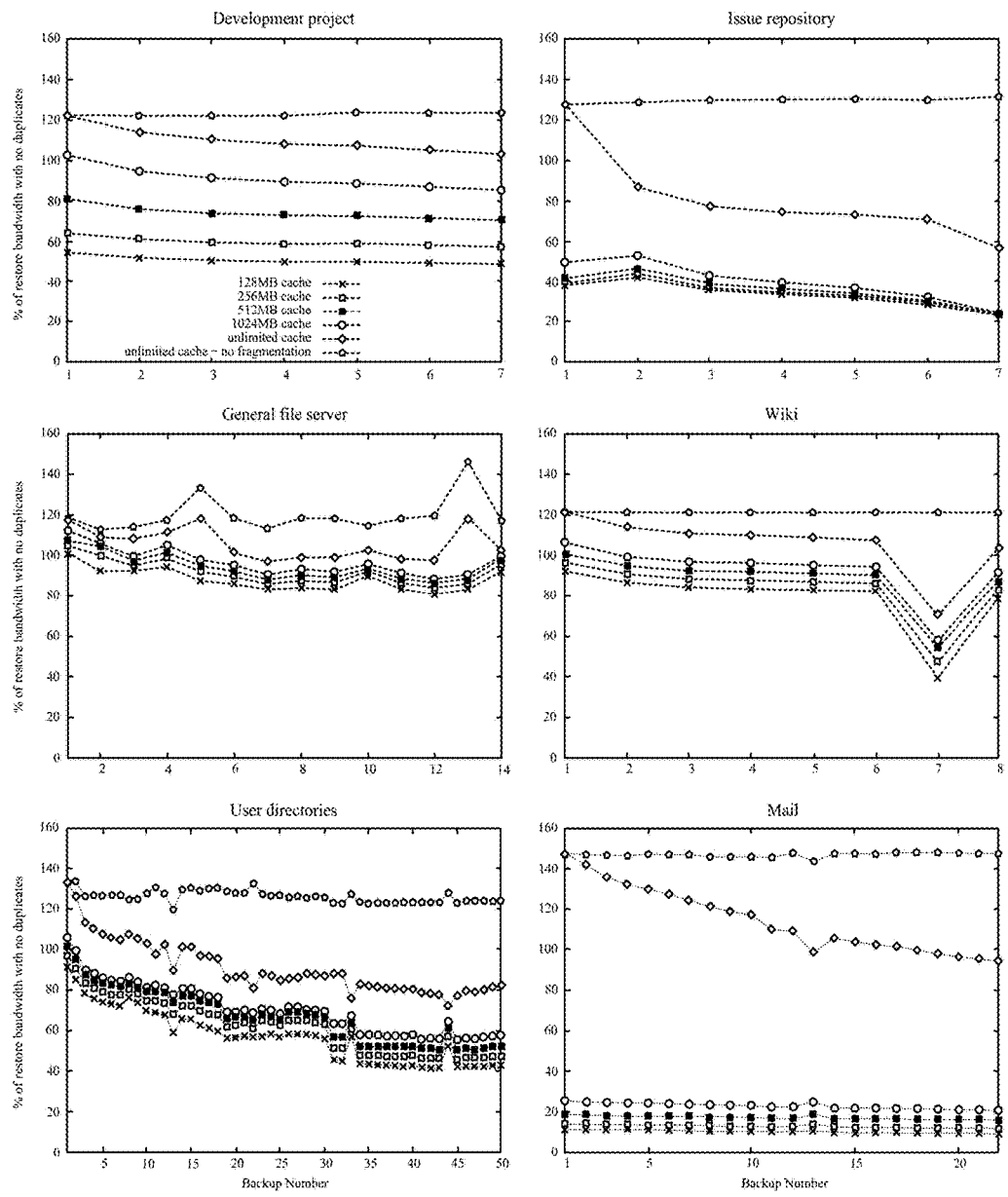
FIG. 39 is a diagram referred to in the research paper described in the fourth exemplary embodiment of the present invention.

The perspective of time or the actual number of backups performed, is very important when it comes to the backup systems with in-line duplicate elimination. FIG. 39 shows the problem of fragmentation after each performed backup. The top line represents the bandwidth achievable with unlimited cache (eliminates internal stream fragmentation) and no inter-version fragmentation to show the maximal performance level achievable for each backup in each data set. All the other lines include both kinds of fragmentation.

Unfortunately, while having not more than 50 backups, it was difficult to show the impact of the problem which could be verified best after many years of regular backups. Some approximation, though, is given by Lillibridge et al. in [53] through a synthetic data set of 480 backups covering a period of 2 years and showing a drop of up to 44 times when no defragmentation was used. Even though it was generated by HP Storage Division based on the customers involving high fragmentation, it still visualizes the problem well.

As my experiments show (see FIG. 40), the level of internal stream fragmentation is more or less stable for most backups within one set and usually stays at the level of first initial backup. Therefore, the decrease with every additional backup is in general caused by inter-version fragmentation. As such performance drop, expressed as the percentage of the initial backup, is similar regardless of the cache size the actual scale of the problem can be easily noticed while looking at two topmost lines in FIG. 39. Both of them with unlimited memory (which disables impact of internal stream fragmentation), but only the upper one without inter-version fragmentation included. The lines for each cache size and no inter-version fragmentation were omitted due to the clearness of charts, but the detailed impact of each factor on the latest backup is presented on FIG. 38.

<3.3.3 Cache Size Impact on Restore Time>

Figure 40:
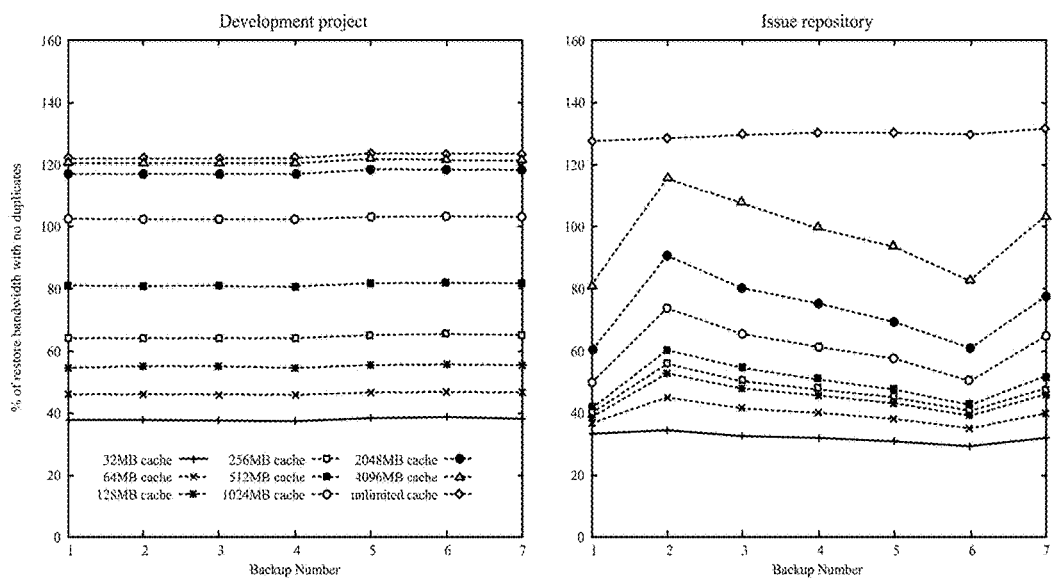
FIG. 40 is a diagram referred to in the research paper described in the fourth exemplary embodiment of the present invention.

As shown in FIG. 40 and 3.5, the cache may be considered as the weapon used to fight internal stream fragmentation. Even though it does the work (especially when unlimited memory is available), the price is very high. For example, when starting with 32 MB of cache memory with DevelopmentProject one need to use 16 times more memory (512 MB) in order just to double the restore bandwidth and still be under the 100% line for system without duplicates. Similarly, with IssueRepository to achieve the same result, the memory required is even 64 times higher (2048 MB). Additionally, when having in mind that modern backup systems handle many backup streams at once, the required memory would have to be multiplied again by many times, making the total system requirements enormous.

What is more, even though the increasing memory does improve the performance of usual backup, the help received is very ineffective. As the algorithm with adopted Bélády's cache show (the total topmost line in FIG. 38), in most cases having only 128 MB or 256 MB cache memory backup should be able to allow the restore with near maximal possible bandwidth, which is from 20% (GeneralFileServer 256 MB) up to 519% (IssueRepository 256 MB) higher than the one achieved with conventional cache usage (LRU) and usually above the level of non duplicate system bandwidth. The only data set which differs much is Mail, where the internal duplicates pattern causes even the adopted Bélády's cache not to achieve non duplicate bandwidth levels with reasonable amounts of memory.

On the other hand, as regards the inter-version fragmentation, the additional memory does not seem to help much (FIG. 38). The impact on increasing restore time caused by this aspect of fragmentation is similar regardless of the cache size and equal to 13-20% for the shortest sets (Wiki, DevelopmentProject, GeneralFileServer), 34-46% for the Mail and UserDirectories and up to even 91-171% for the most fragmented IssueRepository after only 7 backups.

Simulation results of using different cache sizes within one data set show only moderate impact of the memory size on the actually achieved bandwidth but also indicate the reason of such observation. While the inter-version fragmentation problem does seem to be more or less memory-independent, the second issue connected with internal fragmentation is simply caused by the poor memory effectiveness reached by the common Least Recently Used cache eviction policy. As the experiments with adopted Bélády's cache show (see FIG. 38), the potential solution of this problem may offer higher restore bandwidth with using even 8 times smaller amount of memory (in all data sets having 128 MB with adopted Bélády's cache is better than 1024 MB with LRU).

<3.4 Options to Reduce the Negative Impact of Fragmentation During Restore>

Fragmentation is a natural by-product (or rather waste) of deduplication. It is possible to completely eliminate fragmentation by keeping each backup in a separate continuous disk space with no interference between backups, however, in such case there will be no deduplication.

Another approach to practically eliminate impact of fragmentation on restore performance is to use a big expected block size for deduplication. In such case, when fragmentation happens, it will not degrade restore speed much, because the seek time is dominated by the time needed to read block data. For example, with 16 MB expected blocks size, read disk bandwidth of 175 MB/s and 12.67 ms read access time [71], a seek on each block read will increase the restore time by less than 14%. However, optimal block size for deduplication varies between 4 KB and 16 KB depending on particular data pattern and storage system characterization (we need to include block metadata in computing the effectiveness of dedup [69]). With much larger blocks, the dedup becomes quite ineffective, so using such big blocks is not a viable option [54, 69, 42].

An interesting solution would be to use reduced deduplication in order to fight fragmentation. In this approach whenever some currently written block is far away on the disk during backup, it can be simply stored on the disk regardless of the existing copy. Unfortunately, as one of the solutions show [48], this path leads to lower duplication ratio especially when moving towards reasonable restore results. An interesting trade-off would be to fight global fragmentation this way (as it is usually caused by a small number of duplicates) but use other techniques, which would save the full deduplication, to solve inter-version and internal stream fragmentation.

Given backup systems usually consist of many servers and disks, they can also be used in order to speed up the restore. If the performance from one drive is at the level of 25% of the one achieved by system with no deduplication one can use four (or more) disks in order to reach the desired level (together with prefetch and cache multiplication and all the consequences). The only modification necessary would be to divide the single stream between the chosen number of drives, which is often the case anyway (e.g. RAID). Although this proposal means rather masking than solving the problem, it will work whenever sufficient number of not fully utilized devices are available.

Finally, there is one more potentially good solution for the problem of inter-version fragmentation called off-line deduplication (see Section 2.2.1 for details). In this approach as the latest backup is always stored as single sequential stream, the restore performance is optimal (assuming no internal duplicates). Unfortunately, the number of problems with this deduplication concept results in a very small percentage of such solutions present on the market.

The options presented above, although possible and sometimes even very easy to introduce, require either fair amount of additional resource or propose trade-offs which are not easily acceptable (i.e. restore bandwidth at the cost of deduplication effectiveness). On the other hand, just by looking at the details of the backup and restore process one can find a number of interesting characteristics. Using them in a dedicated way may actually solve the problem with only minimal cost and surprisingly reach restore bandwidth levels not achievable before, sometimes even higher than those provided by backup systems with no deduplication.

<Chapter 4 Cache with Limited Forward Knowledge to Reduce Impact of Internal Fragmentation>

As it was stated in the previous section, one of the main reasons for a usually low restore bandwidth in systems with duplicate elimination is internal stream fragmentation. When analyzing the test results for each cache size (see FIG. 38), one can notice much higher restore bandwidth achieved with the adopted Bélády's cache when compared with the common solution with LRU cache, even when only single backup is present in the backup system (without inter-version fragmentation). Even though the results differ much depending on the data set, the average increase for all cache sizes is above 80%, while for the example with 256 MB cache size the values differ from 7% and 25% for GeneralFileServer and Wiki up to 160% and 197% for IssueRepository and Mail.

The actual problem visualized in the above results is inefficient usage of cache memory. Because of the poor quality of prediction delivered by LRU very often the block is evicted from cache before it is actually used (or reused), while at the same time many blocks not needed at all occupy memory. This is true especially in backup systems with deduplication where many copies of the same block appear quite often in a single stream (see FIG. 51 for more details).

In this chapter I would like to present the algorithm of cache eviction policy with limited forward knowledge, whose purpose is to alleviate the consequences of internal stream fragmentation by keeping only the blocks which will be referenced in the near future. The side effect of the proposed solution is also a more effective cache usage in general, which provides benefits also when used for streams with inter-version fragmentation.

<4.1 Desired Properties of the Final Solution>

In order to successfully replace LRU as a cache replacement policy the new solution should:

provide the restore bandwidth close to the one achieved with adopted Bélády's cache (and of course significantly higher than LRU), not require additional data to be stored (maximal deduplication effectiveness should be kept), enforce only small if any modifications in restore algorithm, not require any changes outside of the restore algorithm, not require much additional resources such as disk bandwidth, spindles and processing power, offer a range of choices in addressing trade-offs if necessary.

<4.2 the Idea>

Each data set before being stored in a backup system is usually compacted into one large (tens or hundreds of GBs [79]) logical stream by a backup application. Many read [48] and deduplication [83] algorithms already rely on such backup policy and tend to optimize the path of streaming access, which is in fact very common in backup systems. In my idea I would like to further optimize this well known property during the restore process.

As the problem of internal stream fragmentation seems to appear quite often, any forward knowledge can be very useful in order to keep in memory only those blocks which would reappear in the nearest future. The idea itself is present in the Bélády's algorithm [5], but the major issue making it useless in general is that such information is difficult or even impossible to get. Luckily, in a backup system this characteristic is different as backups are generally very big and accessed in the same order as they were written. When starting a restore one can usually find out the whole restore recipe, which means having access to actually unlimited knowledge about blocks being requested in the future.

Even though the idea of using all forward addresses is tempting, in reality it is not necessary as they would occupy precious memory which could otherwise be used for the actual cache (to keep the data). My experiments showed that having only limited amount of such forward knowledge is enough in order to deliver good restore performance which is very often close to the results of the adopted Bélády's cache (which has infinite forward knowledge).

<4.3 System Support>

To implement the limited forward knowledge cache I assume a backup system supporting the following abilities:

one address for all blocks with identical content: Blocks with the same content should also have the same address. In case of backup systems this property is assured by content addressability [66];

whole backup restore with single stream identifier: Single identifier delivered to the system should be sufficient in order to read the entire backup;

ability to prefetch metadata in advance: The system should be able to read defined amount of metadata first before retrieving the actual data. Such metadata will be required for the cache eviction policy to assure better memory usage.

Most systems with deduplication already support content addressability [83, 23] and provide mechanism for reading the whole stream, given for example the file path as identifier. Also every restore requires the metadata, which are gradually read from dedicated place in the system (usually separate from the data) in order to receive the full recipe and the addresses of the actual data blocks. Small reorganization in order to read more of such metadata before beginning of a stream restore can be easily introduced. As a result, the algorithm described in the next section can be seen as generic and adoptable to a wide range of systems with deduplication.

<4.4 Algorithm Details>

<4.4.1 the System Restore Algorithm>

Figure 41:
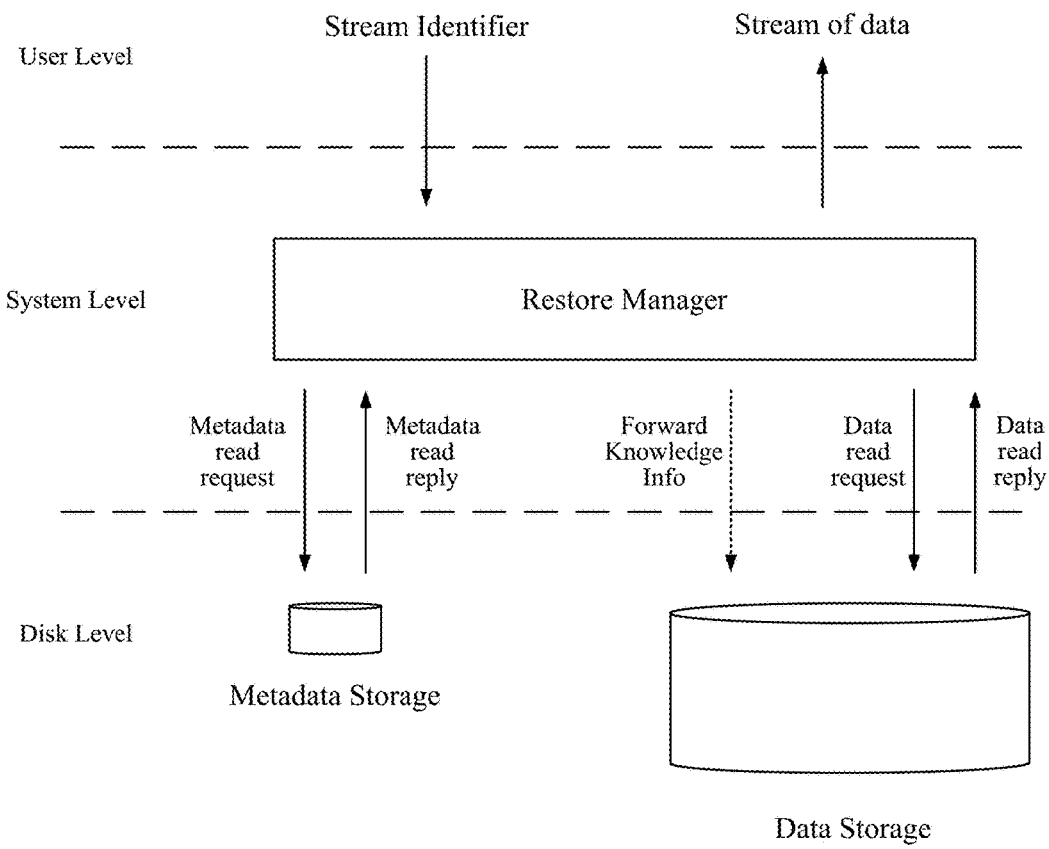
FIG. 41 is a diagram referred to in the research paper described in the fourth exemplary embodiment of the present invention.

Looking from the system level, a restore of a stream starts by receiving the stream identifier (see FIG. 41). Even though such operation unlocks the access to all metadata required, usually only some small amount is read in order not to occupy too much memory. Based on this, the requests to read blocks with dedicated addresses are sent. When the restore proceeds, the additional metadata is read and more requests are issued. The whole process is very smooth in order to provide constant load fully utilizing the system and its resources.

The basic idea of the proposed solution is to use the information which is already in the system. As having the knowledge about future blocks to be read can be very useful for caching policy, the algorithm should be able to read some reasonable amount of such forward knowledge.

<4.4.2 the Disk Restore Process>

Figure 42:
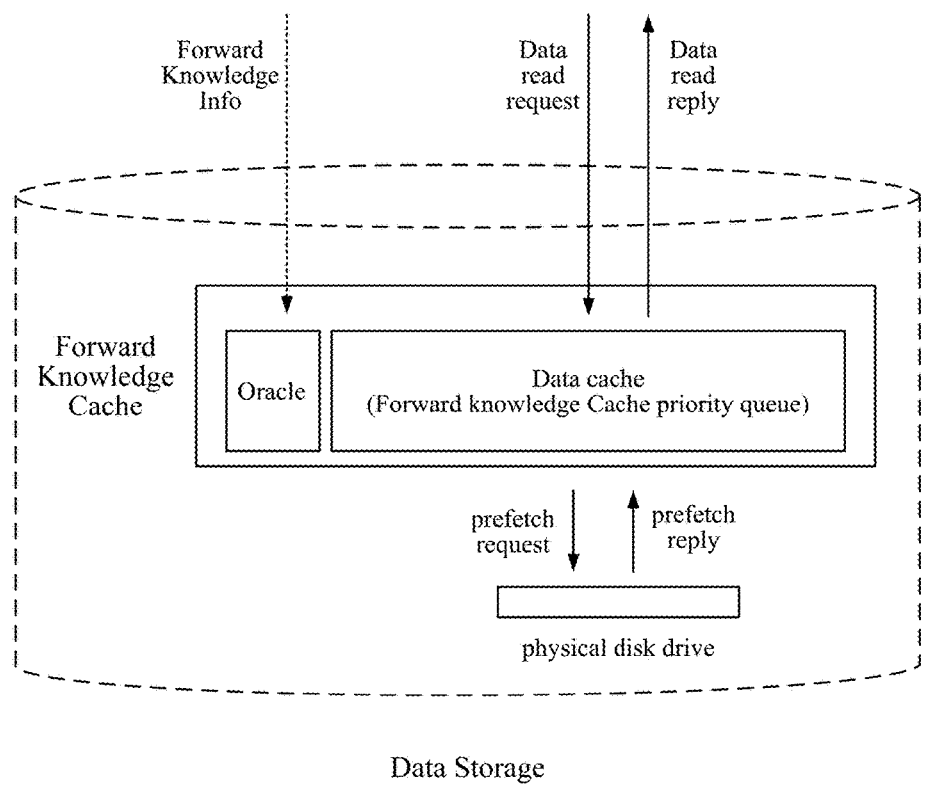
FIG. 42 is a diagram referred to in the research paper described in the fourth exemplary embodiment of the present invention.

At the disk level, when it comes to the data storage, the standard prefetch and cache algorithm is used but with modified cache eviction policy (see FIG. 42). Thanks to the forward information received, a dedicated oracle with limited forward knowledge can be created. Its information about next block occurrence helps with assuring close to optimal memory allocation in cache.

Whenever the name cache is used in this thesis it always refers to the memory where the actual data is kept, common for all caching algorithms (data cache area on the above figure). As a result, it does not cover additional memory required by specific solutions. LRU cache, Forward Knowledge cache and other similar names are used to refer to the entire algorithm utilizing corresponding cache eviction policy.

The Oracle with Limited Forward Knowledge

Figure 43:
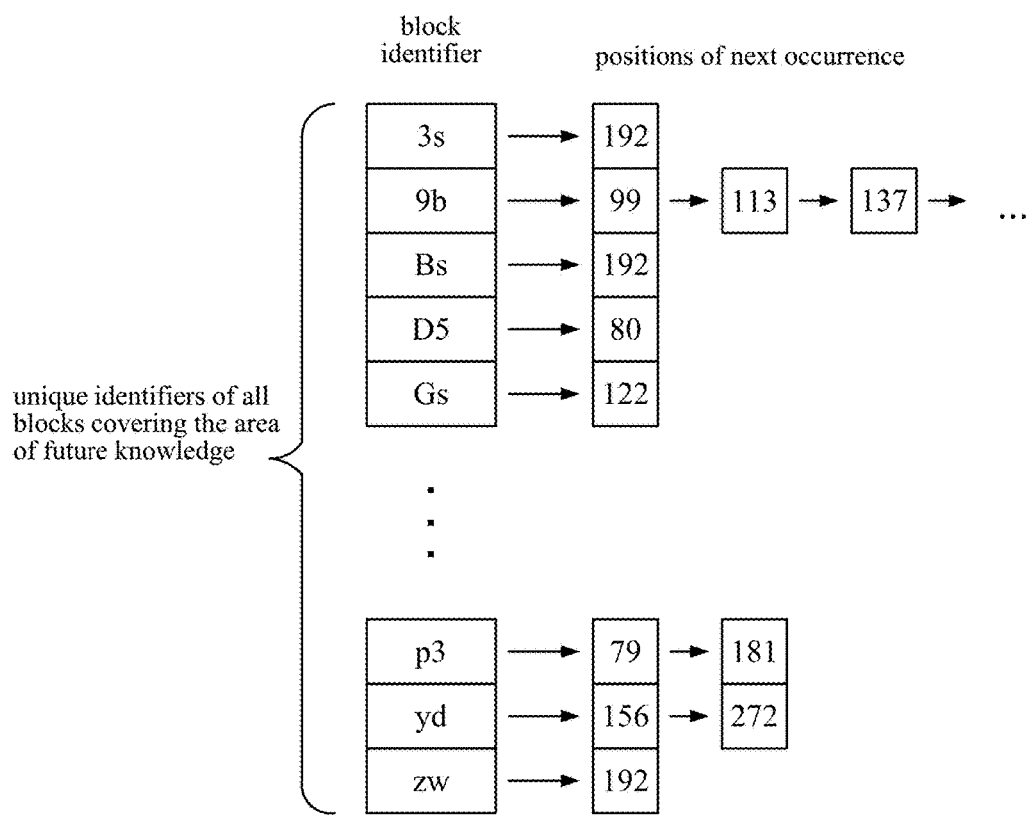
FIG. 43 is a diagram referred to in the research paper described in the fourth exemplary embodiment of the present invention.

The oracle is designed as a map keeping the identifiers of all known forward but unread blocks together with sorted list of block positions in which they appear in a stream (see FIG. 43). The update with forward information will add an identifier of a block if not present and push the proper block position at the back of its list. When necessary, the structure may return for a given block the closest future position in which it will be required, or update the most recently read block by removing its closest (current) position from the list of next block occurrences. With the additional data, the oracle with limited forward knowledge requires dedicated memory different from the one where the cache data are kept. For each block address from the total amount of forward knowledge, both the block identifier and its position in the stream are required. Fortunately, the size of both can be limited to use only fraction of memory that is required for the actual cache.

Each block in a system can be identified by its address. In deduplication backup systems such address is usually based on a block content and is calculated using a hash function such as 160-bit SHA1. Such original address (hash) size is designed to assure an extremely low probability of collision in order not to assume two different blocks as identical ones (see Section 2.2.4 for details). Fortunately, in the case of the oracle structure such information does not need to be that precise. First, even when some hash collision appears, the only thing which happens is keeping in memory a single block, which will in fact not be needed in the future (and will be easily detected and removed when the expected occurrence does not happen). Second, with limited forward knowledge the algorithm limits also the subset of the whole storage system in order to find the collision (i.e. to a few GBs). In order to set an example there is a 1 to 10 million chance for a hash collision within about 2 million of blocks (=16 GB of data, assuming 8 KB block size) while having 64 bit (8 bytes) hash function and assuming its uniform distribution (the following Math 1). This leads to the conclusion, that 64 bit identifier is good enough for the purpose of providing required functionality.

$$\frac{N-1}{N} \cdot \frac{N-2}{N} \cdot \ldots \cdot \frac{N-(k-1)}{N}; \text{ where } N = 2^{64}, k = 2 \cdot 10^6 \quad \text{[Math. 1]}$$

The exact information about block location in the stream is also not required in the algorithm. As its only purpose is to roughly compare the blocks position on the quite large part of a stream (i.e. a few GBs), it is enough to divide the stream into sections and keep only this reduced information in order to save the memory. Such a section may cover for example 8 MB (arbitrary number) and be identified by its number sequentially from the beginning of a stream. As it would be desired to keep the section identifier limited (i.e. 2 bytes) in case all numbers are used, renumbering operation can be performed to subtract the number of current section from all the numbers stored in the oracle. In our example such operation, even though cheap as performed in memory, will be executed once every 8 MB·64K(2 bytes)–8 GB(of-forwardknowledge)=504 GB of data restored in a single stream (which in reality can happen in only a few % of cases according to backup workload analysis of over 10000 of systems by Wallace et al. [79]).

Cached Blocks Locations

The forward knowledge cache is in general organized as a standard map with block addresses as keys and the data as values. The only difference from LRU is the kind of information kept (see FIG. 44). Instead of the list storing least recently used blocks (LRU priority queue) the ordered list of blocks with the closest occurrence is kept—FK Cache priority queue (with ability to binary search in case a block with new location is added). All the operations, such as updating or adding blocks, are very similar to the operations on LRU structures, beside the fact that instead of the latest usage the next block occurrence information is stored.

The Eviction Policy

Figure 45:
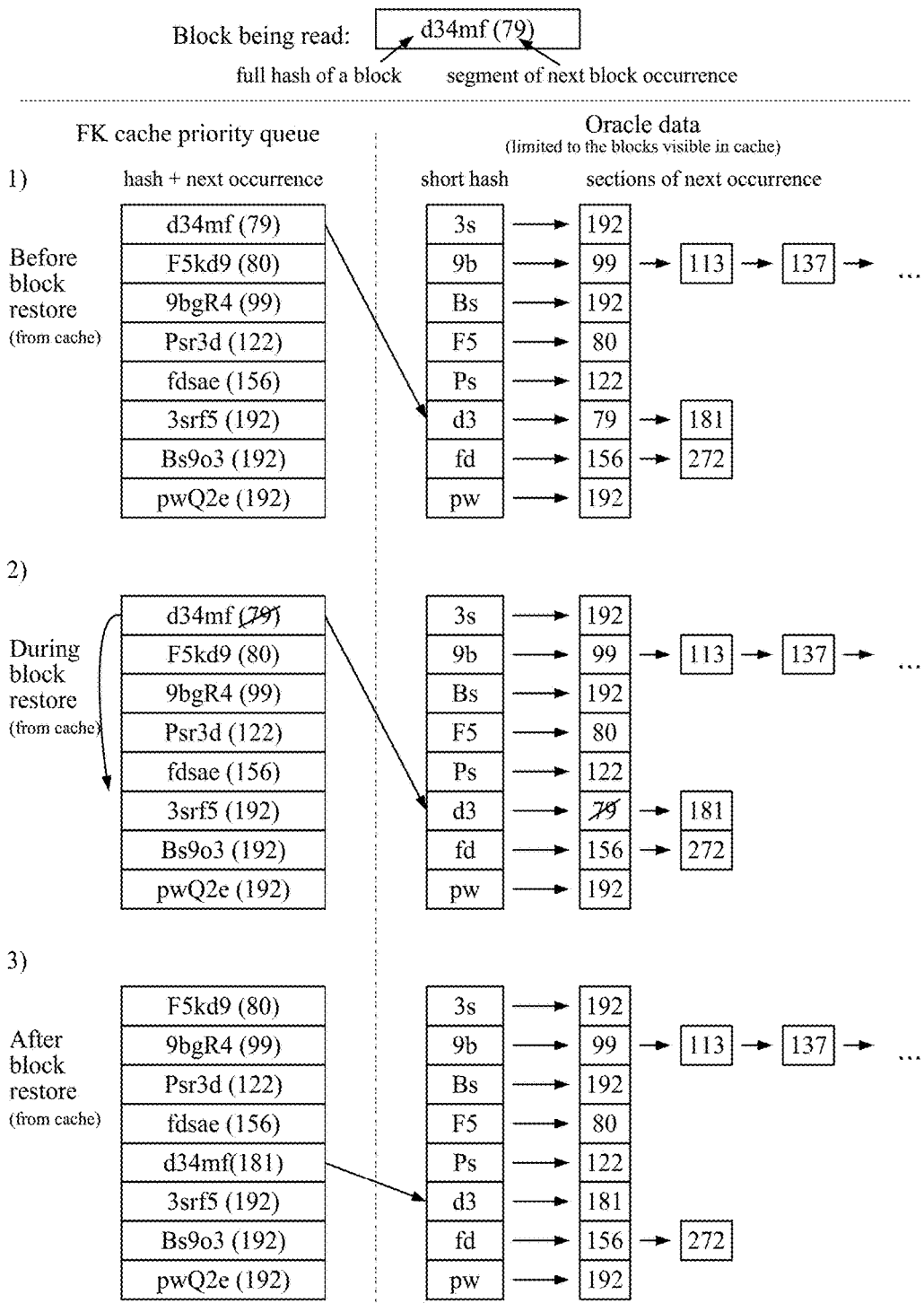
FIG. 45 is a diagram referred to in the research paper described in the fourth exemplary embodiment of the present invention.
Figure 46:
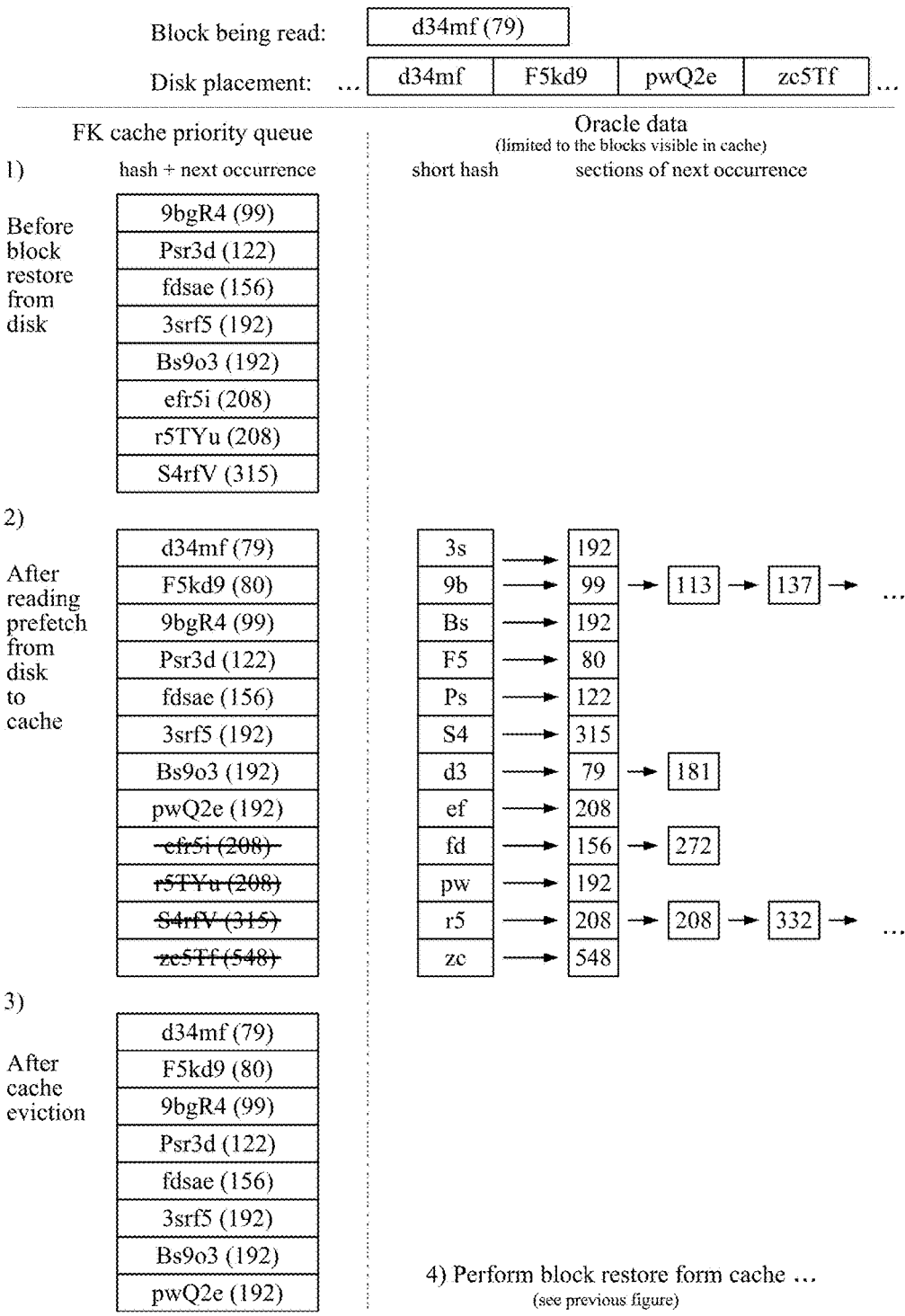
FIG. 46 is a diagram referred to in the research paper described in the fourth exemplary embodiment of the present invention.

FIGS. 45 and 46 show the example of block restore and cache eviction policy in two cases. The first one, when the block was found in cache, and the second, when it had to be restored from disk. In the former case the only operation performed is the actual update of the restored block in both cache and oracle structures. The latter one is more complicated and includes also the cache eviction process. In general, it consists of the following steps:
 read the block from the disk to cache together with its prefetch (updating cache with the information about next section occurrence provided by the oracle)
 update the cache priority queue keeping blocks ordered by the section of the next occurrence with restored blocks
 remove the blocks exceeding the maximal cache size with the most time to the next occurrence (highest section numbers)
 continue updating the structures in the same way it is done when the restore is performed from cache (4.5)

In a case when there is no known section of next occurrence in the oracle for the most recently prefetched blocks and there is still some space left in the cache memory, a few choices can be made. We can keep some of such blocks in the cache (for example by assigning an artificial and large section number and use an LRU or other algorithm for evicting them) or free the memory to use it for some other purpose in case dynamic memory allocation to different structures is possible. As my experiments showed that the first option does not provide noticeable performance gain, the better choice would be to use the additional memory for other system operations if necessary (such as restores, writes and background calculations) or to dynamically increase the oracle size, which would result in providing more forward information until all the available memory is efficiently used.

The algorithm presented above is very similar to the adopted Bélády's cache. Actually it behaves identically until the cache memory is utilized in 100% by blocks indicated by forward knowledge. Any lower utilization indicate worse behaviour than the adopted Bélády's cache. The reason for such scenario is always the limitation in forward knowledge size and characteristics of the individual stream (duplicate blocks outside of forward knowledge area).

<4.4.3 Memory Requirements>

As the cache itself in the algorithm with Forward Knowledge is build in a very similar way to the one with LRU algorithm, its memory requirements do not change. Separate and dedicate memory, though, will be required by the oracle with its forward knowledge. Another requirement may be an additional list of all the block addresses waiting to be restored after they are received as a forward knowledge, but before they are actually used to restore the data. As the forward knowledge size may cover many gigabytes, it can take many seconds before the addresses are used to restore the data (I assume that addresses are delivered in order to fill the forward knowledge while the restore is performed as fast as possible), which means they require dedicated memory. The alternative approach described in detail in Section 4.4.4 may be not to occupy the additional memory but restore the metadata twice: once for the sake of forward knowledge and the second time for the restore itself. Whichever solution is used, the proper memory size should be included in the total memory assigned for the restore cache.

The detailed amount of additional memory required can be calculated as follows. Each entry in the oracle equals at most one short hash (8 bytes) and one section number entry (2 bytes). To be detailed we need to include the structure overhead as well. As standard map requires keeping pointers which are expensive (8 bytes per pointer while we keep only 10 bytes per entry), the hash table with closed hashing is a much better choice here, possibly at the cost of in-memory access time. Still, for acceptable results in this case the memory allocated should be at least 30% higher [37] than requested, which ends up with about 13 bytes per entry. Together with the full address in the waiting list of 20 bytes size (160 bits, assuming SHA-1) the total of 33 bytes is the cost of having one block (8 KB) forward knowledge, which further means 4.12 MB per every 1 GB of data. For best results, a few GBs of forward knowledge is desirable (in detail it depends on each exact data set characteristics).

<4.4.4 Discussion>

Alternative Solution

The important observation is that keeping only the list of addresses for the data to be read in the future consumes already two thirds of the additional memory required (20 out of 33 bytes kept per block). An idea worth consideration in order to minimize this impact is presented below.

The easiest way in order not to keep the additional memory allocated is to read the addresses again from the system. In such case, there would be two stream accesses to metadata: one to provide proper information for oracle and the other asking for the concrete block addresses to be restored. Given the size of a block address is 20 bytes per 8 KB block, the whole operation would require reading 0.256% more data than with the original solution, leaving only a small requirement of about 1.62 MB of memory per each 1 GB of forward knowledge (instead of 4.12 MB).

This solution sounds very tempting, especially in cases when only small amount of memory is available. The exact choice would definitely require the detailed analysis of a given system and other possible consequences of both approaches.

The Impact of Different Metadata Read Order

As the pattern of metadata restore is to be significantly modified with the proposed algorithm, the question of its impact on restore performance appears. The discussion on this subject is difficult in general, as it requires the detailed knowledge of a given system and its metadata restore process. Fortunately, as the metadata is usually only small portion of all data to be restored (0.256% with 20 bytes for each 8 KB), even reading it all again should not generate much additional work. Also, when the systems with high metadata overhead of over 100 bytes per block [69] are taken into account, the total restore bandwidth degradation in the same scenario would still be lower than 1.5%, which should be hardly noticeable.

<4.5 Trade-Offs>

The major trade-off in the area of intelligent cache with forward knowledge is with the size of memory dedicated for the standard cache and the forward knowledge. Depending on the data set characteristics and the total amount of memory available, only very small amount of forward knowledge can already assure the effective cache usage in some cases, whereas in others very big forward information even at the cost of a much smaller cache size is a much better choice.

The best solution to this problem would be not to state any hard division between the cache and the oracle. Thanks to such approach, the system would be able to extend the future knowledge in case the cache memory is not fully utilized or decrease it otherwise. Even though the described scenario is tempting, it is much more complicated and requires detailed testing, especially in the real storage system case where distributed communication may be an issue. Those concerns made me offer the version with hard division, keeping the details of this solution for the future work.

One more trade-off is connected with the section size. Since in order to save the memory the exact location of next block occurrence is not kept, some evictions can be made not in the order desired. Such scenario can happen when many blocks are located in a single section and one is to be evicted. Fortunately, such event does not impact performance much as the reordering can happen only within the blocks with the longest time to next occurrence (the least important ones). Also, the achieved performance can never be lower than the one in the same scenario but with the cache memory reduced by the size of a single segment. In the typical scenario of 256 MB cache and 8 MB section size, the performance would never be worse than with 248 MB cache and the exact knowledge about each block position.

<Chapter 5 Content Based Rewriting Algorithm to Reduce Impact of Inter-Version Fragmentation>

The experiments presented in Section 3.3.2 show the negative impact of inter-version fragmentation caused by in-line duplicate elimination. Even though the values in some cases do not seem very significant (restore bandwidth decrease of about 12%-17% after 7-14 backups in case of GeneralFileServer, Wiki and DevelopmentProject) the fact of relatively small number of backups in those data sets and visible tendency of the problem to increase in time supported by the experiments with longer data sets (about 19%-36% decrease after 22-50 backups in case of Mail and UserDirectories) suggest potentially high impact in real life usage, where the number of backups created for one data set varies from 50 to over 300 every year. Moreover, the IssueRepository data set states that there exist cases where performing only 7 backups may already cost over 50% of potential restore bandwidth. My observations were confirmed on other, independent data sets by Nam et al. [53, 52] and longer ones (over 90 backups) by Lillibridge et al. [48].

In this chapter I would like to propose the Context Based Rewriting algorithm (CBR) dealing with the issue of inter-version fragmentation by changing the location of blocks to reflect the current streaming access pattern, and as a result, provide more effective prefetch and cache usage.

<5.1 Desired Properties of the Final Solution>

The problem requires a solution without negative effects on other important metrics of deduplication system. Such solution should:

eliminate the reduction in restore bandwidth caused by inter-version fragmentation for the latest backups introduce no more than very little (preferably below 5%) write performance drop for ongoing backups not degrade deduplication effectiveness (if necessary use only little and temporary additional space)

not require much additional resources such as disk bandwidth, spindles and processing power offer a range of choices in addressing trade-offs.

<5.2 the Idea>

Figure 47:
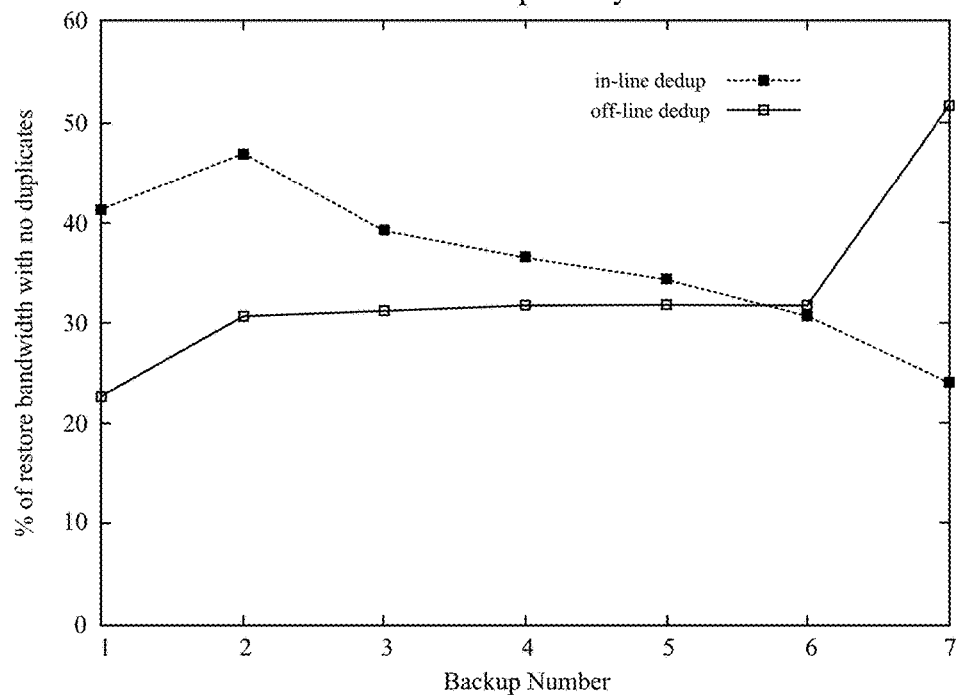
FIG. 47 is a diagram referred to in the research paper described in the fourth exemplary embodiment of the present invention.

In most cases, the latest backup is restored after failure, because users are usually interested in having the most up to date information restored (see FIG. 31). Based on this observation, I would like to eliminate fragmentation for the latest backups at the expense of the older ones (in order to preserve deduplication ratio). An example of such approach is given in FIG. 47. It presents the drop in restore performance caused by fragmentation across backup versions as a function of version number in two cases: (1) in-line dedup with fragmentation decreasing with the backup age; and (2) off-line dedup, which results in the latest backup written continuously to disk and fragmentation increasing with the backup age. By introducing the Context Based Rewriting algorithm I would like to add a defragmentation capability to the in-line deduplication feature in order to achieve the defragmentation effect similar to the off-line dedup, but without the associated costs.

As it was already presented in Chapter 3.2, in a system with in-line deduplication the already existing blocks are not written again, making the backup process very fast. Unfortunately, such approach may lead to high fragmentation as the two neighbour blocks in the stream can end up being far from each other in the system. In order to prevent such scenario the CBR algorithm analyzes the blocks from incoming backup stream and their physical localizations in the system. In order to minimize the performance drop caused by inter-version fragmentation, the algorithm will move some of duplicate blocks to a new physical location to preserve good streaming access and make the prefetching effective. As the algorithm is performed during backup of the stream, the actual blocks to be moved are not read (which might cost a lot) but a copy delivered in the stream is written. The old copies are removed by the deletion process run periodically. In opposite to off-line deduplication only a small percentage of blocks is moved (rewritten)—the ones assuring the highest restore bandwidth gain.

Even though both cache with limited knowledge and CBR algorithm fight fragmentation, they present a completely different approach and aim at different kind of the issue. The first one does not modify the data in the system and allows effective cache memory usage during the restore by using the future knowledge available. Such approach allows caching duplicate blocks present internally in the stream, causing internal stream fragmentation. The latter algorithm presented in this chapter is completely different and does not deal with blocks reappearing in the stream. It's main goal is to make all the blocks structured in a more sequential way during backup and to fight the so-called inter-version fragmentation. Interesting fact, though, is that such approach results in a more effective prefetch leading to more accurate data loaded into cache, which links both solutions. The actual impact of each of them separately and combined are further analyzed in my experiments.

<5.3 System Support>

To implement our defragmentation solution described in the next section, the backup storage should support the following features:
  content addressability [66]: This is a base feature useful for the subsequent features described below.
  deduplication query based on checking for block hash existence: It is crucial that this query is hash-based and requires reading metadata only. For presented defragmentation solution it is not important if deduplication is attempted against all blocks in the system, or the subset of them (such as with sparse indexing [44]). However, it is required to avoid reading entire block data to perform dedup, because such operation would result in fact in reading the fragmented stream and a very low total write performance. Also, it has to be acknowledged, that with high fragmentation one may not have enough spindles even to read block metadata fast enough. However, there exist solutions to this problem based on flash memory [21, 49], whereas SSDs are too small and too expensive to hold entire backup data.
  fast determination of disk-adjacent blocks: Given two blocks, system should be able to determine quickly if they are close to each other on disk. This can be achieved when each query which confirms block existence in the system returns location of this block on disk.
  ability to write a block already existing in the system and remove the old one. This is needed when a decision is made to store a block again in order to increase future read performance. Such rewrite effectively invalidates the previous copy, as the new one will be used on restore.

Many systems with in-line deduplication such as DataDomain [83] and HYDRAstor [23] support the above features; for other systems such features or their equivalents can be added. As a result, the algorithm described in the next section can be seen as generic and adoptable to a wide range of systems with in-line deduplication.

<5.4 Algorithm Details>
<5.4.1 Block Contexts>

Figure 48:
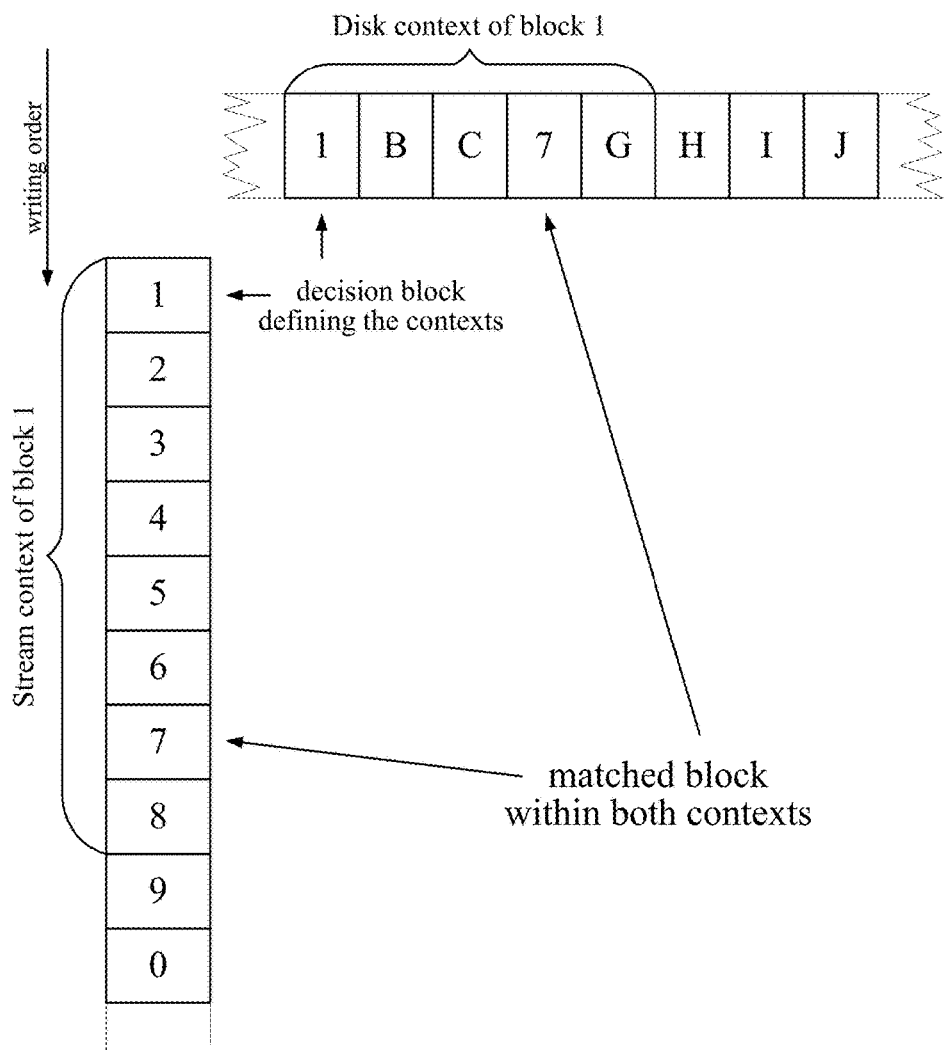
FIG. 48 is a diagram referred to in the research paper described in the fourth exemplary embodiment of the present invention.

The algorithm utilizes two fixed-size contexts of a duplicate—its disk context and stream context. The stream context of a block in a stream is defined as a set of blocks written in this stream immediately after this block, whereas its disk context contains blocks immediately following this block on disk (see FIG. 48). When the intersection of these two contexts is substantial, reading of blocks in this intersection is very fast due to prefetching. In fact, this is quite often the case especially for an initial backup.

The problem of fragmentation appears when the disk context contains little data from the stream context. This occurs because of deduplication when the same block is logically present in multiple stream locations with different neighbours in each one of them. Even though such effect is also caused by internal duplicate blocks (internal stream fragmentation), it is practically eliminated by the cache with limited forward knowledge proposed in the previous chapter. The algorithm presented below lets us deal only with the blocks, which appear for the first time in the current backup stream.

Note that the disk context size is strictly connected with the restore algorithm and equals the prefetch size. The stream context size, on the other hand, cannot be lower than this value in order not to limit the maximal intersection. Based on the experiments, the usual sizes of disk and stream context where by default set to 2 MB and 5 MB respectively. The impact of other values will be described in section 5.5.

<5.4.2 Keeping the Contexts Similar>

The basic idea is to rewrite highly-fragmented duplicates, i.e. blocks whose stream context in the current backup is significantly different from their disk context. The attempt with such rewriting is to make both contexts similar. After rewriting, the new copy of the block will be used for reading, which means also prefetching other blocks stored in the same backup (therefore reducing fragmentation), and the old copy is eventually reclaimed in the background.

The goal is to rewrite only a small fraction of blocks, because each rewrite slows down backup and consumes additional space until the old copy of the block is reclaimed. By default this parameter, called rewrite limit, is set to 5% of blocks seen so far in the current backup.

The algorithm iterates in a loop over the backup stream being written deciding for each encountered duplicate if it should be rewritten. The current duplicated block to be processed by the algorithm is called the decision block.

Since the data to be written is not known in advance by the storage system, the decisions whether to rewrite duplicates are made on-line (without future knowledge, except for the stream context). Taking the above into account, the algorithm can always make a sub-optimal choice for a given duplicate: for example by deciding to rewrite it, although such rewrite "credit" may be better saved for another duplicate later in the stream; or by deciding not to rewrite a duplicate with a hope that a better candidate may appear later in the stream; but such candidate may in fact never materialize. Therefore, the challenge in the algorithm is to make good rewrite decisions.

<5.4.3 Reaching Rewrite Decisions>

In order to guide the rewriting process, we need to introduce a notion of rewrite utility of a duplicate. Also, two thresholds will be maintained and adjusted on each loop iteration: the minimal rewrite utility (constant), and the current utility threshold (variable).

Rewrite Utility

If the common part of disk and stream contexts of a decision block is small, rewriting of such block is desired, as it can help to avoid one additional disk seek to read little useful data. In the other extreme, if this common part is large, such rewriting does not save much, as the additional seek time is amortized by the time needed to read a lot of useful data.

Therefore, for each duplicate in a backup stream, the rewrite utility is defined as the size of the blocks in the disk context of this duplicate which do not belong to its stream context, relative to the total size of this disk context. For example, the rewrite utility of 70% means, that exactly 30% of data in blocks in the disk context appear also as the same blocks in the stream context.

Minimal Rewrite Utility

The minimal utility is a constant parameter of the CBR algorithm in order to avoid rewriting which would improve restore performance only marginally. I have set the minimal rewrite utility to 70%. This value may look high, but lower minimal utility is not much useful as presented in the below analysis.

Figure 49:
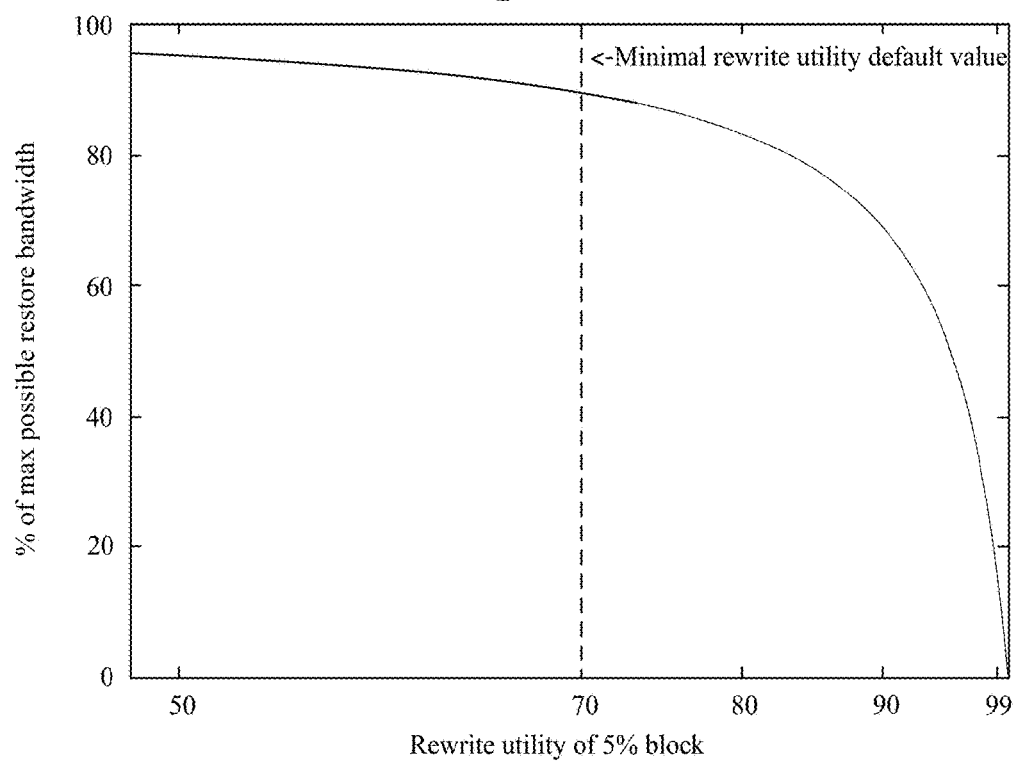
FIG. 49 is a diagram referred to in the research paper described in the fourth exemplary embodiment of the present invention.

Let us assume a simple case of a backup with 5% of fragmented duplicate blocks, all with rewrite utility equal to the minimal rewrite utility. The remaining 95% of blocks are not fragmented (rewrite utility equal to 0%). Moreover, assume that a prefetch of each fragmented block does not fetch any useful data beyond blocks needed to satisfy the rewrite utility of this fragmented block. Such scenario assures the minimal possible gain with the maximal possible effort. In such case, rewriting all of the fragmented duplicates potentially improves restore performance by about 12% (see FIG. 49), which is in my opinion sufficient to justify the rewriting. If the minimal utility was set to 50%, rewriting all fragmented duplicates in a similar backup would offer only 5% improvement, which simply seems not enough.

Note that there may be backups which suffer significantly from fragmentation, but for which all duplicates have rewrite utility just below the minimal utility. However, to reduce restore bandwidth drop caused by fragmentation for such backups, the algorithm would need to rewrite many more blocks than just 5%. For example, when having all the blocks with rewrite utility 70% rewriting 5% of blocks assures not more than 2.15% better performance. Fortunately, I have not encountered any such case in my experiments.

Current Utility Threshold

The current utility threshold is a variable parameter of the CBR algorithm defining the rewrite utility for current decision block. In order to calculate its value a best-5% set of blocks is defined as 5% (the default value) of all duplicates seen so far in the backup stream with the highest rewrite utility. Note that each rewritable block must be a duplicate, so in some cases fewer than 5% of all blocks may be kept, because there may be not enough duplicates in the stream.

To establish best-5%, the utility of rewriting each duplicate seen so far is calculated without taking into account actual actions taken by the algorithm. In each loop of the algorithm, the current rewrite utility threshold is set to the utility of rewriting the worst of the best-5% blocks. Such selection roughly means that if this value had been used as the current utility threshold for every decision block from the beginning of the backup up to the current point, and without a limit on the number of rewritten blocks, the algorithm would have rewritten all the best-5% blocks.

Initially, the current rewrite utility threshold is set to the minimal utility and is kept at this level for 500 blocks in order to allow defragmentation of the first blocks in the stream. As this part consists of only 4 MB of data (usually out of many GBs), the 5% rewrite limit is not observed here.

Rewrite Decision

The decision block is rewritten when its rewrite utility is not below the maximum of the current rewrite utility threshold and the minimal utility. Otherwise, all blocks in the context intersection are not rewritten, i.e. they are treated as duplicates in the current stream and marked to be skipped by future loops of the algorithm. Note that always each rewrite decision is subject to the 5% rewrite limit, which is computed on-line based on all blocks in the stream seen so far.

The decision is asymmetric: rewrite only the decision block or mark all blocks in the intersection as duplicates. That is, even if the decision block is to be rewritten, there is no decision to rewrite (or not) other blocks in the intersection, as they may have their context intersections big enough to avoid rewriting. However, once the verdict to keep the decision block as a duplicate is taken, all the remaining blocks in the intersection should also be kept as duplicates, to ensure that the read of the decision block will fetch also these additional blocks (i.e. the rewrite utility of the decision block remains low).

Block rewriting does not always guarantee that the size of the intersection of stream and disk contexts will be increased. For example, the stream context may contain duplicates only and the algorithm may decide to rewrite just one of them, because remaining are sequential. In such case, the size of the intersection is not increased. However, the rewritten block will still end up on disk close to other new or rewritten blocks. When such blocks are prefetched, they will most likely survive in read cache, reducing number I/Os needed for restore, so rewriting can be still beneficial.

<5.4.4 Implementation Details>

Computing the Context Intersection

The stream context of the decision block is filled by delaying the completion of this block write until enough write requests are submitted for this stream. For each request, the duplicate status is resolved by issuing a modified dedup query (with extra result of block location on disk) based on secure hash of the data (i.e. SHA-1) [25, 24]. If there already is a query result filled in by one of the previous loops of the algorithm, such query is not issued. In case a duplicate is detected, the modified query returns the location of the block on disk and the block address (the hash) is returned without further delay. While filling in the stream context, each given block is examined by comparing distance on the disk to the decision block and qualified as duplicate appearing already in the disk context (or not). In such way, the intersection of the disk context and the stream context is determined.

Adjusting Rewrite Utility Threshold

Since tracking utilities of best-5% is impractical, the algorithm keeps a fixed number of utility buckets (for example 10000). Each bucket is assigned disjoint equal sub-range of rewrite utilities, all buckets cover the entire utility range, and each bucket keeps the number of blocks seen so far with its utility in this bucket range. Such structure allows, with minimal cost, approximation of the rewrite utility of the worst of the best-5% blocks with reasonable accuracy—within the range of utility assigned to each bucket. Actually, only the buckets representing the values above the minimal rewrite utility are useful, but in both cases the memory required for such structure is negligible.

Filtering Internal Stream Duplicates

My experiments show that actually every backup stream contains blocks which are duplicates of some others from the stream (internal stream duplicates). Since without decreasing the deduplication ratio, there is no on-line way to determine the optimal location of such internal duplicate, any disk location in a neighbourhood of the corresponding duplicate block from a stream can be considered as a potentially good one. The important thing, though, is that during the backup of each version of the stream, the same logical location is chosen by the CBR algorithm for the purpose of rewriting and no other location triggers such operation. This is required in order not to rewrite the internal duplicate blocks from one place in the logical stream to another during each backup (thrashing). On the other hand, the cache with forward knowledge described in the previous section suggests that the first location in the logical stream should be considered as the one having the highest potential. Once read into cache, it can potentially stay there for long time serving also other requests to the same data. Therefore, the block should be considered for rewriting only when it occurs in the stream for the first time.

As the knowledge about being an internal duplicate does not need to be exact and the size of each backup can be known with some approximation before it is written, we can use a bloom filter [9] in order to use relatively little memory. Before being qualified for the stream context, each block should be verified in the filter for existence. If found, it should be written to the system by the standard mechanism (it can be a false positive). Otherwise, proper bits in the filter should be set indicating the block existence and the block should be qualified for the stream context and for the CBR algorithm. Note that the bits are never set to zero and the whole bloom filter is deleted when the backup is completed.

In such case, for each 1 GB of expected data, we require about 240 KB of memory in order not to exceed 0.1% false positive ratio (15 bits per key, 128·1024 keys, 7 hash functions) for the last bytes of the stream. Such number is acceptable, as with having at maximum 5% of blocks to be rewritten, usually below 4 (roughly estimating) of them will become falsely assumed as internal duplicates. As the 1 GB of data require at least 500 I/O, the negative impact on the restore bandwidth will usually be much smaller than 1%.

Usually, the process of hashing does require additional processing power, but this case is different. Since in the considered systems, we already have the hash of the whole block calculated (160 or 256 bits), we can simply use some chosen bits of this hash as a good hashing function for the bloom filter. Such optimization make the final requirement on the additional processor cycles is negligible.

Read Simulation During Write

The presented CBR algorithm performs well in assuring more sequential disk access by rewriting a small number of blocks. In the end, though, what counts is the restore performance achieved, when reading a stream. Keeping this result at the same level, along with further decreasing number of rewritten blocks, would help to lower the cost paid during each backup.

In order to achieve that, a restore simulation during backup is performed with standard LRU cache eviction policy. Instead of the block hashes, block location identifiers are kept in the memory. Thanks to that we can simulate reading of blocks which are not yet stored to the system. The structure requires the LRU queue and the map to check whether the incoming block location is already in the cache, which should take no more than 384 KB of memory with simulation of 128 MB cache (3×8 bytes×128 MB/8 KB), which delivered very similar results for all cache memory sizes in most data sets. After introducing this enhancement, the number of rewritten blocks became lower by about 20%-30% while keeping similar restore bandwidth.

Simulating the algorithm of cache with forward knowledge instead of LRU during backup, would most probably bring even better results in decreasing the number of rewritten blocks, but is more complicated (requires additional memory and delay) and will be considered for the future work.

Background Operations

The CBR algorithm requires a background process removing the old copies of the rewritten blocks. This can be done together with other maintenance tasks already run from time to time, such as deletion, data scrubbing and data sorting [23]. Until this removal is performed, the additional space used by rewrites temporarily reduces the deduplication ratio. As the percentage of such data is limited and the maintenance tasks are usually performed quite often, such solution should be easily acceptable.

Modifications to Read Operation

If data blocks are content-addressable, both old and new copies have the same address, so pointers to data blocks do not have to be changed when the old copy is replaced with the new one. To ensure good performance of the latest backup restore, only the procedure to access the latest copy of a block may need slight modifications if the system previously did not allow many copies of the same block. This can be done by keeping only the entry to the newest block in the block index.

<5.4.5 Memory Requirements>

The part of the algorithm, which potentially requires significant amount of the memory, is the bloom filter used for the elimination of internal duplicate blocks, as described in Section 5.4.4. The memory required is about 240 KB for each GB of the backup stream, which does not seem much, but bigger streams put larger pressure on this requirement.

Since the usual amount of memory used during stream backup is at the level of tens of GBs, the proposed solution is acceptable for stream sizes up to 100 GB (24 MB of memory) or even 1 TB (240 MB of memory)—depending on the system and the exact memory available. Note that according to data gathered from over 10000 backup systems by Wallace et al. [79], streams larger than 500 GB use on average less than 5% of total capacity in the backup systems, making them very rare in general.

If necessary, it is always possible to divide one large stream into the smaller ones based on its logical content, assuring more common data placed together (see Section 3.2.3). The alternative solution is also to use less precise (higher number of false positives) or compressed bloom filter, at the cost of lower number of defragmented blocks or more complex access to its data.

Finally, the described above bloom filter and the stream context of the default size 5 MB are structures required per each stream being stored into the system. This means, that the final amount of memory should be multiplied by the number of streams expected.

<5.4.6 Discussion>
Optimizing the on-Line Algorithm

The CBR algorithm is clearly on-line, as it looks only at the blocks seen so far (plus small stream context which could be considered as forward knowledge). Unfortunately, for the same reason it is optimal only in the case when current utility is stable throughout the whole stream. In the other cases, with large variations especially between the rewrite utility of blocks at the beginning and the end of the stream together with full utilization of 5% rewrite limit, the final result may not be that good (even though still better than before defragmentation).

All the malicious scenarios can be addressed optimally by setting the fixed rewrite utility for the whole stream. The best value of such utility would be the one computed by the current utility algorithm and achieved at the end of the stream. Unfortunately, such information would require future analysis before storing the stream. A simple approximation could be done to use the statistics gathered during backup of previous version of the same data set.

Fortunately, in all data sets tested the above problems were at the minimal level also because the number of blocks rewritten was always below the 5% level. Therefore, even with the on-line algorithm the final results were quite close to the ones achieved with no inter-version fragmentation.

The Off-Line CBR

A simple modification of the CBR algorithm can be introduced, which seems to eliminate its cost and preserve the advantages: first, identify the blocks to be rewritten, and rewrite them later in the background, after backup is finished. This does not work well, however, because rewriting would require reading the fragmented blocks, which could be extremely slow (exactly because they are the most fragmented). In the in-line version of the CBR those blocks are actually received almost for free, when a user is writing the data.

<5.5 Trade-Offs>
Stream Context Size

The algorithm uses by default 5 MB as stream context size, because it is big enough to allow the CBR to be effective and small enough so increase in write latency, due to filling this context is acceptable. Assuming a backup system achieving 100 MB/s for a single stream [83], it will take not more than 50 ms to fill in the context. Other values between 2 MB and 20 MB were also verified and are acceptable to lower or increase the desired latency with only slightly different final bandwidth results, but larger variation in number of duplicates rewritten (larger stream context means less blocks to be rewritten but a bit worse restore bandwidth). On the other hand, when the delay is crucial in some system, it is possible to define the size of stream context by the maximal acceptable delay we are able to wait for the write confirmation. In such case the stream context of each block will be different but it should still provide reasonable defragmentation results.

Note that the delay from the above examples will be introduced only for non-duplicate blocks, which already have a significant latency.

Number of Rewrites

Even though the default limit for the number of rewrites is set to 5% of all blocks appearing so far in the stream, this value can be easily modified in case of some individual requirements. Having a higher limit will make all the blocks with the rewrite utility above the minimal one to be rewritten and may be very useful for a stream which was backed up for a long time without CBR defragmentation. Of course, the time of such backup will proportionally increase but from the next one the limit may be brought back to 5%.

Also, decreasing the limit may be useful in cases where only minimal bandwidth drop is acceptable (e.g. below 1%). In such case the algorithm will do well in choosing the most fragmented blocks to be rewritten, providing the highest gain with the smallest associated cost.

<Chapter 6 Evaluation with Trace Driven Simulations>
<6.1 Experimental Methodology>

The goal of my experiments is to show the problem in the environment common for all or at least most of the systems without any bottlenecks but the disk itself and not look into details of each particular implementation. This way, I give priority to evaluate the severity of the actual fragmentation problem and efficiency of its solution without obscuring the experiments with architectural assumptions, which usually are simply the limitations of some given implementation. In other words, the results presented in this section can be viewed as the upper bound on the performance, especially significant for the most popular systems with in-line deduplication. Note that even though the systems with off-line deduplication do not suffer from inter-version fragmentation, they still have to deal with the one present internally in the stream. For that, the cache with forward knowledge presented in Chapter 4 and evaluated here works very well.

With the additional help of my colleagues I have prepared a 12,000 line C++ simulator capable of performing parallel testing (on many cores and machines) in thousands of possible configurations. Having the actual traces gathered from real users, the simulator produced results and statistics which lead to the conclusions and finally the numbers presented in this work. Even though this is only a fraction of the results achieved, the numbers presented are the most important ones having the highest impact on analyzing and overcoming the fragmentation problem present in backup systems with deduplication.

<6.1.1 Backup System Model>

I propose a backup system model general enough to represent the common part of the vast majority of backup systems with in-line deduplication, simple enough to be implemented with respect especially to the main problem characteristics, and efficient enough in order to perform a large number of experiments in a limited time.

Write Simulation

In the model I have assumed a simple storage subsystem that consists of one continuous space (something as a single large disk) which is empty at the beginning of each measurement. The write process in the simulator was designed to keep all the characteristics present in systems with in-line duplicate elimination described in Section 3.2 with the main ones such as locality preserving blocks placement [83] and placing new blocks after currently occupied area. Such write algorithm assures maximal write bandwidth and minimal resource utilization, which were always the priorities while performing a backup.

The data used for the simulations was gathered from real users. In order to optimize the process, each version of a given data set was chunked using Rabin fingerprinting [67, 12] into blocks of the average size 8 KB (as the most popular in today's backup systems). After such process the traces with short hash only (64 bit) and size of each block were stored and used for all the simulation. Thanks to that it was not necessary to perform chunking nor hashing each time the experiment was performed, and it was possible to keep the whole disk image in the system memory, which made the testing process very efficient.

Restore Simulation

As described in the Section 3.1.2, reading with using prefetching and caching is the most commonly used within the storage environment.

In all experiments fixed-size prefetch is used, so we can assume that the read bandwidth is inversely proportional to the number of data I/O operations during restore. Although certainly there are systems for which performance is influenced by other factors, I believe that correlating achieved bandwidth with the number of fixed-size I/Os allows us to focus on the core of the fragmentation problem and disregard secondary factors such as network and CPU speeds.

I assumed constant prefetch size of 2 MB as the most efficient with today's disk drives even with most fragmented data (see next section for justification). The cache size varies between 128 MB up to 1 GB per single stream being restored for better problem visualization, while the experiments with unlimited size of cache provide important information about maximal theoretical limitations. The common LRU data replacement policy, as the most popular one [53, 48, 41], is used in order to show current performance level.

Note that in the experiments with forward knowledge only the blocks with known future appearance are kept in cache. If the forward knowledge is short or there is only a small number of blocks which are to be used in the future, the cache memory may not be fully utilized. Such approach is not optimal but I have decided to use it in order to clearly visualize the limitations. Also, my experiments showed that keeping memory fully utilized in a way similar to LRU helps only a little or does not help at all, especially when having larger forward knowledge. Based on the results, it is clear that any additional memory should be used in the first place to extend the forward knowledge, which suggests dynamic memory division between the oracle and the cache when it comes to specific implementation.

The Choice of Disk Context/Prefetch Size

Figure 50:
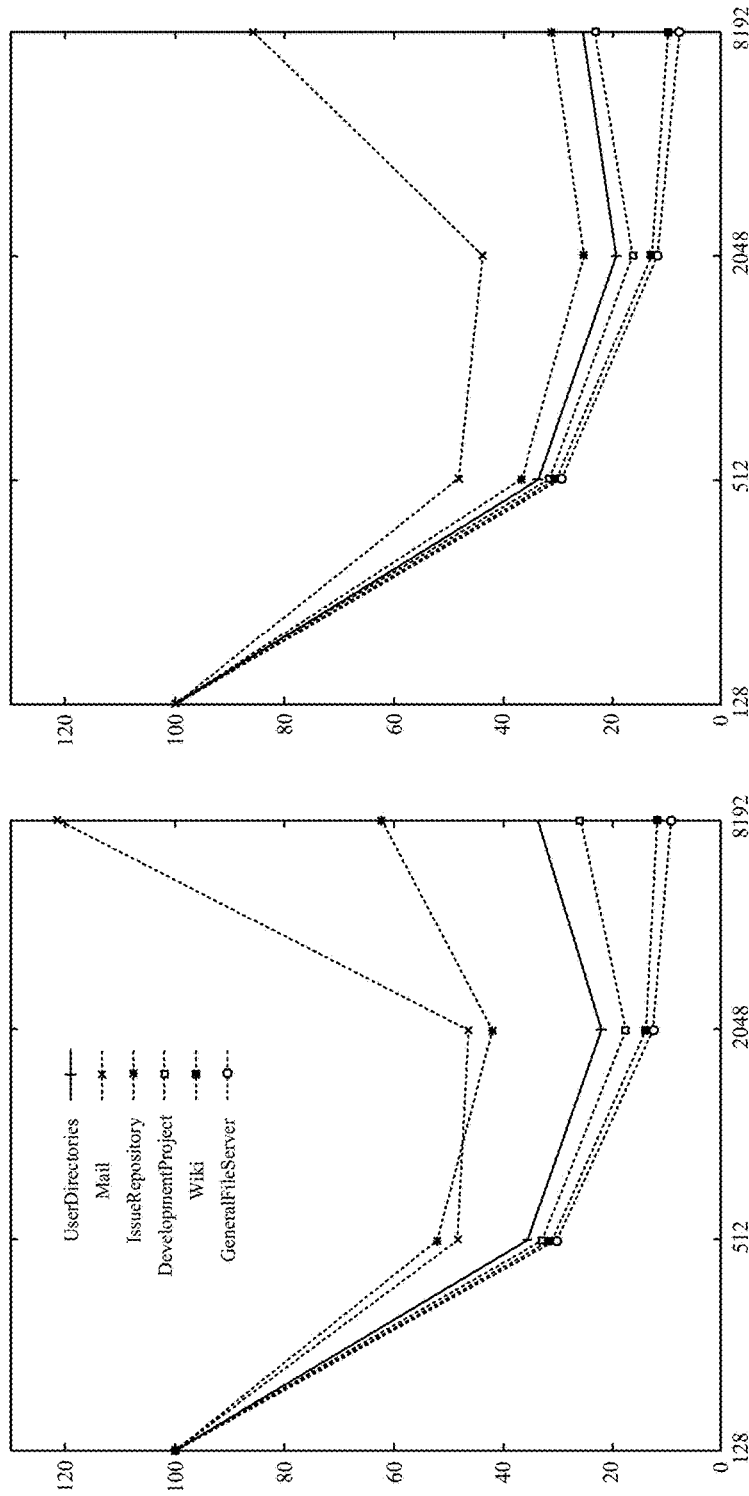
FIG. 50 is a diagram referred to in the research paper described in the fourth exemplary embodiment of the present invention.

Prefetching is very effective for reading data placed sequentially on disk. In order to show this in the environment with deduplication, I have performed a simulation with fixed prefetch size modified from 512 KB up to 8 MB for all six data sets (see FIG. 50). Since the comparison here is done with using different prefetch sizes, extrapolation of performance based on the number of I/Os only cannot be done any more (comparison result in such case depends on how much data a disk can read in a seek time). Therefore, I have used common enterprise data center capacity HDD specification [71] to be able to reason about achieved performance.

As we can see on the charts, in 4 out of 6 cases for both fragmented and not fragmented data the shortest restore time is achieved with prefetch size equal 2 MB. The only exceptions are Wiki and GeneralFileServer, for which 8 MB prefetch is slightly better. Based on those results, I have decided to use 2 MB prefetch for majority of the tests, as the most representative one for both fragmented and not fragmented data with common LRU cache. The two exceptions are clearly marked in separate sections and show possibility of further restore bandwidth increase, when using larger prefetch sizes with forward knowledge cache and after taking the scalability perspective into account.

Although the variable prefetch size can also be an option, it can only mask the fragmentation to some extent, especially when the streaming access is concerned. By reading smaller amounts of data when random read is detected, it may improve the current performance, but it may also decrease it if the streaming access is detected not soon enough. Also, each time the prefetch is modified from the maximal value, also the maximal possible performance suffers. Moreover, such solution requires many assumptions about the system and its architecture. Therefore, I decided to use the fixed prefetch size in my experiments and in order to extrapolate bandwidth based on number of I/Os performed in the test.

This measure ignores some speed variances due to filesystem physical fragmentation, faster seeks when particular I/Os are close to each other and slower when they are far away in favor of the dominant cost: the single I/O read time.

<6.1.2 Omitted Factors>

In my experiments I have omitted incremental backups (in systems with duplicate elimination, they are actually very similar to full backups, as only the new data is stored), which are often performed every day by many users. Unfortunately, the users who kindly agreed to usage of their data in my experiments did not have them. Even though the experiments with such data would be valuable, they would only extend the picture already presented by my experiments. What is sure, such backups cannot negate nor lower the problem of fragmentation, as after the whole week they end up having written similar new data in the same storage area. In fact, as the day to day modifications are smaller and more frequent, they may even make the problem more severe as the new data from one week is now divided into 5-7 areas instead of one.

In modern backup systems, being able to handle many backups at once is one of the key features. Even though in my experiments only a single stream load is verified, such approach lets me provide a repeatable way to perform experiments and show the results with optimal block placement on the disk (no data from other sets nor containers limiting the power of prefetch). Writing many streams at once leads to many issues connected with the implementation, which would require looking into the problem separately from each system perspective. As this was not my goal, I decided to provide the simplest implementation, which should actually be close to the optimal case for each system from both write and restore bandwidth points of view. Each additional stream being written at the same time requires solving at least the problem of storing all the streams in separate containers, which potentially introduces additional fragmentation.

The aspect of data retention, and therefore their deletion, is always present with backups systems and especially difficult when deduplication is taken into account. As a single backup system is stored for a quite long time, at some point a decision needs to be taken which backups to remove. This influences also data fragmentation. Actually, experiments show that the exact schedule for deleting backups does not particularly affect the results in another way than changing the overall deduplication factor [48]. Also, in case of my experiments, the number of backups in each data set is relatively small, therefore, applying a data retention policy to it and verifying the fragmentation changes would not allow me to draw sufficiently general conclusions.

One of the factors omitted in my experiments is also global deduplication (within the whole system), which can be found in some of the systems on the market [23]. The main reason for that is the difficulty of performing tests and giving reliable results along with limited impact factor. The details of my decisions were presented in Section 3.2.3.

<6.1.3 Data Sets Description>

In order to diagnose the problem of fragmentation and verify proposed algorithms, I have gathered traces representing real user data of over 5.7 TB in size and consisting of 6 sets of weekly full backups. The characteristics of each set are described in FIG. 51, while the types of their content are presented below.

DevelopmentProject—large C++ project cvs data, LDAP data, server configuration files IssueRepository—issue repository data (contains XMLs and attachments), server configuration files Wiki—wiki data, server configuration files GeneralFileServer—home directories of computer science research laboratory (netware)

UserDirectories—linux home directories of 18 users in a software company (tar)

Mail—mailboxes of 35 users in a software company (tar)

<6.1.4 Testing Scenarios>

Each test always starts with an empty system and beside the parameters (such as cache and prefetch size, caching algorithm, forward knowledge size) can be performed in three different scenarios:

base—all backups from a data set loaded one after another (includes internal and inter-version fragmentation)

defrag—all backups from a data set loaded one after another with CBR defragmentation enabled (both internal and inter-version fragmentation with the last one limited by CBR algorithm). Note that, this result will be shown only in experiments actually using CBR algorithm.

max—only the last backup from a set loaded into the system (only internal stream fragmentation). This result can be referred to as the potentially maximal bandwidth level for the stream [it actually is maximal when unlimited cache size is used]. It can be considered realistic only with off-line deduplication, but only together with associated costs (see Section 2.2.1).

The goal of each scenario is to visualize the system in a state of being fragmented (base), defragmented (defrag) and not fragmented (max) in order to measure the effectiveness of presented algorithms and compare different options with no deduplication version (the x axis in all experiments) and between each other. Note that regardless of the scenario, the internal stream fragmentation is always present in a stream as it cannot be eliminated without decreasing deduplication level and changing the logical structure. Also, as already stated in Section 3.2.1, it highly impacts the final results, making the numbers in all scenarios sometimes far from the level achieved with no deduplication (in both: negative and positive way).

Another important observation is that the max scenario together with unlimited cache size can be regarded as the maximum bandwidth achievable in theory (as whole backup is placed in the one continuous area in the order of reading and all the blocks once read will never be evicted from cache).

<6.2 Evaluation of Forward Knowledge Cache>
<6.2.1 Meeting the Requirements>
Performance Results The cache with limited forward knowledge presented in Chapter 4 does very well in optimizing the memory usage during restore of every backup (including the latest one) for both fragmented and not fragmented data (including off-line dedup), assuring an average restore bandwidth increase between 62% and 88% (see FIG. 52).

Figure 53:
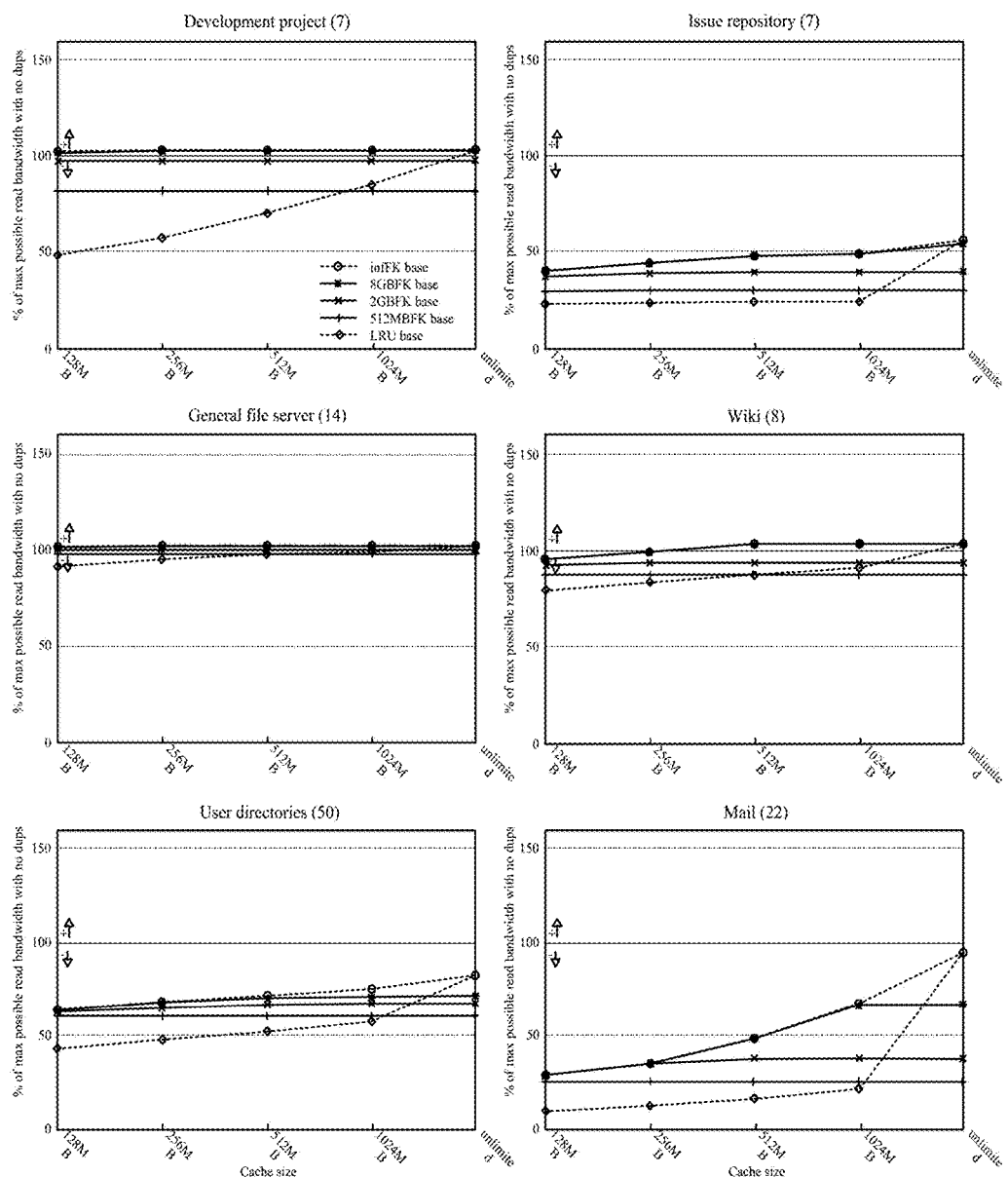
FIG. 53 is a diagram referred to in the research paper described in the fourth exemplary embodiment of the present invention.
Figure 54:
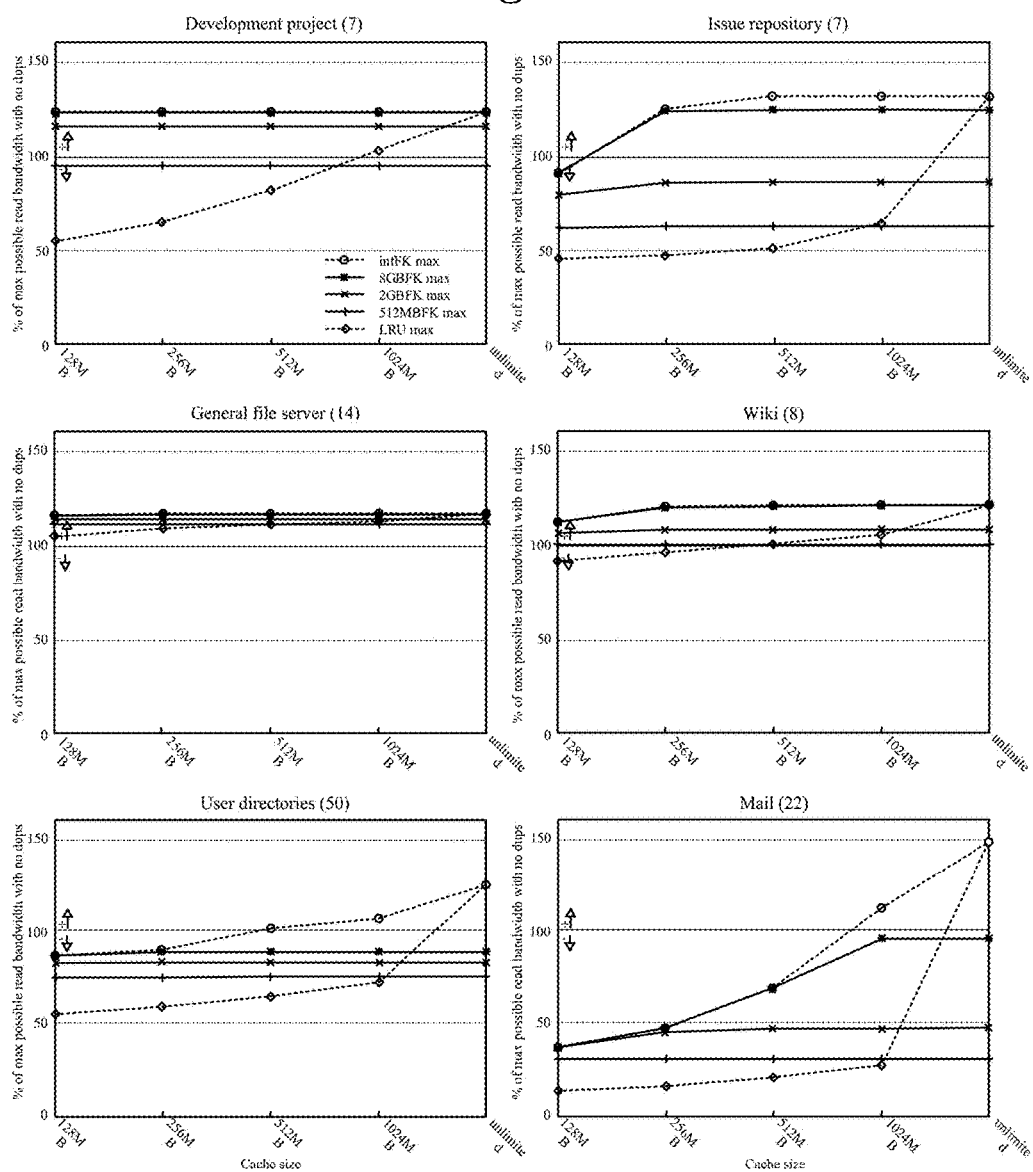
FIG. 54 is a diagram referred to in the research paper described in the fourth exemplary embodiment of the present invention.

Moreover, for 4 out of 6 not fragmented data sets having only 256 MB of cache memory together with 8 GB forward knowledge already provide results almost identical to the ones achieved with unlimited cache size. For two others (UserDirectories and Mail) possible options are either to stay with 256 MB size of cache and gain 22%-73% of additional bandwidth even when comparing to LRU with 1 GB cache, or to use the same size of 1 GB cache with 22%-253% bandwidth boost and additional 20% possible with larger forward knowledge. The exact results are shown in FIGS. 53 and 54, while their detailed analysis can be found in the following sections.

In addition to the above characteristics, the cache with forward knowledge enables a range of choices based on the resources available and the restore bandwidth requirements. It is possible to choose between the cheaper option with 8 times lower memory usage and still slightly better performance (1 GB LRU vs 128 MB with forward knowledge), and the one with the same amount of memory, but higher performance (see FIG. 52). Depending on the actual system usage pattern, both options sound very interesting with a significant leap from currently most popular LRU algorithm as the cache replacement policy.

Additional Resource Usage and Possible Trade-Offs

As described in details in Section 4.4.4, the usage of limited forward knowledge requires additional resources, which should be included in the total costs. In the most effective case those are: memory (about 13 MB for 8 GB of forward knowledge) and bandwidth (about 0.256% decrease). Although the second one is small enough to become negligible, the first one can make some difference, especially when the total amount of cache memory is small. Even though assuming 256 MB of cache as the most effective in general, having 8 GB of forward knowledge causes only about 5% higher memory usage. This cost does not seem to be high, assuming the bandwidth increase and how well it approximates infinite forward knowledge.

Note that in my experiments this additional memory is not included by default in the total cache size. This enables clear and easy comparison between different forward knowledge sizes and their impact on the performance while keeping exactly the same cache size. Also each of the possible implementations require different amount of memory, which would be complicated to visualize and would require much more testing.

Tunability

The cache with forward knowledge is also tunable by setting the size of requested forward knowledge at the cost of additional memory. In general, the higher the forward knowledge the better the solution, but in detail, this property is limited and relies on the internal duplicates pattern, the size of cache memory and the state of the stream (fragmented or not). As already mentioned in Section 4.5, the desired solution would be to automate the memory division between the actual cache and the forward knowledge within some total amount of memory available in order to secure the best performance results.

Code Modifications and Deduplication

Although code modification is required to use the algorithm in some given implementation, it is very limited and does not impact deduplication effectiveness. The two modifications which are necessary consider only the algorithm responsible for the data restore in general and the cache memory management using the interfaces already available. The former one is requested only in order to fill the oracle with the actual forward knowledge, and it can be easily done by attaching proper information to each standard read request, making the modification almost invisible from other system components perspective. The latter one, on the other hand, is limited to the restore algorithm, only making it easy to simply swap the implementation. Such limited modifications make the algorithm suitable for most (or possibly even all) systems present on the market.

<6.2.2 Setting the Forward Knowledge Size>

FIGS. 53 and 54 show the impact of cache with forward knowledge, both limited (to 512 MB, 2 GB, 8 GB) and unlimited (the same as adopted Bélády's cache used before in this work), together with the comparison to standard LRU algorithm.

In both figures we can notice very good results when using actually any amount of forward knowledge, although the highest gain (in %, when compared with LRU) is almost always possible with the smallest cache size. This is because small amount of cache makes LRU algorithm highly ineffective, as before the block is requested again it already becomes evicted from cache (best visualized with DevelopmentProject and GeneralFileServer data sets). With forward knowledge each block in cache has its own purpose and is not evicted until used at least once (with some rare exceptions when prefetched blocks are to be read earlier than some others already present in the cache). Also, the small amount of memory makes the cache utilized in 100% in almost all the cases and throughout the whole experiment, which is not always true with higher values (see Section 6.1.1 for details). For example, not fragmented DevelopmentProject achieves already maximal bandwidth with only 128 MB of cache memory, even when having infinite forward knowledge.

Increasing forward knowledge always helps to improve the achieved results. The gain, though, is highly correlated with the amount of cache used and the pattern of internal duplicate blocks present in a stream. The problem of duplicates defines the minimal size of memory necessary not to reread blocks from disk, which is in fact the desired size of the cache. Being able to find all the blocks to keep in memory in the limited forward knowledge and having the required size of the memory makes the process the most effective. This characteristic can be noticed especially in case of Mail data set, which contains the highest amount of internal duplicates. On both figures (fragmented and not) having 1 GB of cache and 8 GB of forward knowledge gives significantly better results than with lower memory and forward knowledge sizes.

On the other hand, there are many cases where limited forward knowledge actually limits the cache memory usage. In my implementation, whenever the cache with forward knowledge is simulated, it keeps in the memory only the blocks which are to be used in the future (found in forward knowledge). Therefore, the cache amount in this case should be seen as a top limitation rather than the specific amount of memory in use. The actual value can vary throughout the simulation, but at some point it reaches its peak, which means that adding extra memory will not improve the results (unless more forward knowledge is used). Such scenario is best seen with forward knowledge limited to 512 MB. In this case more cache than 128 MB will not bring any visible benefits for any of the data sets presented as not more than 128 MB will be actually used. With other limits for the future knowledge such border is different for each data set and can be easily read from FIGS. 53 and 54.

In order to have the whole picture, it is interesting to look at the forward knowledge with relation to the size of the whole backup. As we can notice when comparing FIGS. 53 and 54, one globally true claim seems to be that fragmented data needs less forward knowledge than not fragmented data (see next section for details), which leads to the conclusion that the memory for the forward knowledge should change with the life of a data set. Other insights are dependent on the stream detailed characteristics rather than on the stream size. When we look at the charts, having 2 GB of forward knowledge is perfectly enough for all data sets with 128 MB cache while for 256 MB it is a bit short, especially for the IssueRepository, which is actually quite small. One thing which may change when having very large streams is the distance to optimal algorithm using unlimited memory, which is understandable. This is the case especially with UserDirectories.

<6.2.3 Impact of Fragmentation on Required Cache Size>

An interesting fact can be observed when comparing once more FIGS. 53 and 54 for the efficiency of cache memory usage with different forward knowledge sizes. While for the first one (with inter-version fragmentation) 8 GB of forward knowledge is enough even for 1 GB cache to stay within at maximum 8% of the algorithm with infinite forward knowledge (avg. 2.48%), the not fragmented option has higher requirements, because of more data worth keeping is restored with every I/O. In this case 8 GB of forward knowledge works extremely well for up to 256 MB cache (at maximum 2.3% deviation from no limit option; avg 0.83%) with already showing shortage while having 512 MB (max. 19.25%, avg. 5.48%). With this and bigger cache options, longer forward knowledge is required. Note that in my experiments only the blocks found in forward knowledge can be kept in cache (see Section 6.1.1 for details). If the forward knowledge is short or there is only small number of blocks which are to be used in the future, the cache memory may not be fully utilized, which can be often noticed on the figures when two results with different memory sizes are the same.

In order to measure the maximal memory requirements for each data set, I have performed a test with the unlimited amount of memory and infinite forward knowledge. The results in FIG. 55 show that data fragmentation has significant impact on required memory even in the case of having forward knowledge. With 3 out of 6 cases the memory requirements have doubled after allowing the inter-version fragmentation, while for IssueRepository they were multiplied by 9 times. The requirements for the remaining two data sets stayed at a quite similar level.

<6.2.4 Experimenting with Larger Prefetch>

Figure 56:
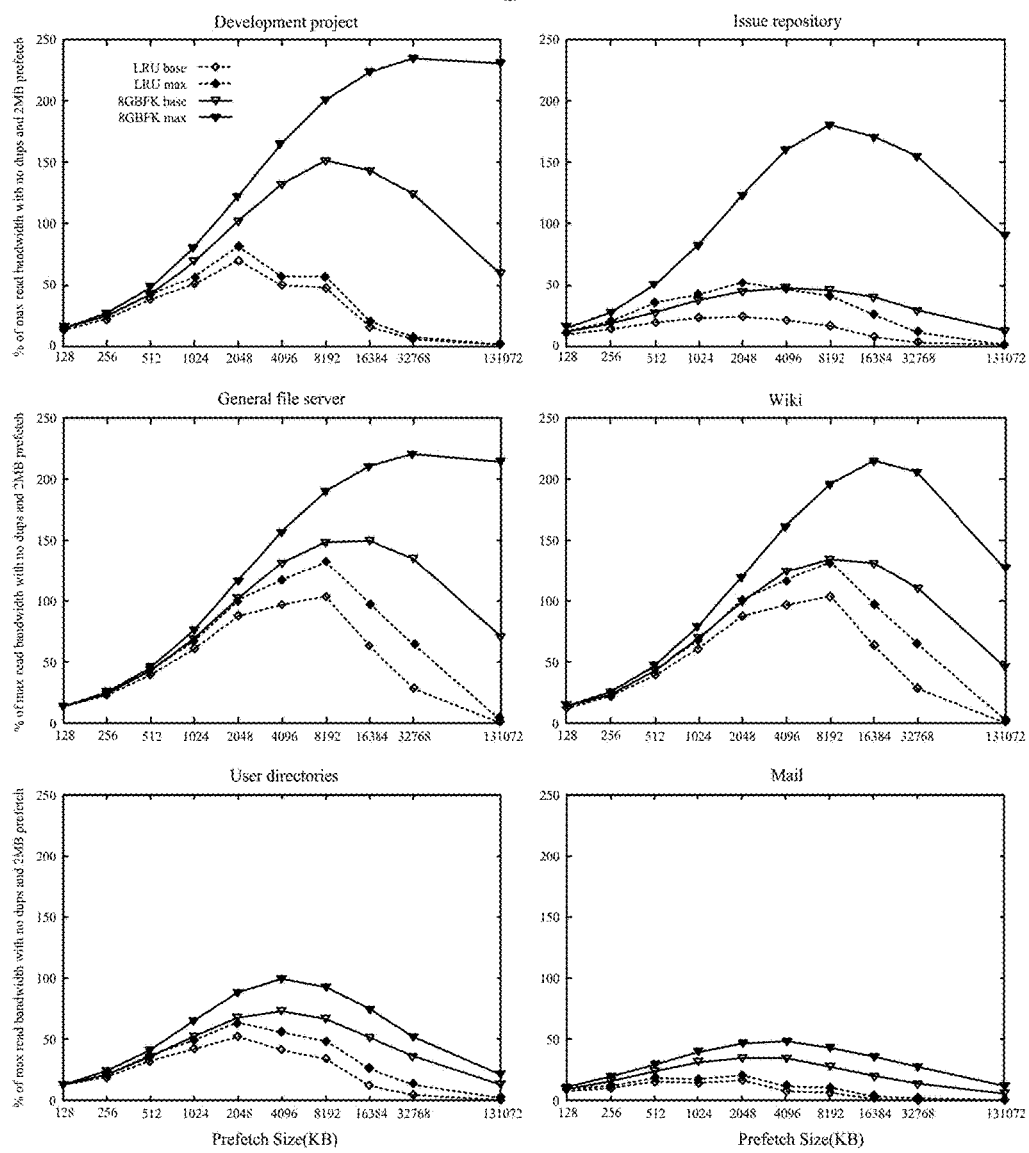
FIG. 56 is a diagram referred to in the research paper described in the fourth exemplary embodiment of the present invention.

Because of the observations from Section 6.1.1 most of my experiments were performed with fixed default prefetch of size 2 MB, as it was the most effective for the most common LRU algorithm point of view and provided easy comparison between different algorithms. Such level of prefetch size (2-4 MB) is also similar to the one used in many papers [48, 53], suggesting that it can be regarded as the most common one. Nevertheless, it turned out that having caching algorithm with forward knowledge modifies those assumptions significantly. In order to visualize the difference in restore bandwidth with relation to prefetch size, I have performed a simulation with common enterprise disk characteristics [71] (sustained data transfer rate: 175 MB/s, read access time: 12.67 ms). The results shown in FIG. 56 suggest that every backup in each condition (fragmented and not fragmented), and using different restore algorithm, has its own optimal prefetch size, which can differ a lot between each other. The one clear observation is that such optimal prefetch is always larger for not fragmented data when comparing to fragmented one, and for the forward knowledge algorithm when comparing to LRU. As a result, switching to the larger prefetch improves the restore bandwidth through a smaller number of I/Os which limits unproductive seeks. Thanks to the forward knowledge algorithm the prefetch size can be larger by 2 to 16 times than with LRU, therefore providing maximal restore bandwidth increase at the level of 11%-117% (avg 68.47%) for fragmented data and 27%-252% (avg. 120.24%) for not fragmented data. When comparing to the results with forward knowledge and 2 MB prefetch, extending prefetch size can give an additional gain of 0%-48% (avg. 23.89%) for fragmented and 3%-92% (avg. 53.90%) for not fragmented data.

<6.3 Evaluation of CBR Effectiveness>
<6.3.1 Meeting the Requirements>
Performance Results The CBR algorithm presented in Chapter 5 is very effective when eliminating the inter-version fragmentation impact for all the traces. In the common scenario with 256 MB of LRU cache the resulting restore bandwidth of the latest backup in each data is on average within 2.48% (from within 21.29%) of the maximal one, which is achieved with no inter-version deduplication (for example by storing single backup). Even though this indicates on average only 29.1% (8%-94%) restore bandwidth increase, the important fact is the perspective of further degradation which should be taken into account. Unfortunately, the true potential of the algorithm could not be shown here due to the lack of traces covering many years of backups (see Section 3.3.2 for details).

Figure 57:
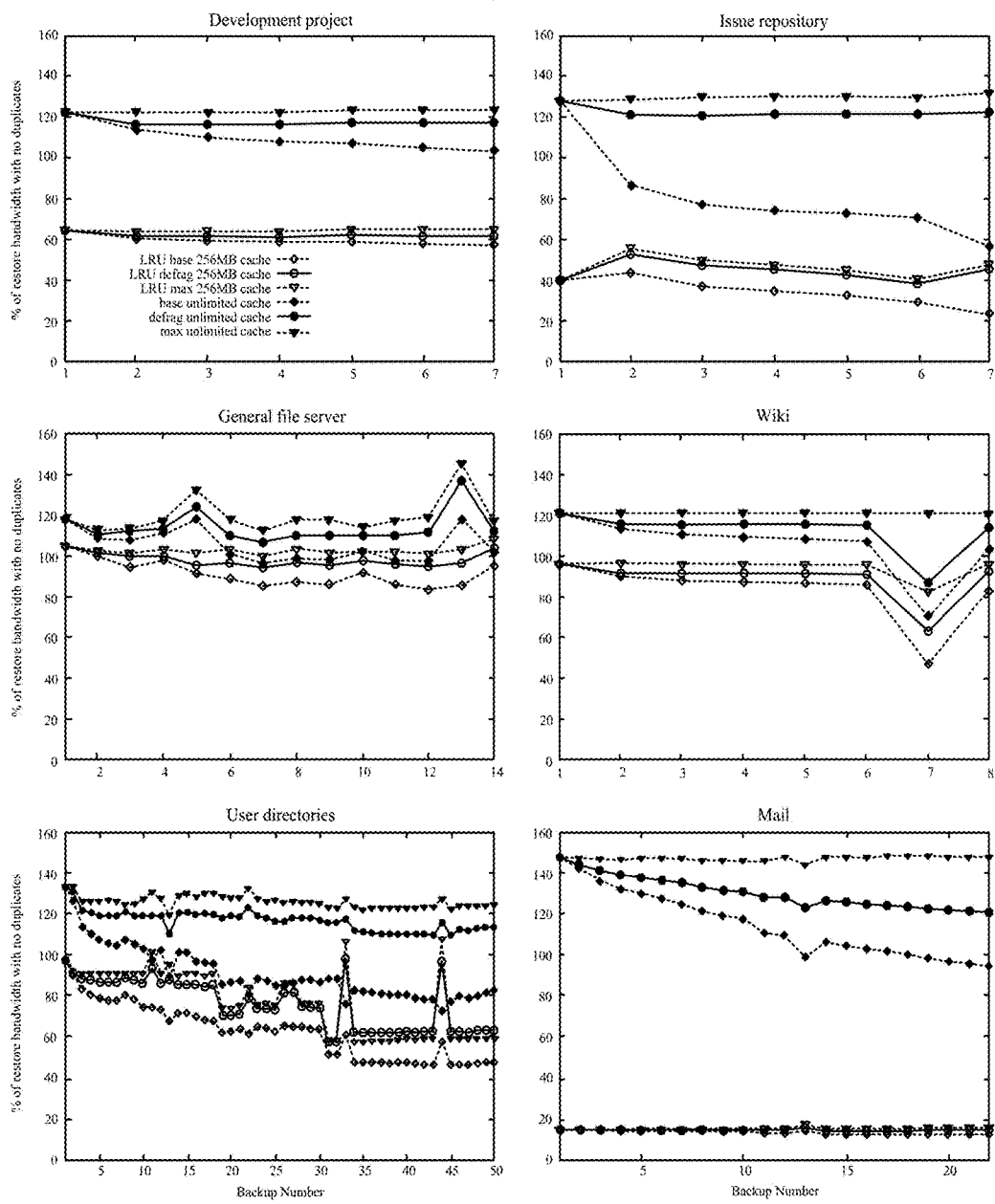
FIG. 57 is a diagram referred to in the research paper described in the fourth exemplary embodiment of the present invention.

When looking more deeply into results shown in FIG. 57, one can make some interesting observations specific to each data set. For example, the biggest increase in fragmentation occurs for backups 2 and 7 of IssueRepository. This is caused most likely by data deletion, because these backups are the only ones significantly smaller than their predecessors. On the other hand, the peaks visible on UserDirectories and Mail charts are caused by not fully completed backups, while other peaks usually differ much in backup stream characteristics (number of duplicates, unique blocks, backup size) from usual ones in a set. Unfortunately, I was not able to verify the core reason of those deviations.

Additional Space and Resources Used

My algorithm does not use additional space except for rewritten duplicated blocks, therefore, the additional space consumption is below 5% of all blocks. Actual number is much lower—between 0.35% and 3.27% (avg. 1.58%). Old copies of the blocks are removed in the background, for example as part of the deletion process running periodically, so the space consumption is only temporary. Additional disk bandwidth consumption is also limited to writing rewritten blocks.

Tunability

The presented algorithm is also easily tunable by setting the percent of blocks to be rewritten. The higher the percentage, the better restore performance at the expense of a bigger drop in write performance and more disk space required for storing temporarily old copies of the rewritten blocks.

<6.3.2 Cost of Rewriting>

When evaluating the cost of the presented algorithm, I have estimated the slowdown of the backup process caused by rewriting. Since the CBR rewrites duplicates as non-duplicates, in order to establish such operation cost, I have modified the write path of a commercial backup system HYDRAstor [23, 55] to avoid checking for duplicates, and compared the resulting bandwidth to the bandwidth of unmodified system when writing 100% of duplicates.

As a result, the bandwidth of duplicates was 3 times higher than non-duplicates. Based on this number, I have used a factor of 4 slowdown for rewriting a block (1 for standard duplicate write/verification+3 for extra write) vs. deduplicating it. For example, 5% blocks rewritten cause from 5.17% up to 15% slowdown. Since all rewritten blocks are duplicates, the actual slowdown depends on the percentage of duplicates in the original stream—the higher the percentage, the higher the slowdown, and 15% slowdown is achieved when all blocks in the stream are duplicates.

Figures 58, 59:
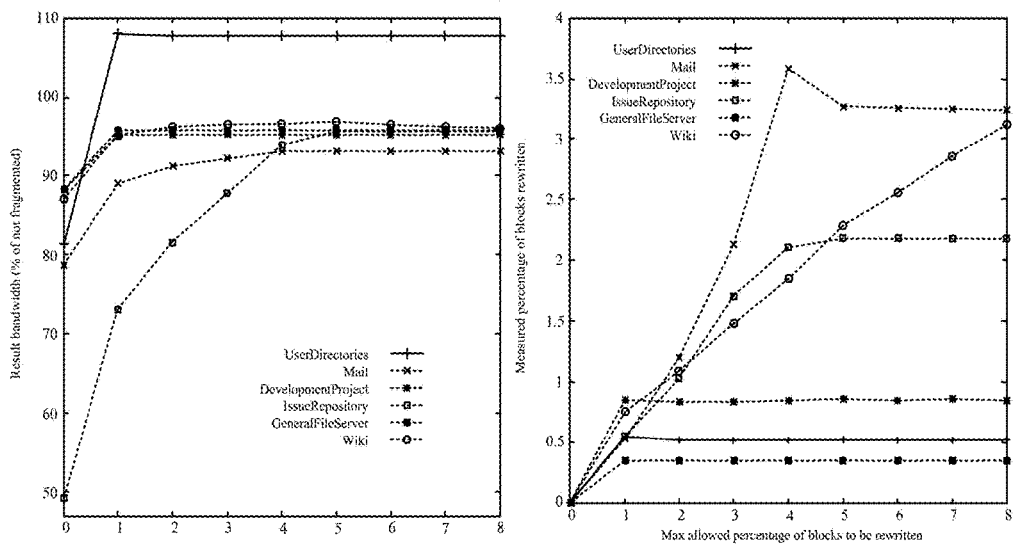
FIG. 58 is a diagram referred to in the research paper described in the fourth exemplary embodiment of the present invention.
FIG. 59 is a diagram referred to in the research paper described in the fourth exemplary embodiment of the present invention.

The maximum presented slowdown seems significant, but as the experiments show, the algorithm hardly ever reaches the maximal allowed rewrite (see FIG. 58). This is because I am very conservative since the minimal rewrite utility is set high at 70% and I always observe the 5% limit while processing backup streams. As a result, the CBR increases the backup time by 1%-9% (avg. 4.21%; see FIG. 58), which seems reasonable. However, there still exists a possibility to set smaller limit of rewritten blocks in order to decrease the potential costs and perform only the rewrites with maximal gain.

The alternative option to reduce the cost introduced by rewrites is to perform the algorithm only every n-th backup. Such solution should also work very well, and at some cost of restore bandwidth, introduce smaller overhead during the backup process.

Note that this trade off addresses also the amount of resources required performing off-line deduplication in the background and the temporary space needed after the backup as they are proportional to the number of rewritten blocks.

<6.3.3 Setting the Rewrite Limit>

To select the best value for the rewrite limit, I performed experiments varying this limit from 0% to 8% while keeping the minimal rewrite utility unchanged at 70%. The results for the latest backup in each backup set are given in FIG. 59. Setting this limit to low values such as 2% or even 1% works well for all sets except IssueRepository, for which the rewrite limit of 5% offers the lowest reduction in restore bandwidth. Increasing this limit beyond 5% does not give additional boost and may increase the backup time significantly, so I decided to set this limit to 5% for all experiments. Even though with this setting the maximal theoretical write bandwidth drop is at the level of 15%, in reality it is on average only slightly above 4%. Also the maximum drop is achievable only with 100% duplicate stream, for which the bandwidth is already very high.

Note that, for most data sets the number of rewritten blocks is proportional to the restore bandwidth gained. This correlation is pretty weak in case of Mail, where internal fragmentation is very severe, and is not true for the case of Wiki data set. The latter one is caused by very unusual backup just before the last one, with about 15 times more blocks added and many more deleted than in standard backups of this set. The algorithm is trying to defragment the backup making a lot of rewrites, while the next one (the last in the set) is rather similar to the others, which makes the algorithm to basically rewrite most of the blocks from the previous backup again.

The interesting fact is also that the UserDirectories restore bandwidth after defragmentation is actually better than the version with no fragmentation (stored as a single and only stream in the system). This is due to the block reordering, which luckily made the caching more effective. This observation also shows that there exists potential in writing backup in a slightly different order than the one requested by the user, but as some of my other tests suggest, such effect is possible only with LRU algorithm as it is not very effective in general (it would require forward knowledge about the whole stream being written and rearranging the block on the fly or expensive background operations). When the cache is equipped with forward knowledge such phenomenon does not happen.

Rewritten Rewrites

My experiments show that even 39% to 97% of all rewritten blocks in the latest backup are the ones which were already rewritten in one of the previous backups. The highest number is reached in backups with very low number of new blocks, resulting in many iterations required to finally achieve the context of enough size. Even though they are rewritten again, it does not mean that they are unnecessary (the experiments disabling the possibility of rewrites already rewritten in previous or any backup showed 10-20% drop in final restore performance). In some cases the rewriting helps to decrease the rewrite utility only a little, not reaching below the required level, or simply moves the blocks to the neighbourhood, which increases the possibility of being read before needed, but without the visible impact on its rewrite utility value (because of restore cache). Both aspects are well visualized with the results of modified algorithm in such a way, that in order to rewrite a block, at least one non duplicate block should be found in its stream context (in order to assure the decrease of its rewrite utility for the next time). Such experiment significantly (even by half) reduced the number of rewritten blocks, but it also reduced the achieved restore bandwidth by a few percent. Similar results can be achieved with increasing the stream context up to even 100 MB.

Since the overall number of rewritten blocks is still very small, I have decided to keep the version of the algorithm assuring better restore bandwidth.

<6.3.4 Effect of Compression>

So far we have assumed that the backup data is not compressible. If we keep the prefetch size constant and equal to 2 MB, the compressible data results in fragmentation increase and the CBR algorithm delivering even better relative improvements in restore bandwidth. For example, for 50% compressible data, the drop in restore performance increases on the tested data sets from 12%-51% (avg. 21.27%) to 16%-56% (avg. 26.12%), whereas the CBR defragmentation improves the restore of the latest backup by 11-121% (avg. 35.79%) instead of 8%-95% (avg. 28.94%), resulting in total drop reduction up to 10% (instead of up to 7% without compression). All results were achieved with a very similar number of blocks rewritten.

Obviously, selecting different prefetch size, based for example on compressibility of data, could change the above results.

<6.3.5 Impact of CBR Defragmentation Process on Required Cache Size>

In order to verify the process of CBR defragmentation in terms of cache memory required, I have performed a test of reading the last backup of each data set after the defragmentation with infinite forward knowledge and potentially unlimited cache size. The actual peak memory usage in each case can be found in FIG. 60. The gathered numbers suggest that the CBR defragmentation process works very well in terms of limiting the memory usage and therefore making the latest backup similar to the one never fragmented in the memory usage area.

<6.4 Combined Impact of Both Algorithms>

Figure 61:
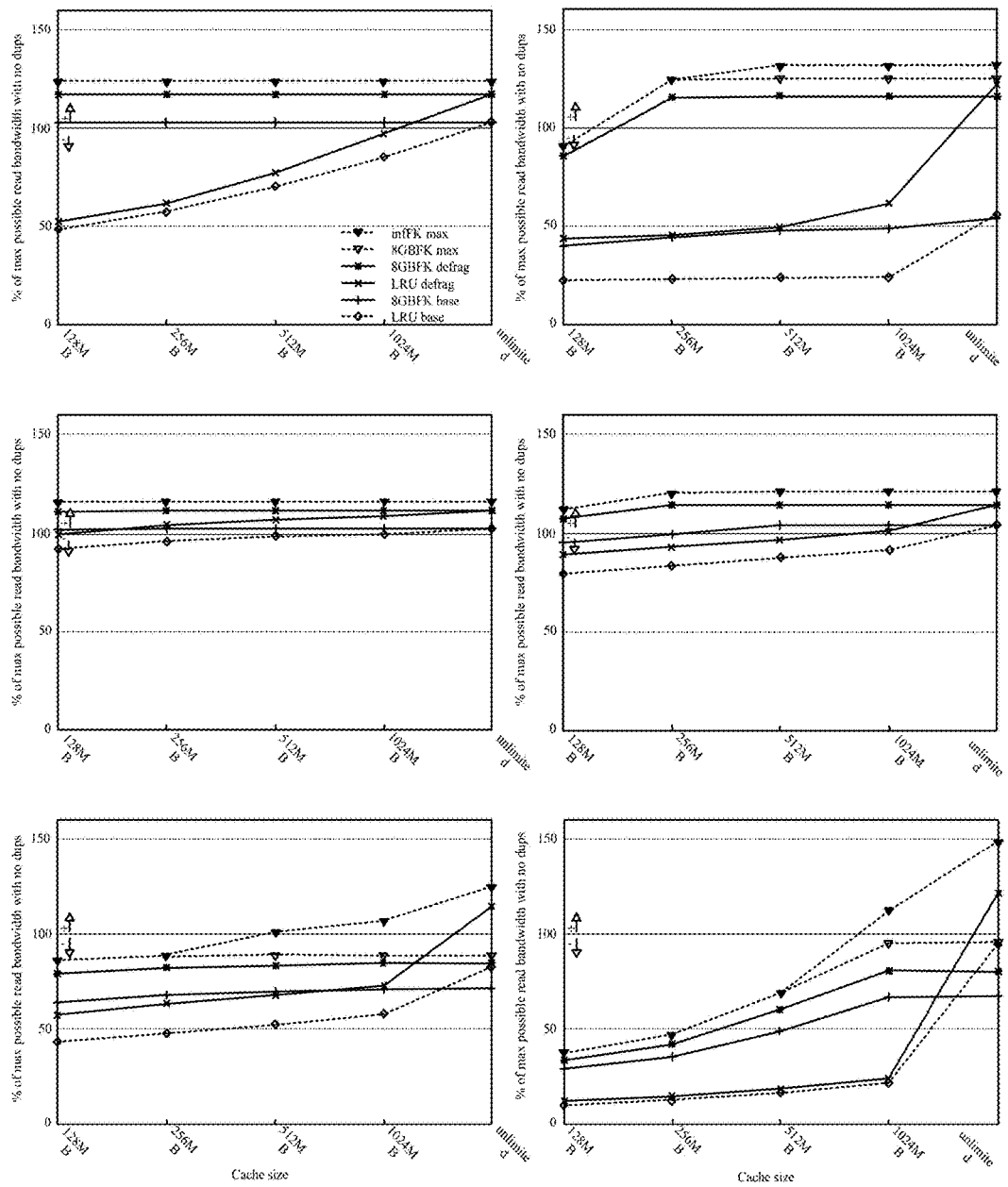
FIG. 61 is a diagram referred to in the research paper described in the fourth exemplary embodiment of the present invention.

FIG. 61 shows detailed results for both CBR defragmentation with limited forward knowledge cache algorithms in a single and combined options for the latest backup with different cache sizes. Two algorithms used to fight different aspects of fragmentation end up in a very effective symbiosis resulting in 16-388% bandwidth increase (avg. 142.65%—see FIG. 62) for different data sets with 256 MB as an example.

Furthermore, the algorithm produces very good results when compared with the maximal possible restore bandwidth achieved with unlimited cache size having only 256 MB of cache memory (see FIG. 64). In four out of six cases the results were at most 13% from the theoretical maximum leaving not much space for improvement, while the remaining two cases still fall behind. UserDirectories (−34.15%) is a quite big data set and require both bigger cache and higher forward knowledge in order to deliver better results, while Mail (−71.15%) includes large portion of internal duplicate blocks which require more memory for efficient caching. In this case more forward knowledge may be beneficial after reaching 1 GB of cache.

Figure 63:
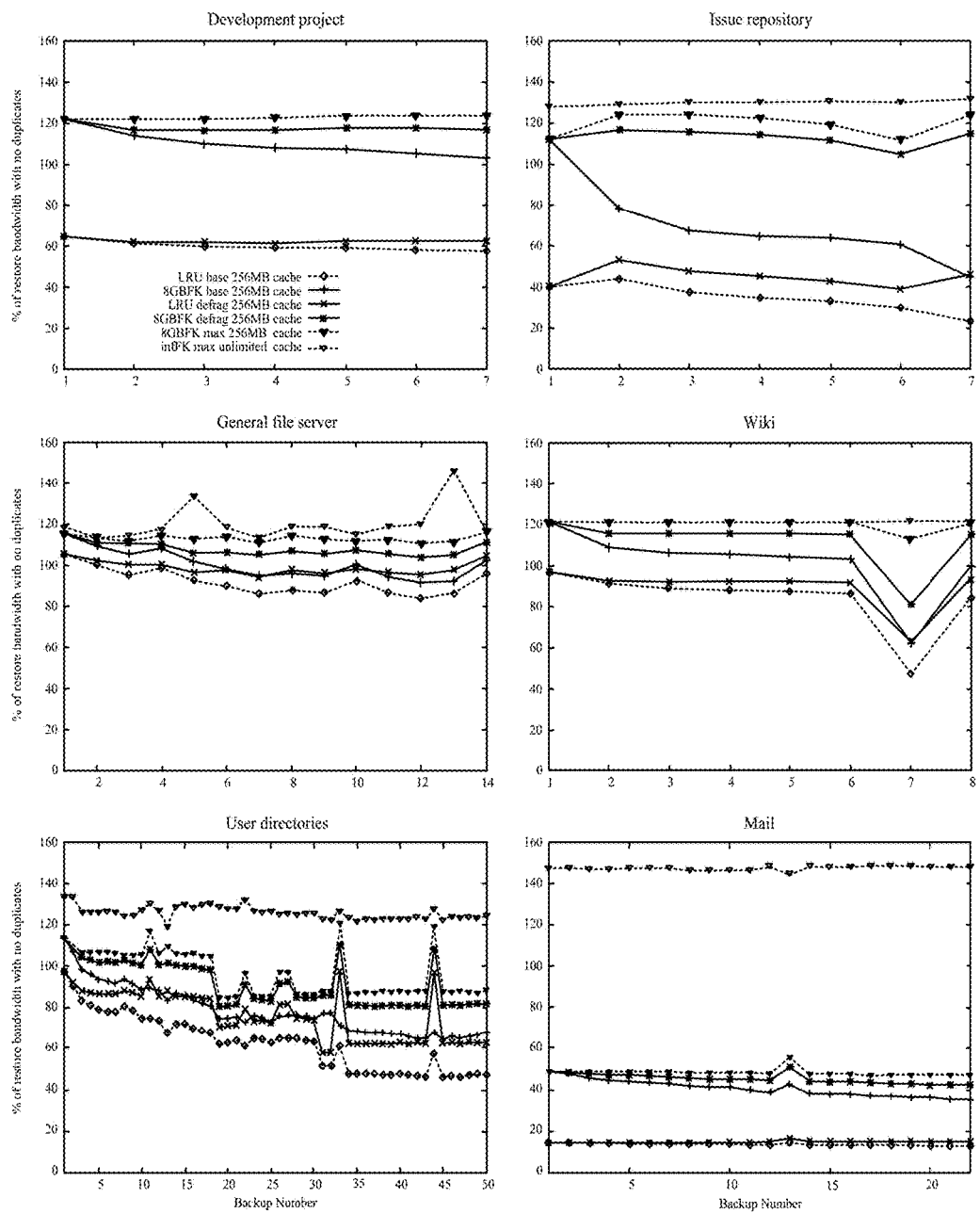
FIG. 63 is a diagram referred to in the research paper described in the fourth exemplary embodiment of the present invention.

FIG. 63 shows the fragmentation process in time and the impact of each proposed algorithm with using 256 MB of cache memory in comparison with the base LRU scenario and the max scenario with unlimited cache size. When looking at the charts joined impact of both CBR and limited forward knowledge algorithms works very well keeping the results extremely close when comparing to the scenario when the data was never fragmented at all (8GBFK defrag vs 8GBFK max). For all the backups there is only one case when the deviation is higher than a few percent.

On the other hand, based on the traces I was able to gather, it is quite difficult to predict whether this mentioned deviation can stay at the same small level for hundreds or thousands of future backup. Even if this is not possible, the impact of fragmentation will be limited to the fraction of the one showing without this solution and in fact may never be noticed by the potential end-user.

When looking at FIG. 61 and the same results gathered in FIG. 66, we can notice one important fact. Thanks to using both algorithms it is possible to decrease memory demands 8 times (from 1024 MB to 128 MB) and end up with higher performance (11.35%-249.61%; avg. 67.74%). What is more, for 4 out of 6 data sets the restore bandwidth results with 128 MB cache were higher than with unlimited memory in the LRU case with fifth data set results very close (UserDirectories—4.52% lower) and the last (Mail—65.22% lower) left behind because of its high memory requirements and the specific pattern of internal stream duplicates.

The results suggest that many data sets require only fraction of memory, which is usually allocated today, and only some may benefit from the larger amount, but only when efficiently used. In general, the proper amount of memory should be allocated rather dynamically during the restore process based on the memory available, user requirements and the exact needs requested by each data stream.

<6.5 Scalability>

Last but not least, with current systems using very often 10 or more disks in order to restore a single block [48, 23, 83] through RAID or erasure coding [80] and serving many streams at the same time, all the above results can be brought into another level. In my experiments I assumed 2 MB prefetch for the whole stream, which in the above setup means only 200 KB prefetch per disk. When using recent disk drives [71] such small prefetch means almost 6 times higher restore time from a single disk when compared with the 2 MB (see FIG. 32).

Figure 65:
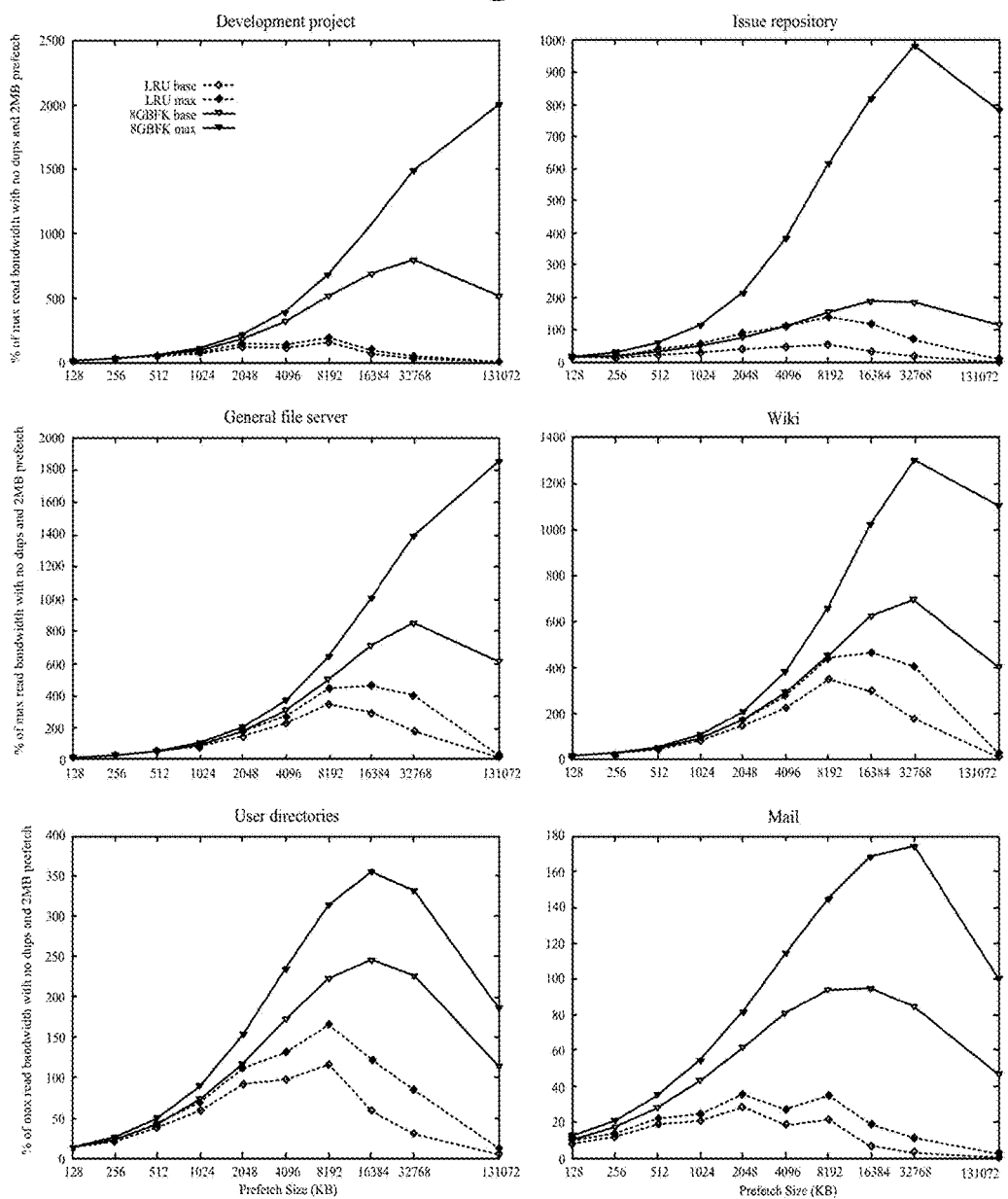
FIG. 65 is a diagram referred to in the research paper described in the fourth exemplary embodiment of the present invention.

As it has already been mentioned before in case of the systems with deduplication, the higher prefetch does not always mean higher performance. When looking at the results with common LRU algorithm (see FIG. 65), even having the speed of ten drives (10×175 MB/s) the further growth of the prefetch above 8 MB (800 KB/drive) gives slightly positive impact only in one case and only for not fragmented data.

The results look completely different when the cache algorithm with forward knowledge is taken into account. In all cases 32 MB prefetch gives a few times better results and in two cases (DevelopmentProject and GeneralFileServer) even higher results with larger prefetch are available. In a single case only (UserDirectories) 16 MB prefetch is slightly better than 32 MB. In details, when moving from the best LRU prefetch (chosen separately for each data set) to best prefetch with forward knowledge algorithm, we can gain additional 75%-390% (avg. 184.23%) for fragmented and 116%-933% (avg. 396.77%) for not fragmented data. Comparing with the forward knowledge algorithm and 2 MB prefetch simply increasing, the prefetch size can increase the results by up to 109%-379% (avg. 254.72%) and 132%-835% (avg. 531.25%) respectively.

Having the above numbers, increasing the prefetch size seems a very interesting option. One needs to remember, though, that such operation introduces higher latency variations, which may be important for some type of usage. Fortunately, with secondary storage system it will not be an issue, as bandwidth is the most important in this case and the higher latency can be easily accepted.

Examining the prefetch size brings one more observation. The larger the size the more visible the difference between fragmented and not fragmented data. As with LRU standard algorithm and its best prefetch size for each data set the defragmentation could give about 20%-156% (avg. 59.72%) bandwidth increase, the same gain for forward knowledge algorithm with its best prefetch size can achieve 44%-420% (avg. 164.18%). Such results suggest even higher importance of proper defragmentation algorithm.

In order to verify the ability to defragment data with proposed CBR defragmentation algorithm, I performed a simulation with only two parameters modified. The prefetch size was set to 32 MB (3.2 MB/drive), which seems to be close to optimal with 10 drives, and the stream context to 80 MB, in order to preserve the proportion to prefetch size. The cache size was still 256 MB with forward knowledge set to 8 GB. The achieved results without any additional tuning were actually pretty good. The algorithm was able to gain 36%-333% (avg. 97.66%) of restore bandwidth, ending up with a result only 4% to 19% (avg. 8.88%) lower than totally not fragmented stream. The only data set which was hard to defragment in the above setup was Mail. In this case the final result was 34% lower from the not fragmented stream after a still significant 36% increase over the fragmented version.

To sum up, I performed one more experiment showing the importance of using many disks for restore and the algorithms introduced in this thesis. Assuming 10 disks used I compared two algorithms with 256 MB of cache: 2 MB prefetch LRU (representing the level used often in today's systems [48, 53]) versus 32 MB prefetch with forward knowledge (8 GB) and CBR defragmentation. The resulting restore bandwidth of the latest backup depending on the data set was from 3.5 up to 16 times higher with an average of slightly above 8 times. Going simply to 8 MB prefetch with LRU, which is best when considering all the data sets and 10 disk drives, gives only 60% increase. This shows that the leap possible in case of the critical restore, thanks to the presented algorithms and using many disk drives, can be very significant.

<Chapter 7 Related Work>
<7.1 Comparison with Off-Line Deduplication>

One simple solution which satisfies some of the requirements for fighting inter-version fragmentation is already present on the market and is called off-line deduplication [74, 62, 61], described in Section 2.2.1. In its simplest form, all data from the current backup are stored continuously on disk, and the deduplication is done in the background in such a way that the blocks from the latest backup are a base for eliminating duplicates from older backups [61, 45].

As a result, the currently written stream has no fragmentation and older backups are fragmented proportionally to their age. Even though the algorithm was most probably not designed to deal with fragmentation, it is very effective for eliminating it in recent backups. However, since deduplicating a block is usually much faster than sending it over a wire and storing it on disk, off-line deduplicating systems may be slower than in-line deduplicating systems (or require more spindles and network bandwidth to avoid such problem).

The percentage of duplicates in a backup depends on the data patterns, but based on the characteristics of over 10000 systems gathered by Wallace et al. [79], we can assume the average value of deduplication ratio at a level of 10 times reduction, which results in about 90% of duplicates in an average backup. As explained in section 6.3.2, deduplication without writing the data can be 3 times faster than writing the data first and then deduplicating it in the background. Therefore, writing a backup stream with 90% of duplicates costs 300 time units with off-line deduplication and only 110 time units using a system with in-line dedup, even if such system does a dedup query for each block. As a result, using off-line dedup results in a backup window more than 170% larger. This is clearly not acceptable, as backup window usually cannot be extended much.

The idea of the context rewriting algorithm was to keep most of the defragmentation assured by off-line deduplication solution and provide the flexibility being able to fight its biggest issues described in section 2.2.1. In fact, when modifying the configuration parameters of the algorithm, all the blocks would be rewritten and all the duplicates would be eliminated in the background making both solutions very similar. On the other hand, with the border of rewritten blocks set to 5% preserving the performance and other aspects of in-line duplicate elimination, the fragmentation may be improved by a major factor.

Beyond off-line deduplication and the in-line CBR, there is at least one more option—to perform the context-based rewriting in the background, i.e. off-line, mentioned already in section 5.4.6. Such solution does not affect backup writing at all, but it needs a long time to complete reading the fragmented data and rewriting them in the background. Additionally, a restore attempted before block rewriting is completed will still suffer from low bandwidth.

The comparison of all mentioned alternatives is presented in FIG. 67. I would like to note here that storage consumption of both off-line options can be improved by staging, i.e. by running the process of removing the duplicates (or rewriting some of them) in parallel, but little behind the process of backup writing. Staging, however, requires more resources such as CPU, available disk bandwidth and spindles.

<7.2 Fragmentation Measurement>

Chunk Fragmentation Level (CFL) has been introduced by Nam et al. [52] in order to visualize the fragmentation problem of a stream. Assuming that the data were stored in fixed size containers (2 MB or 4 MB), the idea was to divide the optimal chunk fragmentation (size of the stream divided by the container size) by the current chunk fragmentation (the actual number of containers read during restore), limiting the maximal value of achieved result to 1. The resulting number was to be proportional to the achieved performance. Unfortunately, the number did not consider the existence of read cache, which is very important when measuring restore performance and made the experiments not realistic.

The second version of this algorithm [53] did include the existence of read cache in the current chunk fragmentation calculation, but some other flaws remained. The maximal value of 1 seems to be an artificial limitation and does not reflect the real restore performance in case there is a high and well cached internal stream deduplication, which, as my experiments show, can often happen. The other limitation is actually the strong dependence on the writing algorithm (container size) together with its usage in cache eviction algorithm. Keeping whole or no container in the cache does not seem like an optimal option for the cache either, especially that usually only some blocks from the container will be necessary. On the other hand, as the LRU cache replacement policy is in general not very effective, the impact of such algorithm is rather small—the problem would be much larger if more effective cache eviction policy was used, such as the cache with forward knowledge.

Lillibridge et al. [48] propose actually a very similar indicator called "speed factor". It is also based on the number of containers, but it is defined in a bit different way as 1 divided by the number of containers read per MB. Assuming the container size the same as with CFL (4 MB), the "speed factor" 1 equals CFL 0.25. When comparing both indicators, the CFL looks a bit better only because the value of 1 clearly shows the speed of the system with no deduplication and no fragmentation. On the other hand, "speed factor" is not limited in any way, showing the exact values even when the impact of internal stream deduplication is positive. Unfortunately, such feature is just theoretical as the algorithms used in the experiments did not allow the "speed factor" value of 4 (equal to CFL 1.0) and above, even with unlimited cache memory used. Some limitation in both algorithms is still strong dependence on the container size created during the backup process.

The indicator proposed by me: "% of restore bandwidth with no duplicates" is actually very similar to the ones above with some modifications (see comparison in FIG. 68). First, its name clearly presents its meaning, which makes it very intuitive to use. Second, it does not limit the results in any way, predicting the output performance very well even in cases when it is better than in systems with no deduplication. Third, it is highly independent from the writing algorithm and does not depend on the used container size, which can help in making it usable in the wide area of systems and in order to experiment with different prefetch values. Of course, it can be also easily limited to reflect the exactly same behaviour like the ones with fixed container sizes. The last but not least factor is the cache eviction policy used by the simulation. My experiments showed that with no doubt it is an extremely important factor when measuring fragmentation and may have a very high impact on the achieved results.

<7.3 Defragmentation Algorithms>

Most recently, the topic of improving read performance in storage systems with deduplication became quite popular in the published papers. The solution proposed by Lillibridge et al. [48] involves a technique called "container capping", which can be regarded as a kind of defragmentation. The solution does well in improving read bandwidth by assuring restore only from limited number of containers, but the results shown are compared only with the original algorithm designed by the author [44], which is rather poor and cause high fragmentation by design (by analyzing the results 12-44 worse restore bandwidth, when compared to a simple system with no deduplication). Unfortunately, there is no comparison with the restore bandwidth achieved with no inter-version fragmentation nor the algorithm with unlimited cache, which would be very interesting and would have made the results at least partly comparable with the ones presented in my work. Without that, the level of internal deduplication cannot be determined together with its impact on the final results, which can potentially be significant as shown in the experiments. One information we can get from the charts is that with capping set to 10 (achieving the highest restore bandwidth of all options analyzed in the article) the algorithm achieves 50-90% (assuming speed factor 4 equals 100%) of bandwidth possible in case of a system with no deduplication. This result would sound moderately well, but only if we do not consider the negative impact on the cumulative deduplication factor, which in such setup is equal to 17-50% (depending on the data set). This cost is very high and causes lower write bandwidth, which is not mentioned in the text. Compared to Lillibridge's research, none of the algorithms presented in my work modify the deduplication ratio and only one slightly decreases write bandwidth. Beside the algorithms, the study also showed the significance of the fragmentation problem on interesting long term traces (covering even 2 year period), which is something difficult to find. Unfortunately, the traces turned out not to be available for other researches, which did not allow me to compare the results directly.

Another way for assuring demanded read performance was presented by Nam et al. [53]. The basic idea here is to use Chunk Fragmentation Level [52, 53] indicator to monitor simulated read performance during write and enable selective deduplication when this level is below some defined threshold. As it was shown that CFL is a good indicator to do that, such algorithm guarantees some predefined read performance while storing data. In practice this result is achieved with moderately high cost. As selective deduplication works only part time, some places in the stream where fragmentation could be significantly improved at low cost are omitted, whereas requiring blocks to be stored in perfect sequence makes that a lot of unnecessary duplicate blocks are stored again. Based on the above observations, and in some cases a very low backup bandwidth (even 70-90% drop while assuring CFL=0.6 for restore), I can only assume that the level of such blocks is high, as the impact of algorithm on deduplication ratio was not mentioned in the article. The algorithms presented in this work, on the other hand, does not introduce additional storage consumption and try to fix the fragmentation problem at the cost not higher than the one defined by the user. Such approach is much more efficient as I try to improve the fragmentation at the smallest possible cost. Having an option with assured performance is also possible (in an easy way: by setting current rewrite utility to some fixed value; or a more complicated way: to set it by simulating restore performance during write), but at the cost of variable write bandwidth, which may not be acceptable. Such solution would still be better than the one proposed by the author as the blocks rewritten at first would be the ones introducing the highest fragmentation.

RevDedup [57] is a system which fights fragmentation by performing on-the-fly reverse deduplication. After storing such a block, the older copy is immediately located and removed. Interesting approach is also used to handle the null (zero-filled) blocks, which can be often found in virtual machine images. In such case the server skips the disk writes and when necessary, generates the null data on-the-fly. Unfortunately, the whole system is tailored for virtual machine images with many solutions such as fixed block sizes and large segments (4 MB), which are not applicable to storage systems in general. The solution succeeds in highly improving the restore bandwidth, but on the other hand, even with clever null blocks handling the system suffers from a much lower (30-65%) backup throughput when compared with the conventional deduplication, and achieves lower deduplication ratio.

Srinivasan et al. [75] describe very similar issues with fragmentation discovered in primary storage. The solution proposed by iDedup is to amortize seeks by keeping a minimum sequence length on disk by stored blocks. In this case the task is more complicated as for primary systems latency is one of the most important factors. The various results show increase in average request size and better client response time but the difference is not significant. Also, no restore bandwidth was measured (probably due to different purpose of this system). On the other hand, the drop in deduplication ratio at a level of 30-50% seems significant even for a primary storage system.

<7.4 Caching>

Forward assembly area [48], the second technique proposed by Lillibridge et al., beside container capping, is aimed to help with better cache memory usage by using the backup's recipe (similar to forward knowledge) known at the restore start. In the simplest case the authors restore the full backup in M-byte slices with necessary memory allocated for the one being read called forward assembly area. To restore a single M-byte slice, they first read in the corresponding part of the recipe into the memory buffer and determine which chunks are needed to fill the required byte ranges. Each time the earliest unfilled chunk spot in the assembly area is localized, the corresponding container is restored while filling all the parts of the assembly that need chunks form that container. After the process is completed the data can be returned to the user and the assembly area can be clear in order to read the next M-byte slice.

The interesting fact is that the solution works well only on highly fragmented data (no capping or high capping levels), which in the way it is defined, can be also observed in my experiments. Unfortunately, with more reasonable capping values (10, 15, 20—as defined in the paper) this makes the algorithm not really useful. The main problem here is that the whole forward area needs to have the memory reserved even though it may not be used for most of the time (1 GB of forward assembly area at the cost of 1 GB of RAM). This approach significantly limits the maximal possible size of forward assembly area, which as a result makes the algorithm less effective for not fragmented streams. Compared with the forward assembly area, the cache with forward knowledge presented in this work requires even as low as 1.62 MB of memory for 1 GB of forward knowledge and it uses all the cache very effectively only for keeping the blocks, which will actually be needed in the future. Actual difference can be seen in FIG. 54, where the option with 512 MB cache and 512 MB of forward knowledge looks very similar to the 512 MB forward assembly area (besides the fact that with my algorithm the reappearing block can be held in memory throughout the whole stream, while with forward assembly area the guarantees not to read it again are only for the size of the area). As a result, the user can get higher restore bandwidth with a few times smaller memory cost with the forward knowledge cache.

All studies of fragmentation in backups systems other than the above [52, 53, 41] simply use LRU cache to measure achieved results and verify the efficiency of proposed solution. In addition, Wallace et al. [79] performed a wide study of backup workloads in production systems reporting the hit ratio for LRU read cache when restoring final backups. On the showed charts we can observe the impact of additional cache memory. Unfortunately, when looking at the only reasonable choice (container level caching) starting from 128 MB of memory up to 32 TB, most of the results look very similar and cannot be read with required precision, which makes the usefulness of such data representation very low for our purpose. Note that in case of no duplicate stream access with 4 MB container the expected stream hit ratio is 99.8% (1 read every 500 blocks of size 8 KB), while 99.6% shows already two times more I/O operations therefore reducing the restore bandwidth by half. Also, in case of well cached internal stream duplicates the cache hit ratio can be above the 99.8% level.

In [5] Bélády shows the optimal cache replacement policy when having a complete sequence of block references to be used supplied by a pre-run of the program. Originally the algorithm was designed for paging, but it can be used anywhere until the single read size (from some slow device) and the smallest cache replacement size are equal. With similar assumption Cao et al. [14] performed a study of integrated prefetching and caching strategies giving four rules to be followed by every optimal solution. Unfortunately, they do not apply directly for the same reason for which the Bélády's algorithm is not optimal in case of streaming access in backup systems. Assuming the prefetch containing many blocks which are read at once and the cache eviction policy which can operate on each single block, the potential cost of reading again for each candidate for removal should be calculated. As the blocks are read in batches, this cost should be always calculated with consideration of all the blocks read in one batch and should be divided by the number of blocks actually needed. Such approach, on one hand, may allow an optimal usage of cache dedicated for data, but on the other, may require additional storage for meta information with unknown final result. As my experiments show, the cache with limited forward knowledge which uses simplified additional information works very well and in many cases actually results in a performance very close to the maximal one (achieved with unlimited cache size).

<7.5 Other Related Work>

A few papers investigated improving metadata read for faster duplicate elimination. Zhu et al. [83] describes a solution with Bloom Filter and stream-oriented metadata prefetch, whereas Lillibridge et al. [44] argues that sparse indexing (eliminating duplicates only within previously selected few large segments) is better due to smaller memory consumption. These solutions assume streaming write pattern, whereas SSD can be used for elimination of random duplicates [21, 49]. Such approach makes the fragmentation problem even harder, as more fine-grained duplicates can be detected. Additionally, none of the above techniques solves the problem of reading the fragmented data and in all cases fragmentation increases with subsequent backups. The interesting fact is that the CBR defragmentation algorithm improves the effectiveness of some former solutions as a side effect, by making the access to both data and metadata of the defragmented stream more sequential.

If we relax the requirement on defragmentation solution of not degrading deduplication effectiveness, we can try to deduplicate only within a subset of data, therefore potentially reducing fragmentation. Besides sparse indexing, such approach is possible with extreme binning [7], with large segment similarity such as in ProtectTier [3], subchunk deduplication [69], and with multi-node systems restricting dedup to one or a subset of nodes such as Pastiche [20] and DataDomain global extension [22, 28]. Unfortunately, even if we consider very few (2-3) segments of previous backups to deduplicate the current segment against, those segments may already be not sequential on disk, because they may contain also duplicates from other, older segments.

Some vendors, such as EMC, try to fight the fragmentation with time and resource consuming housekeeping processes [46, 83]. The description of this process has not been published, but one possible approach is to selectively rewrite subset of duplicates in the background, i.e. in a way similar to our CBR approach, but done off-line. More on such algorithm is given in Section 7.1. Other systems, such as HYDRAstor [23, 55], use bigger block size (64 KB), which reduces the severity of the fragmentation problem, but may also lower the deduplication. However, big block size facilitates also global deduplication which in sum increases deduplication ratio. Finally, we can eliminate fragmentation by deduplication with logical objects. In early versions of EMC Centera [27], the unit of deduplication was entire file, which worked well for Centera's target market, i.e. archiving, but is not the right solution for backups, because file modifications make such dedup ineffective.

What is important, none of the above solutions mentions usage of forward knowledge which is easily accessible when it comes to backup solutions. As my experiments show, this additional information makes a significant difference when it comes to restore performance and the efficiency of cache memory used.

<Chapter 8 Conclusions>
<8.1 Summary>

In this work I described data fragmentation problem in backup systems with deduplication and proposed solutions for two different aspects of this issue. Additionally, I quantified the impact of different kinds of fragmentation caused by the deduplication on backup restore bandwidth with and without introduced algorithms. To support my results I performed a large number of experiments on real backup traces gathered from users.

The problem is quite severe, and depending on each data set characteristics, it may result in restore bandwidth drop of more than 4 times (including inter-version and internal stream fragmentation) while assuming the usage of a single drive and comparing to systems with no deduplication. Even bigger drop should be expected when more spindles are being used. As my experiments were driven by six sets of real backup traces with only 7-50 backups in each set, the problem has still high potential for further growth with backups spanning many months or years. Finally, in the most popular systems with in-line deduplication, fragmentation affects the latest backup the most—the one which is also the most likely to be restored. To deal with the problem, I have proposed two algorithms fighting against two different aspects of fragmentation.

The first algorithm is a dedicated cache with limited forward knowledge, and is aimed at dealing with the internal stream fragmentation caused by many duplicates present in a single backup. Thanks to its design, tailored to backup systems, the solution uses the forward knowledge already present with each backup in order to provide effective usage of cache memory—the one dedicated for the actual data to be reused (cache in short). Moreover, depending on memory limitations and stream characteristics, the algorithm transfers most of the negative impact caused by internal stream fragmentation into a positive one. This is possible by keeping the blocks used many times in the memory, resulting often in even better performance than in systems with no deduplication, where the data is placed sequentially.

As a result, when using forward knowledge the average restore bandwidth increases in 128 MB-1 GB cache configurations by 61%-87% when compared with the standard LRU approach. The effectiveness of used memory is also very well shown when comparing 128 MB option with only 2 GB of forward knowledge (131.25 MB of memory used in total) to 1 GB LRU cache. In this case, even though with almost 8 times less memory, the proposed algorithm still achieves on average 16% better restore bandwidth. Another interesting fact is that with 256 MB of memory, 8 GB of forward knowledge is often able to provide restore results nearly as high as with infinite forward knowledge. Moreover, in 4 out of 6 cases the results are almost identical to the ones achieved with unlimited cache size.

The second algorithm called context-based rewriting is aimed directly at the inter-version fragmentation problem caused by many backups of the same file system changing slowly in time. By rewriting not more than 5% of all blocks during backup, the algorithm improves restore bandwidth of the latest backups, while resulting in increased fragmentation for older ones, which are rarely read. Old copies of the rewritten blocks are removed in the background, for example during periodic deletion and space reclamation process, which is already required in storage systems with deduplication.

My trace-driven simulations have shown that rewriting a few selected blocks (1.58% on average) reduces maximal write performance a little (1-9%), but practically eliminates the restore speed reduction for the latest backup from 12-51% to at most 7% (avg. 2.6%) of the maximal bandwidth with LRU cache.

As both of the proposed algorithms deal with different aspects of data fragmentation, I have combined them together in order to achieve even better results. The actual numbers show 16% up to 388% higher restore bandwidth over standard LRU with an average of over 140% (both with 256 MB cache, but the combined version having additional 13 MB for the forward knowledge structures). The results show the algorithms to be complementary to each other, as the effect is even higher than the one which could be expected after simply adding the gain achieved by each of them (which would give an average improvement at the level of 99%). Moreover, combined algorithms with only 128 MB of cache, due to effective block rewriting and efficient memory usage, provide better results than the standard LRU, with even unlimited cache available and leaving the space for further limitations of the memory used while keeping reasonable performance. This is important as the memory showed is required per each stream being read, while in case of a critical restore there can be many of streams restored at once.

The presented algorithms perform very well when assuming only a single disk drive in the system, but even more interesting is their behavior in more real-life scenarios, where the restore of one stream is performed from many disk drives at once. The experiments show that in such environment the problem reaches another level, making the restore even more ineffective. Fortunately, the combined algorithms show their strength in such scenario as well by effectively utilizing the setup and reaching 3.5-16 times higher bandwidth with 8 times being an average.

Even though the problem of data fragmentation has already been known for some time [83, 62, 61, 63, 46, 45, 81], for a few years there has been no published work in the subject. The first papers trying to dig into this topic appeared in 2012 [75, 53, 41], with a few additional ones published in 2013 [48, 57]. This suggests that the subject has become more interesting for the community and potentially still requires research to definitely understand the problem and provide a solution flexible enough to be useful with different approaches. I believe that my work is a major step forward in this direction through: (1) detailed analysis of the problem with naming the three reasons of observed slowdown, (2) the proposal of two independent algorithms for solving the most severe aspects of the issue and (3) providing the results of various experiments, leaving the community with better understanding of the data fragmentation problem in backup systems with deduplication.

<8.2 Future Work>

<8.2.1 Perfect Memory Division During Restore>

As already discussed in Chapter 4.5, the fixed memory division between the actual cache and the forward knowledge is not the optimal choice when it comes to different data sets and even within the restore process of a single stream. The solution here would be the dynamic memory division. The idea is to extend the forward knowledge when the rest of the memory is not yet fully occupied by the actual data, and decrease it when there is not enough space to keep the blocks read and required in the future. The key is to constantly preserve the state where all the read blocks, which are to be found in forward knowledge, can be stored in the memory while keeping it utilized in nearly 100%.

The idea is in general quite simple, but the difficulty here is with the latency of each such operation always present in distributed systems. It will require some dedicated algorithm making the division rather smooth and dedicated communication interface between the layer providing the metadata and the cache itself. Nevertheless, such algorithm should enable even more effective cache usage than fixed memory allocation presented in this work.

<8.2.2 Optimal Cache Memory Usage>

Having fixed amount of cache, the presented algorithm of evicting blocks which will not be used for the longest time in the future is not optimal as the Bélády's optimal algorithm [5] is when it comes to page replacement policy. In the latter case the page is actually treated as an independent unit which can be deleted or read separately in case of a page fault, making the case with data blocks in a backup stream different.

As within a backup neighboring blocks are very often logically connected between each other in terms of the time of being read, it would be good to utilize this observation when it comes to memory management. The idea is to look not only at the distance to the block when eviction is necessary, but actually at the cost of each operation. When doing so, it may appear that instead of keeping blocks located in the stream being restored in the N, N+1 position in the future, it is actually better to keep the ones located in N+2 and N+3 positions. Such scenario can happen when the first two are readable from the disk with only one I/O, while for the latter ones two I/Os are required.

The potential of such solution in increasing the bandwidth and/or even more effective usage of small amounts of memory is difficult to predict. On one hand, with 256 MB of memory 4 out of 6 data sets in my experiments already achieve maximal possible bandwidth (similar to the one with unlimited cache size), but on the other, there is still potential when it comes to UserDirectories and Mail. Of course, in all cases it is possible that thanks to the actually optimal implementation even smaller amount of memory will provide the bandwidth very close to the maximal one, available when no memory limitations are present.

<8.2.3 Variable Size Prefetch>

One more general proposal of improving the overall restore performance is to use variable prefetch size. The idea is to modify the prefetch size based on some stream characteristics known in advance or gathered during the stream restore. Thanks to that, for example, one can use a very small prefetch when the data requests are more or less randomly scattered over the disk or use a very large one when they are requested in the exactly sequential order. Even though the algorithm may be very useful when the order of requested data can differ a lot or can be known in advance with relation to each block placement on the disk, in case of backups systems it seems to have a limited usability. The main problem here is that it does not actually fix the potential fragmentation problem, but only tries to mask it with using smaller prefetch, which still leads to restore degradation.

<8.2.4 Retention Policy and Deletion Experiments>

The interesting area which is still to be examined in terms of factors impacting the restore performance of the latest backup is the retention policy. The first idea here is to verify the frequency of backups (daily vs weekly vs monthly) and its impact on fragmentation level together with the results achieved with CBR defragmentation. The second one is to verify the impact of the number of previous versions of one backup set kept in the system (assuming fixed backup frequency within one experiment). On one hand, having more data makes it also more difficult to read the blocks which are actually needed, but on the other, simply deleting the old versions does not make the current backup change the location on the disk. Having some intelligent concatenation mechanism between the data belonging to the same streams, may be a solution here.

<8.2.5 Possible Extensions to CBR Algorithm>

When it comes to the context based rewriting algorithm, the future work may explore the following issues:

allowing for slightly reduced deduplication when fragmentation suffers a lot simulating the cache algorithm with forward knowledge during write (exactly the same or similar to the one used with restore)

applying the statistics gathered during previous backups while choosing the optimal current utility threshold performing CBR defragmentation once every n-th backup in order to save write bandwidth when considering some block as a rewrite, taking into account other streams in which it is present Even though the current CBR algorithm performs the defragmentation very well, leaving not more than 7% to the optimal result, the above extensions may reduce this gap even further together with the cost of write bandwidth reduction with every backup.

<8.2.6 Global Fragmentation>

The last aspect of fragmentation left for further analysis is the global fragmentation present between the different data sets placed in one backup system. In Section 3.2.3 I have already described the problem and some possible approaches to the actual solution. While committing to the maximal efficiency of data deduplication, this aspect of fragmentation seems the most complex one in terms of providing the solution for any existing system and any combination of different data sets placed together. Throughout many different usage patterns the number of global duplicates can vary a lot together with its impact on both deduplication ratio and the amount of additional fragmentation. Limiting the deduplication scope to the previous version of the same stream may be a reasonable choice in case of a system with extremely high priority of the restore performance. Some of the extensions to the CBR algorithm proposed in previous section may also help in the aspect of global fragmentation.

SUPPLEMENTARY NOTES

The whole or part of the exemplary embodiments disclosed above can be described as the following supplementary notes. Below, the overview of a storage device and so on according to the present invention will be described. However, the present invention is not limited to the following configurations.

(Supplementary Note 1)

A storage device comprising:

a data storage part storing deduplicated block data;

a temporary data storage part temporarily storing block data acquired from the data storage part;

a data retrieval control part retrieving the block data stored by the data storage part, storing the block data into the temporary data storage part, and retrieving the block data from the temporary data storage part; and a temporary data control part controlling a storage state of the block data stored by the temporary data storage part, the storage device also comprising a retrieval turn information storage part storing retrieval turn information which is information about a turn to be retrieved of the block data, wherein:

the data retrieval control part causes the temporary data storage part to store the block data acquired from the data storage part on a basis of the retrieval turn information acquired from the retrieval turn information storage part; and the temporary data control part controls the storage state of the block data in the temporary data storage part on the basis of the retrieval turn information.

(Supplementary Note 2)

The storage device according to Supplementary Note 1, wherein the temporary data control part controls the storage state of the block data in the temporary data storage part by deleting the block data stored by the temporary data storage part on the basis of the retrieval turn information.

(Supplementary Note 3)

The storage device according to Supplementary Note 1 or 2, wherein the temporary data control part controls the storage state of the block data in the temporary data storage part by deleting the block data depending on a degree of distance from a target block data's turn to be retrieved on the basis of the retrieval turn information, the target block data being block data to be retrieved by the data retrieval control part.

(Supplementary Note 4)

The storage device according to any one of Supplementary Notes 1 to 3, wherein:

the data retrieval control part causes the temporary data storage part to store block data turn information on the basis of the retrieval turn information, the block data turn information being information which associates a block data identifier for identifying the block data with turn information representing a turn to be retrieved of the block data indicated by the block data identifier; and the temporary data control part controls the storage state of the block data in the temporary data storage part by using the block data turn information.

(Supplementary Note 5)

The storage device according to Supplementary Note 4, wherein the block data identifier contained in the block data turn information is part of a hash value calculated on a basis of a content of the block data indicated by the block data identifier.

(Supplementary Note 6)

The storage device according to Supplementary Note 4 or 5, wherein the turn information contained in the block data turn information is information representing a section's turn, the section being obtained by dividing a series of retrieval processes executed on the basis of the retrieval turn information into a plurality of sections by a given size.

(Supplementary Note 7)

The storage device according to any one of Supplementary Notes 1 to 6, wherein:

the data retrieval control part is configured to, in a case where the temporary data storage part does not store the block data which is a target to be retrieved, retrieve a plurality of the block data from the data storage part and cause the temporary data storage part to store the plurality of the block data, the plurality of the block data including the block data which is the target to be retrieved and being sequential in a physical area; and the temporary data control part deletes the block data not determined to be scheduled to be retrieved on the basis of the retrieval turn information, from among the plurality of the block data acquired from the data storage part.

(Supplementary Note 8)

The storage device according to any one of Supplementary Notes 1 to 7, comprising:

a data dividing part dividing writing target data into a plurality of the block data;

a block detecting part checking whether each of the block data obtained by division by the data dividing part is already stored in the data storage part; and a data writing part storing each of the block data obtained by division by the data dividing part into the data storage part and, when storing other block data of a same content as block data already stored in the data storage part, causing the block data already stored in the data storage part to be referred to as the other block data, wherein:

the block detecting part detects a common rate representing a rate of a common portion between a plurality of sequential block data configuring a predetermined range in the writing target data among the block data obtained by division by the data dividing part and a plurality of block data in a predetermined range already stored sequentially in the data storage part; and the data writing part newly stores the block data obtained by division by the data dividing part into the data storage part, depending on the common rate detected by the block detecting part.

(Supplementary Note 9)

The storage device according to Supplementary Note 8, wherein the data writing part targets, for writing into the data storage part, the block data appearing first in the writing target data among the block data identical to each other appearing when the writing target data is divided.

(Supplementary Note 10)

The storage device according to Supplementary Note 9, wherein the data writing part uses a Bloom filter to judge whether or not the block data appears first in the writing target data.

(Supplementary Note 10-1)

The storage device according to any of Supplementary Notes 8 to 10, wherein the data writing part sets so that a rate of a volume of rewritten block data with respect to a volume of the data already stored in the data storage part among the writing target data becomes equal to or less than a preset rate, the rewritten block data being the block data newly stored into the data storage part depending on the common rate detected by the block detecting part.

(Supplementary Note 11)

A computer program comprising instructions for causing an information processing device, which includes a data storage part storing deduplicated block data, a temporary data storage part temporarily storing block data acquired from the data storage part, and a retrieval turn information storage part storing retrieval turn information which is information about a turn to be retrieved of the block data, to realize:

a data retrieval control means for retrieving the block data stored by the data storage part, storing the block data into the temporary data storage part, and retrieving the block data from the temporary data storage part; and a temporary data control means for controlling a storage state of the block data stored by the temporary data storage part, wherein:

the data retrieval control means causes the temporary data storage part to store the block data acquired from the data storage part on a basis of the retrieval turn information acquired from the retrieval turn information storage part; and the temporary data control means controls the storage state of the block data in the temporary data storage part on the basis of the retrieval turn information.

(Supplementary Note 12)

The computer program according to Supplementary Note 11, wherein the temporary data control means controls the storage state of the block data in the temporary data storage part by deleting the block data stored by the temporary data storage part on the basis of the retrieval turn information.

(Supplementary Note 13)

The computer program according to Supplementary Note 11 or 12, wherein the temporary data control means controls the storage state of the block data in the temporary data storage part by deleting the block data whose turn to be retrieved is distant from a target block data's turn on the basis of the retrieval turn information, the target block data being block data to be retrieved by the data retrieval control means.

(Supplementary Note 14)

An information processing method comprising:

acquiring retrieval turn information which is information about block data's turn to be retrieved;

causing a temporary storage device to store the block data acquired from a storage device on a basis of the acquired retrieval turn information; and controlling a storage state of the block data in the temporary storage device on the basis of the retrieval turn information.

(Supplementary Note 15)

The information processing method according to Supplementary Note 14, comprising controlling the storage state of the block data in the temporary storage device by deleting the block data stored by the temporary storage device on the basis of the retrieval turn information.

(Supplementary Note 16)

The information processing method according to Supplementary Note 14 or 15, comprising controlling the storage state of the block data in the temporary storage device by deleting the block data whose turn to be retrieved is distant from a target block data's turn on the basis of the retrieval turn information, the target block data being block data to be retrieved.

The program disclosed in the exemplary embodiments and supplementary notes is stored in a storage device or recorded on a computer-readable recording medium. For example, the recording medium is a portable medium such as a flexible disk, an optical disk, a magneto-optical disk and a semiconductor memory.

Although the present invention has been described above referring to the exemplary embodiments, the present invention is not limited to the exemplary embodiments described above. The configurations and details of the present invention can be changed and modified in various manners that can be understood by one skilled in the art within the scope of the present invention.

DESCRIPTION OF REFERENCE NUMERALS 1, 6 storage system
11 metadata storage part
12 disk device
13 restoration management part
14 cache memory
141 block data turn information
142 data information
15 cache memory control part
66 data dividing part
67 block detecting part
68 data writing part
2 accelerator node
3 storage node
4 backup system
5 backup target device
70 data set
71 division data
72 redundant data
8 storage device
81 data storage part
82 temporary data storage part
83 data retrieval control part
84 retrieval turn information storage part
85 temporary data control part

What is claimed is:

1. A storage device comprising:
a data storage part storing deduplicated block data;
a temporary data storage part temporarily storing block data acquired from the data storage part;
a data retrieval control part retrieving the block data stored by the data storage part, storing the block data into the temporary data storage part, and retrieving the block data from the temporary data storage part; and
a temporary data control part deleting the block data stored by the temporary data storage part,
the storage device further comprising a retrieval turn information storage part storing retrieval turn information which is information about a turn to be retrieved of the block data for restoring the block data, the retrieval turn information being stored when the block data is stored in the data storage part, wherein:
the data retrieval control part causes the temporary data storage part to store the block data acquired from the data storage part on a basis of the retrieval turn information acquired from the retrieval turn information storage part; and the temporary data control part deletes the block data stored in the temporary data storage part on the basis of the retrieval turn information, the storage device further comprising:

a data dividing part dividing writing target data into a plurality of the block data;

a block detecting part checking whether each of the plurality of the block data obtained by the dividing by the data dividing part is already stored in the data storage part; and a data writing part storing each of the plurality of the block data obtained by the dividing by the data dividing part into the data storage part and, when storing other block data of a same content as block data already stored in the data storage part, causing the block data already stored in the data storage part to be referred to as the other block data, wherein:

the block detecting part detects a common rate representing a rate of a common portion between a plurality of sequential block data configuring a predetermined range in the writing target data among the plurality of the block data obtained by division by the data dividing part and a plurality of block data in a predetermined range already stored sequentially in the data storage part; and the data writing part newly stores the plurality of the block data obtained by the dividing by the data dividing part into the data storage part, depending on the common rate detected by the block detecting part.

2. The storage device according to claim 1, wherein the temporary data control part deletes the block data depending on a degree of distance from a target block data's turn to be retrieved on the basis of the retrieval turn information, the target block data being block data to be retrieved by the data retrieval control part.

3. The storage device according to claim 1, wherein:

the data retrieval control part causes the temporary data storage part to store block data turn information on the basis of the retrieval turn information, the block data turn information being information which associates a block data identifier for identifying the block data with turn information representing a turn to be retrieved of the block data indicated by the block data identifier; and the temporary data control part deletes the block data in the temporary data storage part by using the block data turn information.

4. The storage device according to claim 3, wherein the block data identifier contained in the block data turn information is part of a hash value calculated on a basis of a content of the block data indicated by the block data identifier.

5. The storage device according to claim 3, wherein the turn information contained in the block data turn information is information representing a section's turn, the section being obtained by dividing a series of retrieval processes executed on the basis of the retrieval turn information into a plurality of sections by a given size.

6. The storage device according to claim 1, wherein:

the data retrieval control part is configured to, in a case where the temporary data storage part does not store the block data which is a target to be retrieved, retrieve a plurality of the block data from the data storage part and cause the temporary data storage part to store the plurality of the block data, the plurality of the block data including the block data which is the target to be retrieved and being sequential in a physical area; and the temporary data control part deletes the block data not determined to be scheduled to be retrieved on the basis of the retrieval turn information, from among the plurality of the block data acquired from the data storage part.

7. The storage device according to claim 1, wherein the data writing part targets, for writing into the data storage part, the block data appearing first in the writing target data among the block data identical to each other appearing when the writing target data is divided.

8. The storage device according to claim 7, wherein the data writing part uses a Bloom filter to judge whether or not the block data appears first in the writing target data.

9. A non-transitory computer-readable medium storing a program comprising instructions for causing an information processing device, which includes a data storage part storing deduplicated block data, a temporary data storage part temporarily storing block data acquired from the data storage part, and a retrieval turn information storage part storing retrieval turn information which is information about a turn to be retrieved of the block data for restoring the block data, the retrieval turn information being stored when the block data is stored in the data storage part, to realize:

a data retrieval control unit configured to retrieve the block data stored by the data storage part, storing the block data into the temporary data storage part, and retrieving the block data from the temporary data storage part; and a temporary data control unit configured to delete the block data stored by the temporary data storage part, wherein:

the data retrieval control unit is configured to cause the temporary data storage part to store the block data acquired from the data storage part on a basis of the retrieval turn information acquired from the retrieval turn information storage part; and the temporary data control unit is configured to delete the block data stored in the temporary data storage part on the basis of the retrieval turn information;

wherein the program comprising the instructions for causing the information processing device to further realize:

a data dividing part dividing writing target data into a plurality of the block data;

a block detecting part checking whether each of the plurality of the block data obtained by the dividing by the data dividing part is already stored in the data storage part; and a data writing part storing each of the plurality of the block data obtained by the dividing by the data dividing part into the data storage part and, when storing other block data of a same content as block data already stored in the data storage part, causing the block data already stored in the data storage part to be referred to as the other block data, wherein:

the block detecting part detects a common rate representing a rate of a common portion between a plurality of sequential block data configuring a predetermined range in the writing target data among the plurality of the block data obtained by division by the data dividing part and a plurality of block data in a predetermined range already stored sequentially in the data storage part; and the data writing part newly stores the plurality of the block data obtained by the dividing by the data dividing part into the data storage part, depending on the common rate detected by the block detecting part.

10. The non-transitory computer-readable medium storing the program according to claim 9, wherein the temporary data control unit is configured to delete the block data in the temporary data storage part by deleting the block data whose turn to be retrieved is distant from a target block data's turn on the basis of the retrieval turn information, the target block data being block data to be retrieved by the data retrieval control unit.

11. An information processing method comprising:
  acquiring retrieval turn information which is information about block data's turn to be retrieved for restoring the block data, the retrieval turn information being stored when the block data is stored in a data storage part;
  causing a temporary storage device to store the block data acquired from a storage device on a basis of the acquired retrieval turn information;
  deleting the block data in the temporary storage device on the basis of the retrieval turn information;
  dividing writing target data into a plurality of the block data;
  checking whether each of the plurality of the block data obtained by the dividing is already stored in the data storage part; and
  storing each of the plurality of the block data obtained by the dividing into the data storage part, and when storing other block data of a same content as block data already stored in the data storage part, causing the block data already stored in the data storage part to be referred to as the other block data, wherein:
  the checking comprises detecting a common rate representing a rate of a common portion between a plurality of sequential block data configuring a predetermined range in the writing target data among the plurality of the block data obtained by division and a plurality of block data in a predetermined range already stored sequentially in the data storage part; and
  the storing comprises newly storing the plurality of the block data obtained by the dividing into the data storage part, depending on the detected common rate.

12. The information processing method according to claim 11, wherein the deleting the block data comprises: deleting the block data whose turn to be retrieved is distant from a target block data's turn on the basis of the retrieval turn information, the target block data being block data to be retrieved.

* * * * *